US008885660B2

(12) United States Patent
Binder

(10) Patent No.: US 8,885,660 B2
(45) Date of Patent: Nov. 11, 2014

(54) LOCAL AREA NETWORK OF SERIAL INTELLIGENT CELLS

(71) Applicant: MOSAID Technologies Incorporated, Ottawa (CA)

(72) Inventor: Yehuda Binder, Hod Hasharon (IL)

(73) Assignee: Conversant Intellectual Property Management Incorporated, Ottawa, Ontario (CA)

( * ) Notice: Subject to any disclaimer, the term of this patent is extended or adjusted under 35 U.S.C. 154(b) by 0 days.

(21) Appl. No.: 13/754,366

(22) Filed: Jan. 30, 2013

(65) Prior Publication Data

US 2013/0215799 A1 Aug. 22, 2013

Related U.S. Application Data

(63) Continuation of application No. 11/300,313, filed on Dec. 15, 2005, which is a continuation of application (Continued)

(51) Int. Cl.
*H04J 4/00* (2006.01)
*H04L 5/14* (2006.01)

(Continued)

(52) U.S. Cl.
CPC .. *H04L 5/14* (2013.01); *H04B 3/54* (2013.01); *H04B 3/542* (2013.01); *H04L 12/2501*

(Continued)

(58) Field of Classification Search
USPC ......... 370/436, 351, 502, 508, 908, 479, 335, 370/295, 337, 342, 344, 343, 347, 441, 254, 370/285, 293, 463, 400, 401, 402
See application file for complete search history.

(56) References Cited

U.S. PATENT DOCUMENTS

| 404,721 A | 4/1889 | Messer |
| 405,422 A | 6/1889 | Law et al. |

(Continued)

FOREIGN PATENT DOCUMENTS

| DE | 3329336 A1 | 12/1983 |
| EP | 0241152 A2 | 10/1987 |

(Continued)

OTHER PUBLICATIONS

Hachman, Mark, "Compaq to Ride the CEBus", EBN, 1 page, Jan. 22, 1996.

(Continued)

*Primary Examiner* — Chi H Pham
*Assistant Examiner* — Alexander O Boakye
(74) *Attorney, Agent, or Firm* — Winstead PC

(57) ABSTRACT

A serial intelligent cell (SIC) and a connection topology for local area networks using Electrically-conducting media. A local area network can be configured from a plurality of SIC's interconnected so that all communications between two adjacent SIC's is both point-to-point and bidirectional. Each SIC can be connected to one or more other SIC's to allow redundant communication paths. Communications in different areas of a SIC network are independent of one another, so that there is no fundamental limit on the size or extent of a SIC network. Each SIC can optionally be connected to one or more data terminals, computers, telephones, sensors, actuators, etc., to facilitate interconnectivity among such devices. Networks according to the present invention can be configured for a variety of applications, including a local telephone system, remote computer bus extender, multiplexers, PABX/PBX functionality, security systems, and local broadcasting services.

9 Claims, 9 Drawing Sheets

Related U.S. Application Data

No. 10/178,223, filed on Jun. 25, 2002, now Pat. No. 7,016,368, which is a continuation of application No. 09/123,486, filed on Jul. 28, 1998, now Pat. No. 6,480,510.

(51) Int. Cl.
  *H04B 3/54* (2006.01)
  *H04L 12/28* (2006.01)
  *H04L 29/06* (2006.01)
  *H04M 19/02* (2006.01)

(52) U.S. Cl.
  CPC .... (2013.01); *H04L 12/2803* (2013.01); *H04L 12/2838* (2013.01); *H04L 29/0602* (2013.01); *H04M 19/02* (2013.01); *H04B 2203/5437* (2013.01); *H04B 2203/5445* (2013.01); *H04B 2203/545* (2013.01); *H04B 2203/5458* (2013.01); *H04L 2012/2843* (2013.01); *H04L 2012/2845* (2013.01); *Y10S 370/908* (2013.01)
  USPC .......................................... 370/436; 370/908

(56) References Cited

U.S. PATENT DOCUMENTS

| | | |
|---|---|---|
| 2,032,360 A | 3/1936 | Green |
| 2,264,395 A | 2/1941 | Mitchel |
| 2,264,396 A | 12/1941 | Moore |
| 2,298,435 A | 10/1942 | Tunick |
| 2,411,786 A | 11/1946 | Halstead |
| 2,510,273 A | 6/1950 | Barstow et al. |
| 2,516,211 A | 7/1950 | Hochgraf |
| 2,568,342 A | 9/1951 | Koehler et al. |
| 2,577,731 A | 11/1951 | Berger |
| 2,680,162 A | 6/1954 | Brehm et al. |
| 3,045,066 A | 7/1962 | Beuscher |
| 3,280,259 A | 10/1966 | Cotter |
| 3,334,340 A | 1/1967 | McConnell |
| 3,366,744 A | 1/1968 | Miller |
| 3,369,078 A | 2/1968 | Stradley |
| 3,370,125 A | 2/1968 | Shaw et al. |
| 3,406,344 A | 10/1968 | Hopper |
| 3,508,243 A | 4/1970 | Nyfeler et al. |
| 3,509,537 A | 4/1970 | Haberly |
| 3,511,936 A | 5/1970 | Saltzberg |
| 3,529,088 A | 9/1970 | Hauer |
| 3,539,727 A | 10/1970 | Pasternack |
| 3,540,030 A | 11/1970 | Hartz |
| 3,590,271 A | 6/1971 | Peters |
| 3,594,584 A | 7/1971 | Woods |
| 3,651,471 A | 3/1972 | Haselwood et al. |
| 3,654,605 A | 4/1972 | Honda et al. |
| 3,656,112 A | 4/1972 | Paull |
| 3,659,277 A | 4/1972 | Brown |
| 3,662,366 A | 5/1972 | Neuville et al. |
| 3,683,343 A | 8/1972 | Feldman et al. |
| 3,689,886 A | 9/1972 | Durkee |
| 3,699,523 A | 10/1972 | Percher |
| 3,702,460 A | 11/1972 | Blose |
| 3,710,373 A | 1/1973 | Watanabe et al. |
| 3,714,451 A | 1/1973 | Whitney et al. |
| 3,717,858 A | 2/1973 | Hadden |
| 3,719,928 A | 3/1973 | Oishi et al. |
| 3,721,830 A | 3/1973 | Oishi et al. |
| 3,723,653 A | 3/1973 | Tatsuzawa |
| 3,733,586 A | 5/1973 | Lusk et al. |
| 3,739,226 A | 6/1973 | Seiter et al. |
| 3,771,069 A | 11/1973 | Levacher et al. |
| 3,796,920 A | 3/1974 | Hedrick et al. |
| 3,805,265 A | 4/1974 | Lester |
| 3,806,814 A | 4/1974 | Forbes |
| 3,810,096 A | 5/1974 | Kabat et al. |
| 3,818,481 A | 6/1974 | Dorfman et al. |
| 3,835,334 A | 9/1974 | Notteau |
| 3,836,888 A | 9/1974 | Boenke et al. |
| 3,846,638 A | 11/1974 | Wetherell |
| 3,870,822 A | 3/1975 | Matthews |
| 3,872,253 A | 3/1975 | Jurschak |
| 3,872,319 A | 3/1975 | Platzer, Jr. |
| 3,873,771 A | 3/1975 | Kleinerman et al. |
| 3,875,339 A | 4/1975 | Gruen et al. |
| 3,876,984 A | 4/1975 | Chertok |
| 3,909,618 A | 9/1975 | Fujii et al. |
| 3,909,821 A | 9/1975 | Jagoda et al. |
| 3,911,415 A | 10/1975 | Whyte |
| 3,922,490 A | 11/1975 | Pettis |
| 3,922,664 A | 11/1975 | Wadsworth |
| 3,924,077 A | 12/1975 | Blakeslee |
| 3,924,223 A | 12/1975 | Whyte et al. |
| 3,925,728 A | 12/1975 | Whyte |
| 3,925,763 A | 12/1975 | Wadhwani et al. |
| 3,937,889 A | 2/1976 | Bell, III et al. |
| 3,938,129 A | 2/1976 | Smither |
| 3,942,168 A | 3/1976 | Whyte |
| 3,942,170 A | 3/1976 | Whyte |
| 3,944,723 A | 3/1976 | Fong |
| 3,949,172 A | 4/1976 | Brown et al. |
| 3,959,772 A | 5/1976 | Wakasa et al. |
| 3,962,547 A | 6/1976 | Pattantyus-Abraham |
| 3,964,048 A | 6/1976 | Lusk et al. |
| 3,967,264 A | 6/1976 | Whyte et al. |
| 3,968,333 A | 7/1976 | Simokat et al. |
| 3,973,087 A | 8/1976 | Fong |
| 3,973,240 A | 8/1976 | Fong |
| 3,975,594 A | 8/1976 | Guntersdorfer |
| 3,980,954 A | 9/1976 | Whyte |
| 3,992,589 A | 11/1976 | Kuegler |
| 3,993,989 A | 11/1976 | Held et al. |
| 4,004,110 A | 1/1977 | Whyte |
| 4,008,369 A | 2/1977 | Theurer et al. |
| 4,008,467 A | 2/1977 | Pattantyus-Abraham et al. |
| 4,012,733 A | 3/1977 | Whyte |
| 4,012,734 A | 3/1977 | Jagoda et al. |
| 4,016,429 A | 4/1977 | Vercellotti et al. |
| 4,024,528 A | 5/1977 | Boggs et al. |
| 4,032,911 A | 6/1977 | Melvin, Jr. |
| 4,035,838 A | 7/1977 | Bassani et al. |
| 4,054,910 A | 10/1977 | Chou et al. |
| 4,057,793 A | 11/1977 | Johnson et al. |
| 4,058,678 A | 11/1977 | Dunn et al. |
| 4,060,735 A | 11/1977 | Pascucci et al. |
| 4,063,220 A | 12/1977 | Metcalfe et al. |
| 4,065,763 A | 12/1977 | Whyte et al. |
| 4,066,912 A | 1/1978 | Wetherell |
| 4,085,678 A | 4/1978 | Heincker |
| 4,090,184 A | 5/1978 | Hamilton, II |
| 4,106,077 A | 8/1978 | Furda |
| 4,130,861 A | 12/1978 | LaForest |
| 4,130,874 A | 12/1978 | Pai |
| 4,135,181 A | 1/1979 | Bogacki et al. |
| 4,136,319 A | 1/1979 | Bourde |
| 4,139,735 A | 2/1979 | Dorfman et al. |
| 4,142,178 A | 2/1979 | Whyte et al. |
| 4,161,027 A | 7/1979 | Russell |
| 4,161,720 A | 7/1979 | Bogacki |
| 4,163,218 A | 7/1979 | Wu |
| 4,171,467 A | 10/1979 | Evenchik |
| 4,173,714 A | 11/1979 | Bloch et al. |
| 4,173,754 A | 11/1979 | Feiker |
| 4,174,517 A | 11/1979 | Mandel |
| 4,188,619 A | 2/1980 | Perkins |
| 4,197,431 A | 4/1980 | Vis |
| 4,199,761 A | 4/1980 | Whyte et al. |
| 4,200,862 A | 4/1980 | Campbell et al. |
| 4,205,360 A | 5/1980 | Drucker |
| 4,206,320 A | 6/1980 | Keasler et al. |
| 4,210,901 A | 7/1980 | Whyte et al. |
| 4,216,543 A | 8/1980 | Cagle et al. |
| 4,222,035 A | 9/1980 | Lohoff |
| 4,232,200 A | 11/1980 | Hestad et al. |
| 4,241,243 A | 12/1980 | Ball |
| 4,245,215 A | 1/1981 | O'Connor et al. |
| 4,250,489 A | 2/1981 | Dudash et al. |

(56) References Cited

U.S. PATENT DOCUMENTS

| | | |
|---|---|---|
| 4,254,305 A | 3/1981 | Treiber |
| 4,254,403 A | 3/1981 | Perez-Cavero et al. |
| 4,262,171 A | 4/1981 | Schneider et al. |
| 4,270,206 A | 5/1981 | Hughes |
| 4,272,759 A | 6/1981 | Handy |
| 4,300,126 A | 11/1981 | Gajjar |
| 4,302,629 A | 11/1981 | Foulkes et al. |
| 4,302,750 A | 11/1981 | Wadhwani et al. |
| 4,303,993 A | 12/1981 | Panepinto, Jr. et al. |
| 4,307,380 A | 12/1981 | Gander |
| 4,311,964 A | 1/1982 | Boykin |
| 4,321,581 A | 3/1982 | Tappeiner et al. |
| 4,323,882 A | 4/1982 | Gajjar |
| 4,328,579 A | 5/1982 | Hashimoto et al. |
| 4,329,678 A | 5/1982 | Hatfield |
| 4,330,687 A | 5/1982 | Foulkes et al. |
| 4,332,980 A | 6/1982 | Reynolds et al. |
| 4,335,464 A | 6/1982 | Armstrong et al. |
| 4,339,750 A | 7/1982 | Delacruz |
| 4,339,816 A | 7/1982 | Reed |
| 4,344,066 A | 8/1982 | Beggs |
| 4,348,582 A | 9/1982 | Budek |
| 4,348,668 A | 9/1982 | Gurr et al. |
| 4,355,303 A | 10/1982 | Phillips et al. |
| 4,357,598 A | 11/1982 | Melvin, Jr. |
| 4,357,605 A | 11/1982 | Clements |
| 4,367,548 A | 1/1983 | Cotten, Jr. et al. |
| 4,367,557 A | 1/1983 | Stern et al. |
| 4,371,867 A | 2/1983 | Gander |
| 4,373,117 A | 2/1983 | Pierce |
| 4,377,804 A | 3/1983 | Suzuki |
| 4,378,470 A | 3/1983 | Murto et al. |
| 4,380,009 A | 4/1983 | Long et al. |
| 4,381,427 A | 4/1983 | Cheal et al. |
| 4,382,248 A | 5/1983 | Pai |
| 4,386,436 A | 5/1983 | Kocher et al. |
| 4,387,271 A | 6/1983 | Artom |
| 4,388,489 A | 6/1983 | Wigan et al. |
| 4,389,694 A | 6/1983 | Cornwell, Jr. |
| 4,390,986 A | 6/1983 | Moses |
| 4,393,508 A | 7/1983 | Boudault |
| 4,395,590 A | 7/1983 | Pierce et al. |
| 4,400,688 A | 8/1983 | Johnston et al. |
| 4,402,059 A | 8/1983 | Kennon et al. |
| 4,408,185 A | 10/1983 | Rasmussen |
| 4,408,186 A | 10/1983 | Howell |
| 4,413,229 A | 11/1983 | Grant |
| 4,415,774 A | 11/1983 | Driver |
| 4,417,099 A | 11/1983 | Pierce |
| 4,417,207 A | 11/1983 | Sato |
| 4,418,333 A | 11/1983 | Schwarzbach et al. |
| 4,419,758 A | 12/1983 | Dorey |
| 4,425,642 A | 1/1984 | Moses et al. |
| 4,427,968 A | 1/1984 | York |
| 4,429,299 A | 1/1984 | Kabat et al. |
| 4,430,639 A | 2/1984 | Bennett et al. |
| 4,431,869 A | 2/1984 | Sweet |
| 4,433,212 A | 2/1984 | Moses et al. |
| 4,433,284 A | 2/1984 | Perkins |
| 4,433,326 A | 2/1984 | Howell |
| 4,438,519 A | 3/1984 | Bose |
| 4,442,319 A | 4/1984 | Treidl |
| 4,442,320 A | 4/1984 | James et al. |
| 4,442,540 A | 4/1984 | Allen |
| 4,443,662 A | 4/1984 | Nakhla |
| 4,444,999 A | 4/1984 | Sparrevohn |
| 4,449,218 A | 5/1984 | Strehl |
| 4,456,985 A | 6/1984 | Carsten et al. |
| 4,456,986 A | 6/1984 | Carsten et al. |
| 4,458,236 A | 7/1984 | Perkins |
| 4,459,434 A | 7/1984 | Benning et al. |
| 4,462,113 A | 7/1984 | Iwata |
| 4,463,341 A | 7/1984 | Iwasaki |
| 4,467,314 A | 8/1984 | Weikel et al. |
| 4,468,792 A | 8/1984 | Baker et al. |
| 4,471,399 A | 9/1984 | Udren |
| 4,473,816 A | 9/1984 | Perkins |
| 4,473,817 A | 9/1984 | Perkins |
| 4,475,193 A | 10/1984 | Brown |
| 4,477,896 A | 10/1984 | Aker |
| 4,479,033 A | 10/1984 | Brown et al. |
| 4,479,215 A | 10/1984 | Baker |
| 4,481,501 A | 11/1984 | Perkins |
| 4,484,185 A | 11/1984 | Graves |
| 4,485,400 A | 11/1984 | Lemelson et al. |
| 4,490,683 A | 12/1984 | Rhee |
| 4,493,092 A | 1/1985 | Adams |
| 4,493,948 A | 1/1985 | Sues et al. |
| 4,500,751 A | 2/1985 | Darland et al. |
| 4,506,387 A | 3/1985 | Walter |
| 4,507,721 A | 3/1985 | Yamano et al. |
| 4,507,793 A | 3/1985 | Adams |
| 4,509,211 A | 4/1985 | Robbins |
| 4,510,493 A | 4/1985 | Bux et al. |
| 4,510,611 A | 4/1985 | Dougherty |
| 4,514,594 A | 4/1985 | Brown et al. |
| 4,521,881 A | 6/1985 | Stapleford et al. |
| 4,523,307 A | 6/1985 | Brown et al. |
| 4,528,422 A | 7/1985 | Cupani |
| 4,528,667 A | 7/1985 | Fruhauf |
| 4,534,039 A | 8/1985 | Dodds et al. |
| 4,535,401 A | 8/1985 | Penn |
| 4,535,447 A | 8/1985 | Rosanes et al. |
| 4,536,136 A | 8/1985 | Lan |
| 4,538,136 A | 8/1985 | Drabing |
| 4,543,450 A | 9/1985 | Brandt |
| 4,546,212 A | 10/1985 | Crowder, Sr. |
| 4,551,721 A | 11/1985 | Kozlik |
| 4,556,864 A | 12/1985 | Roy |
| 4,556,865 A | 12/1985 | Fukagawa et al. |
| 4,556,866 A | 12/1985 | Gorecki |
| 4,559,520 A | 12/1985 | Johnston |
| 4,561,020 A | 12/1985 | Matsuda |
| 4,564,940 A | 1/1986 | Yahata |
| 4,567,557 A | 1/1986 | Burns |
| 4,577,311 A | 3/1986 | Duquesne et al. |
| 4,577,314 A | 3/1986 | Chu et al. |
| 4,577,333 A | 3/1986 | Lewis et al. |
| 4,578,533 A | 3/1986 | Pierce |
| 4,578,535 A | 3/1986 | Simmons |
| 4,578,537 A | 3/1986 | Faggin et al. |
| 4,578,540 A | 3/1986 | Borg et al. |
| 4,580,276 A | 4/1986 | Andruzzi, Jr. et al. |
| 4,580,291 A | 4/1986 | ab der Halden |
| 4,583,214 A | 4/1986 | Miyashita et al. |
| 4,584,690 A | 4/1986 | Cafiero et al. |
| 4,592,069 A | 5/1986 | Redding |
| 4,593,389 A | 6/1986 | Wurzburg et al. |
| 4,597,077 A | 6/1986 | Nelson et al. |
| 4,597,082 A | 6/1986 | Hill et al. |
| 4,599,598 A | 7/1986 | Komoda et al. |
| 4,602,240 A | 7/1986 | Perkins et al. |
| 4,604,741 A | 8/1986 | Barsellotti |
| 4,608,686 A | 8/1986 | Barsellotti |
| 4,609,839 A | 9/1986 | Howell |
| 4,611,274 A | 9/1986 | Machino et al. |
| 4,621,170 A | 11/1986 | Picandet |
| 4,631,367 A | 12/1986 | Coviello et al. |
| 4,633,217 A | 12/1986 | Akano |
| 4,633,218 A | 12/1986 | Palsgrove et al. |
| 4,636,771 A | 1/1987 | Ochs |
| 4,636,914 A | 1/1987 | Belli |
| 4,638,298 A | 1/1987 | Spiro |
| 4,638,299 A | 1/1987 | Campbell |
| 4,639,714 A | 1/1987 | Crowe |
| 4,641,126 A | 2/1987 | Crowe |
| 4,641,322 A | 2/1987 | Hasegawa |
| 4,642,607 A | 2/1987 | Strom et al. |
| 4,644,321 A | 2/1987 | Kennon |
| 4,644,526 A | 2/1987 | Wu |
| 4,646,289 A | 2/1987 | Tsiakas et al. |
| 4,646,296 A | 2/1987 | Bartholet et al. |
| 4,647,725 A | 3/1987 | Dellinger et al. |
| 4,649,551 A | 3/1987 | Sander et al. |

(56) References Cited

U.S. PATENT DOCUMENTS

| | | |
|---|---|---|
| 4,651,022 A | 3/1987 | Cowley |
| 4,656,655 A | 4/1987 | Hashimoto |
| 4,665,516 A | 5/1987 | Middleton et al. |
| 4,665,544 A | 5/1987 | Honda et al. |
| 4,668,934 A | 5/1987 | Shuey |
| 4,669,916 A | 6/1987 | White et al. |
| 4,670,870 A | 6/1987 | Hewinson et al. |
| 4,670,874 A | 6/1987 | Sato et al. |
| 4,672,602 A | 6/1987 | Hargrave et al. |
| 4,672,605 A | 6/1987 | Hustig et al. |
| 4,675,648 A | 6/1987 | Roth et al. |
| 4,677,646 A | 6/1987 | Dodds et al. |
| 4,679,227 A | 7/1987 | Hughes-Hartogs |
| 4,686,382 A | 8/1987 | Shuey |
| 4,686,641 A | 8/1987 | Evans |
| 4,691,344 A | 9/1987 | Brown et al. |
| 4,692,761 A | 9/1987 | Robinton |
| 4,697,166 A | 9/1987 | Warnagiris et al. |
| 4,701,945 A | 10/1987 | Pedigo |
| 4,703,306 A | 10/1987 | Barritt |
| 4,703,499 A | 10/1987 | Fossas et al. |
| 4,709,412 A | 11/1987 | Seymour et al. |
| 4,714,912 A | 12/1987 | Roberts et al. |
| 4,719,616 A | 1/1988 | Akano |
| 4,724,435 A | 2/1988 | Moses et al. |
| 4,731,821 A | 3/1988 | Jackson, III |
| 4,733,380 A | 3/1988 | Havira |
| 4,733,389 A | 3/1988 | Puvogel |
| 4,734,919 A | 3/1988 | Tae |
| 4,734,932 A | 3/1988 | Lott |
| 4,736,367 A | 4/1988 | Wroblewski et al. |
| 4,740,963 A | 4/1988 | Eckley |
| 4,742,538 A | 5/1988 | Szlam |
| 4,745,391 A | 5/1988 | Gajjar |
| 4,745,392 A | 5/1988 | Ise et al. |
| 4,746,809 A | 5/1988 | Coleman et al. |
| 4,746,897 A | 5/1988 | Shuey |
| 4,748,656 A | 5/1988 | Gibbs et al. |
| 4,749,992 A | 6/1988 | Fitzemeyer et al. |
| 4,750,094 A | 6/1988 | Krasik |
| 4,754,326 A | 6/1988 | Kram et al. |
| 4,755,792 A | 7/1988 | Pezzolo et al. |
| 4,757,495 A | 7/1988 | Decker et al. |
| 4,757,497 A | 7/1988 | Beierle et al. |
| 4,761,646 A | 8/1988 | Choquet et al. |
| 4,763,103 A | 8/1988 | Galula et al. |
| 4,763,104 A | 8/1988 | Inoue et al. |
| 4,764,922 A | 8/1988 | Dieter et al. |
| 4,766,402 A | 8/1988 | Crane |
| 4,766,414 A | 8/1988 | Shuey |
| 4,768,110 A | 8/1988 | Dunlap et al. |
| 4,768,206 A | 8/1988 | Van Gerwen |
| 4,769,837 A | 9/1988 | McCormick et al. |
| 4,772,870 A | 9/1988 | Reyes |
| 4,776,006 A | 10/1988 | Comerford et al. |
| 4,780,714 A | 10/1988 | Moustakas et al. |
| 4,780,757 A | 10/1988 | Bryer et al. |
| 4,780,758 A | 10/1988 | Lin et al. |
| 4,782,322 A | 11/1988 | Lechner et al. |
| 4,785,448 A | 11/1988 | Reichert et al. |
| 4,785,472 A | 11/1988 | Shapiro |
| 4,787,082 A | 11/1988 | Delaney et al. |
| 4,788,527 A | 11/1988 | Johansson |
| 4,789,895 A | 12/1988 | Mustafa et al. |
| 4,789,994 A | 12/1988 | Randall et al. |
| 4,799,211 A | 1/1989 | Felker et al. |
| 4,799,213 A | 1/1989 | Fitzgerald |
| 4,800,363 A | 1/1989 | Braun et al. |
| 4,803,485 A | 2/1989 | Rypinski |
| 4,803,719 A | 2/1989 | Ulrich |
| 4,806,905 A | 2/1989 | McGowan, III et al. |
| 4,807,225 A | 2/1989 | Fitch |
| 4,809,296 A | 2/1989 | Braun et al. |
| 4,809,339 A | 2/1989 | Shih et al. |
| 4,813,066 A | 3/1989 | Holtz et al. |
| 4,814,941 A | 3/1989 | Speet et al. |
| 4,815,106 A | 3/1989 | Propp et al. |
| 4,821,319 A | 4/1989 | Middleton et al. |
| 4,825,349 A | 4/1989 | Marcel |
| 4,825,435 A | 4/1989 | Amundsen et al. |
| 4,829,570 A | 5/1989 | Schotz |
| 4,835,343 A | 5/1989 | Graef et al. |
| 4,835,517 A | 5/1989 | van der Gracht et al. |
| 4,837,799 A | 6/1989 | Prohs et al. |
| 4,839,743 A | 6/1989 | Best et al. |
| 4,841,281 A | 6/1989 | Melvin, Jr. |
| 4,843,606 A | 6/1989 | Bux et al. |
| 4,845,466 A | 7/1989 | Hariton et al. |
| 4,847,903 A | 7/1989 | Schotz |
| 4,849,811 A | 7/1989 | Kleinerman |
| 4,852,151 A | 7/1989 | Dittakavi et al. |
| 4,864,588 A | 9/1989 | Simpson et al. |
| 4,864,589 A | 9/1989 | Endo |
| 4,866,602 A | 9/1989 | Hall |
| 4,866,704 A | 9/1989 | Bergman |
| 4,866,733 A | 9/1989 | Morishita |
| 4,866,757 A | 9/1989 | Nilssen |
| 4,872,197 A | 10/1989 | Pemmaraju |
| 4,882,747 A | 11/1989 | Williams |
| 4,885,563 A | 12/1989 | Johnson et al. |
| 4,885,564 A | 12/1989 | Vercellotti et al. |
| 4,885,747 A | 12/1989 | Foglia |
| 4,885,766 A | 12/1989 | Yasuoka et al. |
| 4,888,795 A | 12/1989 | Ando et al. |
| 4,890,089 A | 12/1989 | Shuey |
| 4,890,102 A | 12/1989 | Oliver |
| 4,890,316 A | 12/1989 | Walsh et al. |
| 4,891,694 A | 1/1990 | Way |
| 4,893,326 A | 1/1990 | Duran et al. |
| 4,896,277 A | 1/1990 | Vercellotti et al. |
| 4,896,349 A | 1/1990 | Kubo et al. |
| 4,899,131 A | 2/1990 | Wilk et al. |
| 4,901,218 A | 2/1990 | Cornwell |
| 4,901,342 A | 2/1990 | Jones |
| 4,903,006 A | 2/1990 | Boomgaard |
| 4,903,292 A | 2/1990 | Dillon |
| 4,912,553 A | 3/1990 | Pal et al. |
| 4,914,418 A | 4/1990 | Mak et al. |
| 4,914,688 A | 4/1990 | Kobayashi et al. |
| 4,918,688 A | 4/1990 | Krause et al. |
| 4,918,690 A | 4/1990 | Markkula, Jr. et al. |
| 4,922,503 A | 5/1990 | Leone |
| 4,924,349 A | 5/1990 | Buehler et al. |
| 4,924,492 A | 5/1990 | Gitlin et al. |
| 4,926,158 A | 5/1990 | Zeigler |
| 4,932,022 A | 6/1990 | Keeney et al. |
| 4,932,047 A | 6/1990 | Emmons et al. |
| 4,937,811 A | 6/1990 | Harris |
| 4,939,728 A | 7/1990 | Markkula, Jr. et al. |
| 4,945,404 A | 7/1990 | Miller |
| 4,947,483 A | 8/1990 | Dirr |
| 4,947,484 A | 8/1990 | Twitty et al. |
| 4,949,187 A | 8/1990 | Cohen |
| 4,953,055 A | 8/1990 | Douhet et al. |
| 4,953,160 A | 8/1990 | Gupta |
| 4,954,886 A | 9/1990 | Elberbaum |
| 4,955,018 A | 9/1990 | Twitty et al. |
| 4,955,048 A | 9/1990 | Iwamura et al. |
| 4,962,496 A | 10/1990 | Vercellotti et al. |
| 4,963,853 A | 10/1990 | Mak |
| 4,968,970 A | 11/1990 | LaPorte |
| 4,969,136 A | 11/1990 | Chamberlin et al. |
| 4,969,147 A | 11/1990 | Markkula, Jr. et al. |
| 4,973,940 A | 11/1990 | Sakai et al. |
| 4,973,954 A | 11/1990 | Schwarz |
| 4,975,896 A | 12/1990 | D'Agosto, III et al. |
| 4,975,903 A | 12/1990 | Wakerly et al. |
| 4,975,906 A | 12/1990 | Takiyasu et al. |
| 4,979,028 A | 12/1990 | Minematsu et al. |
| 4,979,183 A | 12/1990 | Cowart |
| 4,985,892 A | 1/1991 | Camarata |
| 4,988,972 A | 1/1991 | Takagi |
| 4,989,081 A | 1/1991 | Miyagawa et al. |
| 4,991,221 A | 2/1991 | Rush |

(56) References Cited

U.S. PATENT DOCUMENTS

| | | |
|---|---|---|
| 4,992,774 A | 2/1991 | McCullough |
| 4,996,709 A | 2/1991 | Heep et al. |
| 5,001,774 A | 3/1991 | Lee |
| 5,003,457 A | 3/1991 | Ikei et al. |
| 5,010,399 A | 4/1991 | Goodman et al. |
| 5,014,308 A | 5/1991 | Fox |
| 5,018,138 A | 5/1991 | Twitty et al. |
| 5,021,779 A | 6/1991 | Bisak |
| 5,022,069 A | 6/1991 | Chen |
| 5,023,868 A | 6/1991 | Davidson et al. |
| 5,025,443 A | 6/1991 | Gupta |
| 5,027,426 A | 6/1991 | Chiocca, Jr. |
| 5,029,334 A | 7/1991 | Braun et al. |
| 5,032,819 A | 7/1991 | Sakuragi et al. |
| 5,032,833 A | 7/1991 | Laporte |
| 5,033,062 A | 7/1991 | Morrow et al. |
| 5,033,112 A | 7/1991 | Bowling et al. |
| 5,034,531 A | 7/1991 | Friary |
| 5,034,882 A | 7/1991 | Eisenhard et al. |
| 5,034,883 A | 7/1991 | Donaldson et al. |
| 5,034,948 A | 7/1991 | Mizutani et al. |
| 5,036,513 A | 7/1991 | Greenblatt |
| 5,042,028 A | 8/1991 | Ogawa |
| 5,049,876 A | 9/1991 | Kahle et al. |
| 5,051,720 A | 9/1991 | Kittirutsunetorn |
| 5,051,822 A | 9/1991 | Rhoades |
| 5,063,563 A | 11/1991 | Ikeda et al. |
| 5,065,133 A | 11/1991 | Howard |
| 5,066,939 A | 11/1991 | Mansfield, Jr. |
| 5,068,890 A | 11/1991 | Nilssen |
| 5,070,442 A | 12/1991 | Syron-Townson et al. |
| 5,070,522 A | 12/1991 | Nilssen |
| 5,089,886 A | 2/1992 | Grandmougin |
| 5,089,927 A | 2/1992 | Bulan et al. |
| 5,089,974 A | 2/1992 | Demeyer et al. |
| 5,090,024 A | 2/1992 | Vander Mey et al. |
| 5,090,052 A | 2/1992 | Nakajima et al. |
| 5,093,828 A | 3/1992 | Braun et al. |
| 5,095,417 A | 3/1992 | Hagiwara et al. |
| 5,095,497 A | 3/1992 | Aman et al. |
| 5,099,444 A | 3/1992 | Wilson et al. |
| 5,109,222 A | 4/1992 | Welty |
| 5,111,497 A | 5/1992 | Bliven et al. |
| 5,113,498 A | 5/1992 | Evan et al. |
| 5,114,365 A | 5/1992 | Thompson et al. |
| 5,121,482 A | 6/1992 | Patton |
| 5,125,077 A | 6/1992 | Hall |
| 5,127,003 A | 6/1992 | Doll, Jr. et al. |
| 5,136,580 A | 8/1992 | Videlock et al. |
| 5,140,630 A | 8/1992 | Fry et al. |
| 5,142,568 A | 8/1992 | Ogata et al. |
| 5,144,544 A | 9/1992 | Jenneve et al. |
| 5,146,471 A | 9/1992 | Cowart et al. |
| 5,148,144 A | 9/1992 | Sutterlin et al. |
| 5,150,365 A | 9/1992 | Hirata et al. |
| 5,151,838 A | 9/1992 | Dockery |
| 5,155,466 A | 10/1992 | Go |
| 5,157,711 A | 10/1992 | Shimanuki |
| 5,161,021 A | 11/1992 | Tsai |
| 5,168,510 A | 12/1992 | Hill |
| 5,175,764 A | 12/1992 | Patel et al. |
| 5,179,586 A | 1/1993 | Lee et al. |
| 5,181,240 A | 1/1993 | Sakuragi et al. |
| 5,185,591 A | 2/1993 | Shuey |
| 5,187,865 A | 2/1993 | Dolin, Jr. |
| 5,189,259 A | 2/1993 | Carson et al. |
| 5,192,231 A | 3/1993 | Dolin, Jr. |
| 5,198,796 A | 3/1993 | Hessling, Jr. |
| 5,210,518 A | 5/1993 | Graham et al. |
| 5,210,519 A | 5/1993 | Moore |
| 5,210,788 A | 5/1993 | Nilssen |
| 5,216,704 A | 6/1993 | Williams et al. |
| 5,220,561 A | 6/1993 | Nuhn et al. |
| 5,220,597 A | 6/1993 | Horiuchi |
| 5,224,154 A | 6/1993 | Aldridge et al. |
| 5,235,619 A | 8/1993 | Beyers, II et al. |
| 5,241,283 A | 8/1993 | Sutterlin |
| 5,247,347 A | 9/1993 | Litteral et al. |
| 5,255,267 A | 10/1993 | Hansen et al. |
| 5,257,006 A | 10/1993 | Graham et al. |
| 5,262,755 A | 11/1993 | Mak et al. |
| 5,263,046 A | 11/1993 | Vander Mey |
| 5,264,823 A | 11/1993 | Stevens |
| 5,265,154 A | 11/1993 | Schotz |
| 5,268,666 A | 12/1993 | Michel et al. |
| 5,268,676 A | 12/1993 | Asprey |
| 5,274,631 A | 12/1993 | Bhardwaj |
| 5,278,862 A | 1/1994 | Vander Mey |
| 5,283,637 A | 2/1994 | Goolcharan |
| 5,283,825 A | 2/1994 | Druckman et al. |
| 5,285,477 A | 2/1994 | Leonowich |
| 5,289,359 A | 2/1994 | Ziermann |
| 5,289,461 A | 2/1994 | de Nijs |
| 5,289,476 A | 2/1994 | Johnson et al. |
| 5,297,141 A | 3/1994 | Marum |
| 5,305,312 A | 4/1994 | Fornek et al. |
| 5,311,114 A | 5/1994 | Sambamurthy et al. |
| 5,311,518 A | 5/1994 | Takato et al. |
| 5,311,593 A | 5/1994 | Carmi |
| 5,313,191 A | 5/1994 | Yamashita et al. |
| 5,319,571 A | 6/1994 | Langer et al. |
| 5,319,634 A | 6/1994 | Bartholomew et al. |
| 5,323,461 A | 6/1994 | Rosenbaum et al. |
| 5,334,975 A | 8/1994 | Wachob et al. |
| 5,341,370 A | 8/1994 | Nuhn et al. |
| 5,341,415 A | 8/1994 | Baran |
| 5,343,240 A | 8/1994 | Yu |
| 5,343,514 A | 8/1994 | Snyder |
| 5,345,437 A | 9/1994 | Ogawa |
| 5,347,549 A | 9/1994 | Baumann et al. |
| 5,349,640 A | 9/1994 | Dunn et al. |
| 5,349,644 A | 9/1994 | Massey et al. |
| 5,351,272 A | 9/1994 | Abraham |
| 5,352,957 A | 10/1994 | Werner |
| 5,353,334 A | 10/1994 | O'Sullivan |
| 5,353,409 A | 10/1994 | Asprey et al. |
| 5,355,114 A | 10/1994 | Sutterlin et al. |
| 5,356,311 A | 10/1994 | Liu |
| 5,363,432 A | 11/1994 | Martin et al. |
| 5,368,041 A | 11/1994 | Shambroom |
| 5,369,356 A | 11/1994 | Kinney et al. |
| 5,375,051 A | 12/1994 | Decker et al. |
| 5,379,005 A | 1/1995 | Aden et al. |
| 5,381,459 A | 1/1995 | Lappington |
| 5,381,462 A | 1/1995 | Larson et al. |
| 5,381,804 A | 1/1995 | Shambroom |
| 5,391,932 A | 2/1995 | Small et al. |
| 5,396,636 A | 3/1995 | Gallagher et al. |
| 5,400,068 A | 3/1995 | Ishida et al. |
| 5,400,246 A | 3/1995 | Wilson et al. |
| 5,402,902 A | 4/1995 | Bouley |
| 5,404,127 A | 4/1995 | Lee et al. |
| 5,406,248 A | 4/1995 | Le Van Suu |
| 5,406,249 A | 4/1995 | Pettus |
| 5,406,260 A | 4/1995 | Cummings et al. |
| 5,408,260 A | 4/1995 | Arnon |
| 5,410,292 A | 4/1995 | Le Van Suu |
| 5,410,343 A | 4/1995 | Coddington et al. |
| 5,410,535 A | 4/1995 | Yang et al. |
| 5,412,369 A | 5/1995 | Kirchner |
| 5,414,708 A | 5/1995 | Webber et al. |
| 5,420,572 A | 5/1995 | Dolin, Jr. et al. |
| 5,420,578 A | 5/1995 | O'Brien et al. |
| 5,420,886 A | 5/1995 | Ohmori |
| 5,421,030 A | 5/1995 | Baran |
| 5,422,519 A | 6/1995 | Russell |
| 5,422,929 A | 6/1995 | Hurst et al. |
| 5,424,710 A | 6/1995 | Baumann |
| 5,425,089 A | 6/1995 | Chan et al. |
| 5,428,608 A | 6/1995 | Freeman et al. |
| 5,428,682 A | 6/1995 | Apfel |
| 5,438,678 A | 8/1995 | Smith |
| 5,440,335 A | 8/1995 | Beveridge |
| 5,446,905 A | 8/1995 | Koshiishi |

(56) References Cited

U.S. PATENT DOCUMENTS

| | | |
|---|---|---|
| 5,448,593 A | 9/1995 | Hill |
| 5,448,635 A | 9/1995 | Biehl et al. |
| 5,450,393 A | 9/1995 | Watanabe et al. |
| 5,451,923 A | 9/1995 | Seberger et al. |
| 5,452,289 A | 9/1995 | Sharma et al. |
| 5,452,344 A | 9/1995 | Larson |
| 5,454,008 A | 9/1995 | Baumann et al. |
| 5,457,629 A | 10/1995 | Miller et al. |
| 5,459,459 A | 10/1995 | Lee, Jr. |
| 5,461,629 A | 10/1995 | Sutterlin et al. |
| 5,461,671 A | 10/1995 | Sakuragi et al. |
| 5,463,616 A | 10/1995 | Kruse et al. |
| 5,467,011 A | 11/1995 | Hunt |
| 5,467,384 A | 11/1995 | Skinner, Sr. et al. |
| 5,469,150 A | 11/1995 | Sitte |
| 5,471,190 A * | 11/1995 | Zimmermann ................ 340/9.1 |
| 5,473,517 A | 12/1995 | Blackman |
| 5,475,363 A | 12/1995 | Suzuki et al. |
| 5,475,687 A | 12/1995 | Markkula, Jr. et al. |
| 5,477,091 A | 12/1995 | Fiorina et al. |
| 5,479,447 A | 12/1995 | Chow et al. |
| 5,483,230 A | 1/1996 | Mueller |
| 5,483,574 A | 1/1996 | Yuyama |
| 5,483,656 A | 1/1996 | Oprescu et al. |
| 5,485,040 A | 1/1996 | Sutterlin |
| 5,487,066 A | 1/1996 | McNamara et al. |
| 5,489,894 A | 2/1996 | Murray |
| 5,491,402 A | 2/1996 | Small |
| 5,491,463 A | 2/1996 | Sargeant et al. |
| 5,497,142 A | 3/1996 | Chaffanjon |
| 5,499,241 A | 3/1996 | Thompson et al. |
| 5,500,794 A | 3/1996 | Fujita et al. |
| 5,504,454 A | 4/1996 | Daggett et al. |
| 5,513,251 A | 4/1996 | Rochkind et al. |
| 5,517,172 A | 5/1996 | Chiu |
| 5,519,731 A | 5/1996 | Cioffi |
| 5,521,491 A | 5/1996 | Najam |
| 5,525,962 A | 6/1996 | Tice |
| 5,528,089 A | 6/1996 | Guiset et al. |
| 5,528,507 A | 6/1996 | McNamara et al. |
| 5,530,737 A | 6/1996 | Bartholomew et al. |
| 5,530,748 A | 6/1996 | Ohmori |
| 5,533,101 A | 7/1996 | Miyagawa |
| 5,534,912 A | 7/1996 | Kostreski |
| 5,535,336 A | 7/1996 | Smith et al. |
| 5,539,805 A | 7/1996 | Bushue et al. |
| 5,539,821 A | 7/1996 | Blonder |
| 5,544,164 A | 8/1996 | Baran |
| 5,544,243 A | 8/1996 | Papadopoulos |
| 5,546,385 A | 8/1996 | Caspi et al. |
| 5,548,592 A | 8/1996 | Komarek et al. |
| 5,548,614 A | 8/1996 | Stoll et al. |
| 5,550,836 A | 8/1996 | Albrecht et al. |
| 5,550,900 A | 8/1996 | Ensor et al. |
| 5,553,063 A | 9/1996 | Dickson |
| 5,553,138 A | 9/1996 | Heald et al. |
| 5,554,968 A | 9/1996 | Lee |
| 5,557,612 A | 9/1996 | Bingham |
| 5,559,377 A | 9/1996 | Abraham |
| 5,562,493 A | 10/1996 | Ferrill et al. |
| 5,563,515 A | 10/1996 | Kako |
| 5,563,782 A | 10/1996 | Chen et al. |
| 5,566,233 A | 10/1996 | Liu |
| 5,568,547 A | 10/1996 | Nishimura |
| 5,569,209 A | 10/1996 | Roitman |
| 5,570,085 A | 10/1996 | Bertsch |
| 5,570,355 A | 10/1996 | Dail et al. |
| 5,572,182 A | 11/1996 | De Pinho Filho et al. |
| 5,574,256 A | 11/1996 | Cottone |
| 5,574,748 A | 11/1996 | Vander Mey et al. |
| 5,579,221 A | 11/1996 | Mun |
| 5,579,335 A | 11/1996 | Sutterlin et al. |
| 5,579,486 A | 11/1996 | Oprescu et al. |
| 5,581,229 A | 12/1996 | Hunt |
| 5,581,555 A | 12/1996 | Dubberly et al. |
| 5,581,801 A | 12/1996 | Spriester et al. |
| 5,583,934 A | 12/1996 | Zhou |
| 5,587,692 A | 12/1996 | Graham et al. |
| 5,590,173 A | 12/1996 | Beasley |
| 5,592,482 A | 1/1997 | Abraham |
| 5,592,540 A | 1/1997 | Beveridge |
| 5,594,726 A | 1/1997 | Thompson et al. |
| 5,594,732 A | 1/1997 | Bell et al. |
| 5,594,789 A | 1/1997 | Seazholtz et al. |
| 5,596,631 A | 1/1997 | Chen |
| 5,599,190 A | 2/1997 | Willette |
| 5,604,737 A | 2/1997 | Iwami et al. |
| 5,604,791 A | 2/1997 | Lee |
| 5,608,447 A | 3/1997 | Farry et al. |
| 5,608,725 A | 3/1997 | Grube et al. |
| 5,608,792 A | 3/1997 | Laidler |
| 5,610,552 A | 3/1997 | Schlesinger et al. |
| 5,610,916 A | 3/1997 | Kostreski et al. |
| 5,610,922 A | 3/1997 | Balatoni |
| 5,613,130 A | 3/1997 | Teng et al. |
| 5,613,190 A | 3/1997 | Hylton |
| 5,613,191 A | 3/1997 | Hylton et al. |
| 5,614,811 A | 3/1997 | Sagalovich et al. |
| 5,619,252 A | 4/1997 | Nakano |
| 5,619,505 A | 4/1997 | Grube et al. |
| 5,621,455 A | 4/1997 | Rogers et al. |
| 5,623,537 A | 4/1997 | Ensor et al. |
| 5,625,651 A | 4/1997 | Cioffi |
| 5,625,677 A | 4/1997 | Feiertag et al. |
| 5,625,863 A | 4/1997 | Abraham |
| 5,627,501 A | 5/1997 | Biran et al. |
| 5,627,827 A | 5/1997 | Dale et al. |
| 5,630,204 A | 5/1997 | Hylton et al. |
| 5,635,896 A | 6/1997 | Tinsley et al. |
| 5,641,360 A | 6/1997 | Bischof |
| 5,644,286 A | 7/1997 | Brosh et al. |
| 5,646,983 A | 7/1997 | Suffern et al. |
| 5,651,696 A | 7/1997 | Jennison |
| 5,652,893 A | 7/1997 | Ben-Meir et al. |
| 5,659,608 A | 8/1997 | Stiefel |
| 5,664,826 A | 9/1997 | Wilkens |
| 5,668,814 A | 9/1997 | Balatoni |
| 5,668,857 A | 9/1997 | McHale |
| 5,671,220 A | 9/1997 | Tonomura |
| 5,673,290 A | 9/1997 | Cioffi |
| 5,675,375 A | 10/1997 | Riffee |
| 5,675,813 A | 10/1997 | Holmdahl |
| 5,680,397 A | 10/1997 | Christensen et al. |
| 5,682,423 A | 10/1997 | Walker |
| 5,684,450 A | 11/1997 | Brown |
| 5,684,826 A | 11/1997 | Ratner |
| 5,689,230 A | 11/1997 | Merwin et al. |
| 5,689,242 A | 11/1997 | Sims et al. |
| 5,691,691 A | 11/1997 | Merwin et al. |
| 5,694,108 A | 12/1997 | Shuey |
| 5,696,790 A | 12/1997 | Graham et al. |
| 5,696,861 A | 12/1997 | Schimmeyer et al. |
| 5,699,276 A | 12/1997 | Roos |
| 5,699,413 A | 12/1997 | Sridhar |
| 5,705,974 A | 1/1998 | Patel et al. |
| 5,706,007 A | 1/1998 | Fragnito et al. |
| 5,706,157 A | 1/1998 | Galecki et al. |
| 5,708,701 A | 1/1998 | Houvig et al. |
| 5,708,705 A | 1/1998 | Yamashita et al. |
| 5,712,614 A | 1/1998 | Patel et al. |
| 5,712,977 A | 1/1998 | Glad et al. |
| 5,717,685 A | 2/1998 | Abraham |
| 5,726,980 A | 3/1998 | Rickard |
| 5,727,004 A | 3/1998 | Propp et al. |
| 5,727,025 A | 3/1998 | Maryanka |
| 5,729,824 A | 3/1998 | O'Neill et al. |
| 5,731,664 A | 3/1998 | Posa |
| RE35,774 E | 4/1998 | Moura et al. |
| 5,736,965 A | 4/1998 | Mosebrook et al. |
| 5,737,333 A | 4/1998 | Civanlar et al. |
| 5,742,527 A | 4/1998 | Rybicki et al. |
| 5,742,596 A | 4/1998 | Baratz et al. |
| 5,746,634 A | 5/1998 | Jankowski et al. |
| 5,748,104 A | 5/1998 | Argyroudis et al. |

(56) References Cited

U.S. PATENT DOCUMENTS

| | | |
|---|---|---|
| 5,748,634 A | 5/1998 | Sokol et al. |
| 5,748,671 A | 5/1998 | Sutterlin et al. |
| 5,751,701 A | 5/1998 | Langberg et al. |
| 5,754,539 A | 5/1998 | Metz et al. |
| 5,756,280 A | 5/1998 | Soora et al. |
| 5,757,803 A | 5/1998 | Russell et al. |
| 5,757,936 A | 5/1998 | Lee |
| 5,764,743 A | 6/1998 | Goedken et al. |
| 5,767,895 A | 6/1998 | Yashiro et al. |
| 5,768,279 A | 6/1998 | Barn et al. |
| 5,771,236 A | 6/1998 | Sansom et al. |
| 5,774,526 A | 6/1998 | Propp et al. |
| 5,774,789 A | 6/1998 | van der Kaay et al. |
| 5,777,544 A | 7/1998 | Vander Mey et al. |
| 5,777,545 A | 7/1998 | Patel et al. |
| 5,777,769 A | 7/1998 | Coutinho |
| 5,778,303 A | 7/1998 | Shinozaki et al. |
| 5,781,617 A | 7/1998 | McHale et al. |
| 5,781,844 A | 7/1998 | Spriester et al. |
| 5,787,047 A | 7/1998 | Norris et al. |
| 5,787,115 A | 7/1998 | Turnbull et al. |
| 5,790,548 A | 8/1998 | Sistanizadeh et al. |
| 5,793,413 A | 8/1998 | Hylton et al. |
| 5,796,739 A | 8/1998 | Kim et al. |
| 5,796,965 A | 8/1998 | Choi et al. |
| 5,799,069 A | 8/1998 | Weston et al. |
| 5,799,196 A | 8/1998 | Flannery |
| 5,801,635 A | 9/1998 | Price |
| 5,802,173 A | 9/1998 | Hamilton-Piercy et al. |
| 5,802,177 A | 9/1998 | Daniel et al. |
| 5,802,283 A | 9/1998 | Grady et al. |
| 5,805,053 A | 9/1998 | Patel et al. |
| 5,805,591 A | 9/1998 | Naboulsi et al. |
| 5,805,597 A | 9/1998 | Edem |
| 5,805,806 A | 9/1998 | McArthur |
| 5,809,033 A | 9/1998 | Turner et al. |
| 5,809,431 A | 9/1998 | Bustamante et al. |
| 5,812,786 A | 9/1998 | Seazholtz et al. |
| 5,815,086 A | 9/1998 | Ivie et al. |
| 5,815,681 A | 9/1998 | Kikinis |
| 5,818,127 A | 10/1998 | Abraham |
| 5,818,710 A | 10/1998 | LeVan Suu |
| 5,818,725 A | 10/1998 | McNamara et al. |
| 5,818,821 A | 10/1998 | Schurig |
| 5,822,374 A | 10/1998 | Levin |
| 5,822,677 A | 10/1998 | Peyrovian |
| 5,822,678 A | 10/1998 | Evanyk |
| 5,826,196 A | 10/1998 | Cuthrell |
| 5,828,293 A | 10/1998 | Rickard |
| 5,828,558 A | 10/1998 | Korcharz et al. |
| 5,828,821 A | 10/1998 | Hoshina et al. |
| 5,832,057 A | 11/1998 | Furman |
| 5,832,364 A | 11/1998 | Gustafson |
| 5,833,350 A | 11/1998 | Moreland |
| 5,835,005 A | 11/1998 | Furukawa et al. |
| 5,838,777 A | 11/1998 | Chang et al. |
| 5,838,989 A | 11/1998 | Hutchison et al. |
| 5,841,360 A | 11/1998 | Binder |
| 5,841,840 A | 11/1998 | Smith et al. |
| 5,841,841 A | 11/1998 | Dodds et al. |
| 5,842,032 A | 11/1998 | Bertsch |
| 5,842,111 A | 11/1998 | Byers |
| 5,844,596 A | 12/1998 | Goodman |
| 5,844,789 A | 12/1998 | Wynn |
| 5,844,888 A | 12/1998 | Markkula, Jr. et al. |
| 5,844,949 A | 12/1998 | Hershey et al. |
| 5,845,190 A | 12/1998 | Bushue et al. |
| 5,845,201 A | 12/1998 | Funke et al. |
| 5,848,054 A | 12/1998 | Mosebrook et al. |
| 5,848,150 A | 12/1998 | Bingel |
| 5,848,376 A | 12/1998 | Steiner et al. |
| 5,859,584 A | 1/1999 | Counsell |
| 5,859,596 A | 1/1999 | McRae |
| 5,864,086 A | 1/1999 | Ettmuller |
| 5,864,284 A | 1/1999 | Sanderson |
| 5,870,016 A | 2/1999 | Shrestha |
| 5,878,047 A | 3/1999 | Ganek et al. |
| 5,878,133 A | 3/1999 | Zhou et al. |
| 5,881,142 A | 3/1999 | Frankel et al. |
| 5,883,896 A | 3/1999 | Brieskorn |
| 5,884,086 A | 3/1999 | Amoni et al. |
| 5,886,732 A | 3/1999 | Humpleman |
| 5,889,765 A | 3/1999 | Gibbs |
| 5,889,856 A | 3/1999 | O'Toole et al. |
| 5,892,430 A | 4/1999 | Wiesman et al. |
| 5,892,764 A | 4/1999 | Riemann et al. |
| 5,892,792 A | 4/1999 | Walley |
| 5,892,795 A | 4/1999 | Paret |
| 5,895,888 A | 4/1999 | Arenas et al. |
| 5,895,985 A | 4/1999 | Fischer |
| 5,896,443 A | 4/1999 | Dichter |
| 5,896,556 A | 4/1999 | Moreland et al. |
| 5,898,347 A | 4/1999 | Harford |
| 5,898,761 A | 4/1999 | McHale et al. |
| 5,900,584 A | 5/1999 | Cady et al. |
| 5,903,213 A | 5/1999 | Hodge et al. |
| 5,903,572 A | 5/1999 | Wright et al. |
| 5,903,594 A | 5/1999 | Saulnier et al. |
| 5,903,643 A | 5/1999 | Bruhnke |
| 5,905,442 A | 5/1999 | Mosebrook et al. |
| 5,905,781 A | 5/1999 | McHale et al. |
| 5,905,786 A | 5/1999 | Hoopes |
| 5,910,970 A | 6/1999 | Lu |
| 5,911,119 A | 6/1999 | Bartholomew et al. |
| 5,911,123 A | 6/1999 | Shaffer et al. |
| 5,912,895 A | 6/1999 | Terry et al. |
| 5,917,624 A | 6/1999 | Wagner |
| 5,917,814 A | 6/1999 | Balatoni |
| 5,919,060 A | 7/1999 | Lee |
| 5,922,047 A | 7/1999 | Newlin et al. |
| 5,926,479 A | 7/1999 | Baran |
| 5,929,748 A | 7/1999 | Odinak |
| 5,929,749 A | 7/1999 | Slonim et al. |
| 5,929,896 A | 7/1999 | Goodman et al. |
| 5,930,340 A | 7/1999 | Bell |
| 5,933,073 A | 8/1999 | Shuey |
| 5,936,952 A | 8/1999 | Lecomte |
| 5,936,963 A | 8/1999 | Saussy |
| 5,937,055 A | 8/1999 | Kaplan |
| 5,937,342 A | 8/1999 | Kline |
| 5,938,757 A | 8/1999 | Bertsch |
| 5,939,801 A | 8/1999 | Bouffard et al. |
| 5,940,400 A | 8/1999 | Eastmond et al. |
| 5,940,479 A | 8/1999 | Guy et al. |
| 5,940,738 A | 8/1999 | Rao |
| 5,943,404 A | 8/1999 | Sansom et al. |
| 5,944,831 A | 8/1999 | Pate et al. |
| 5,949,327 A | 9/1999 | Brown |
| 5,949,473 A | 9/1999 | Goodman |
| 5,949,476 A | 9/1999 | Pocock et al. |
| 5,952,914 A | 9/1999 | Wynn |
| 5,956,323 A | 9/1999 | Bowie |
| 5,960,066 A | 9/1999 | Hartmann et al. |
| 5,960,208 A | 9/1999 | Obata et al. |
| 5,961,345 A | 10/1999 | Finn et al. |
| 5,963,539 A | 10/1999 | Webber, Jr. et al. |
| 5,963,595 A | 10/1999 | Graham et al. |
| 5,963,620 A | 10/1999 | Frankel et al. |
| 5,963,844 A | 10/1999 | Dail |
| 5,968,118 A | 10/1999 | Sutton, Jr. |
| 5,970,127 A | 10/1999 | Smith et al. |
| 5,973,942 A | 10/1999 | Nelson et al. |
| 5,974,553 A | 10/1999 | Gandar |
| 5,977,650 A | 11/1999 | Rickard et al. |
| 5,977,913 A | 11/1999 | Christ |
| 5,978,373 A | 11/1999 | Hoff et al. |
| 5,982,052 A | 11/1999 | Sosnowski |
| 5,982,276 A | 11/1999 | Stewart |
| 5,982,784 A | 11/1999 | Bell |
| 5,982,854 A | 11/1999 | Ehreth |
| 5,987,061 A | 11/1999 | Chen |
| 5,990,577 A | 11/1999 | Kamioka et al. |
| 5,991,311 A | 11/1999 | Long et al. |
| 5,991,831 A | 11/1999 | Lee et al. |

(56) References Cited

U.S. PATENT DOCUMENTS

| | | |
|---|---|---|
| 5,991,885 A | 11/1999 | Chang et al. |
| 5,994,998 A | 11/1999 | Fisher et al. |
| 5,995,598 A | 11/1999 | Berstis |
| 5,999,518 A | 12/1999 | Nattkemper et al. |
| 5,999,612 A | 12/1999 | Dunn et al. |
| 6,002,638 A | 12/1999 | John |
| 6,002,682 A | 12/1999 | Bellenger et al. |
| 6,002,722 A | 12/1999 | Wu |
| 6,005,476 A | 12/1999 | Valiulis |
| 6,005,873 A | 12/1999 | Amit |
| 6,009,041 A | 12/1999 | Rolandi et al. |
| 6,009,465 A | 12/1999 | Decker et al. |
| 6,009,479 A * | 12/1999 | Jeffries .............................. 710/8 |
| 6,010,228 A | 1/2000 | Blackman et al. |
| 6,011,781 A | 1/2000 | Bell |
| 6,011,794 A | 1/2000 | Mordowitz et al. |
| 6,011,910 A | 1/2000 | Chau et al. |
| 6,014,386 A | 1/2000 | Abraham |
| 6,014,431 A | 1/2000 | McHale et al. |
| 6,016,519 A | 1/2000 | Chida et al. |
| 6,018,690 A | 1/2000 | Saito et al. |
| 6,021,158 A | 2/2000 | Schurr et al. |
| 6,025,945 A | 2/2000 | Nyu et al. |
| 6,026,078 A | 2/2000 | Smith |
| 6,026,150 A | 2/2000 | Frank et al. |
| 6,026,160 A | 2/2000 | Staber et al. |
| 6,028,867 A | 2/2000 | Rawson et al. |
| 6,029,047 A | 2/2000 | Ishida et al. |
| 6,032,057 A | 2/2000 | Kiiski |
| 6,033,101 A | 3/2000 | Reddick et al. |
| 6,034,988 A | 3/2000 | Vandermey et al. |
| 6,037,678 A | 3/2000 | Rickard |
| 6,038,300 A | 3/2000 | Hartmann et al. |
| 6,038,425 A | 3/2000 | Jeffrey |
| 6,038,457 A | 3/2000 | Barkat |
| 6,040,759 A | 3/2000 | Sanderson |
| 6,047,055 A | 4/2000 | Carkner et al. |
| 6,049,471 A | 4/2000 | Korcharz et al. |
| 6,049,531 A | 4/2000 | Roy |
| 6,049,881 A | 4/2000 | Massman et al. |
| 6,052,380 A | 4/2000 | Bell |
| 6,055,242 A | 4/2000 | Doshi et al. |
| 6,055,268 A | 4/2000 | Timm et al. |
| 6,055,435 A | 4/2000 | Smith et al. |
| 6,055,633 A | 4/2000 | Schrier |
| 6,061,261 A | 5/2000 | Chen et al. |
| 6,061,357 A | 5/2000 | Olshansky et al. |
| 6,061,392 A | 5/2000 | Bremer et al. |
| 6,064,422 A | 5/2000 | Goolcharan et al. |
| 6,064,673 A | 5/2000 | Anderson et al. |
| 6,069,588 A | 5/2000 | O'Neill, Jr. |
| 6,069,879 A | 5/2000 | Chatter |
| 6,069,890 A | 5/2000 | White et al. |
| 6,069,899 A | 5/2000 | Foley |
| 6,072,779 A | 6/2000 | Tzannes et al. |
| 6,072,810 A | 6/2000 | Van der Putten et al. |
| 6,075,784 A | 6/2000 | Frankel et al. |
| 6,075,787 A | 6/2000 | Bobeck et al. |
| 6,081,519 A | 6/2000 | Petler |
| 6,081,533 A | 6/2000 | Laubach et al. |
| 6,084,758 A | 7/2000 | Clarey et al. |
| 6,087,835 A | 7/2000 | Haneda |
| 6,087,860 A | 7/2000 | Liu et al. |
| 6,088,368 A | 7/2000 | Rubinstain et al. |
| 6,091,932 A | 7/2000 | Langlais |
| 6,094,441 A | 7/2000 | Jung et al. |
| 6,095,667 A | 8/2000 | Kamihara et al. |
| 6,095,867 A | 8/2000 | Brandt et al. |
| 6,097,761 A | 8/2000 | Buhring et al. |
| 6,097,801 A | 8/2000 | Williams et al. |
| 6,101,341 A | 8/2000 | Manabe |
| 6,104,707 A | 8/2000 | Abraham |
| 6,107,656 A | 8/2000 | Igarashi |
| 6,107,912 A | 8/2000 | Bullock et al. |
| 6,108,330 A | 8/2000 | Bhatia et al. |
| 6,108,331 A | 8/2000 | Thompson |
| 6,109,959 A | 8/2000 | Burlinson et al. |
| 6,111,595 A | 8/2000 | Hertrich |
| 6,111,764 A | 8/2000 | Atou et al. |
| 6,111,936 A | 8/2000 | Bremer |
| 6,112,232 A | 8/2000 | Shahar et al. |
| 6,114,632 A | 9/2000 | Planas, Sr. et al. |
| 6,114,970 A | 9/2000 | Kirson et al. |
| 6,115,429 A | 9/2000 | Huang |
| 6,115,468 A | 9/2000 | De Nicolo |
| 6,115,755 A | 9/2000 | Krishan |
| 6,115,822 A | 9/2000 | Kim et al. |
| 6,123,577 A | 9/2000 | Contois et al. |
| 6,125,448 A | 9/2000 | Schwan et al. |
| 6,126,463 A | 10/2000 | Okazaki et al. |
| 6,127,925 A | 10/2000 | Bonsignore et al. |
| 6,128,471 A | 10/2000 | Quelch et al. |
| 6,128,743 A | 10/2000 | Rothenbaum |
| 6,130,879 A | 10/2000 | Liu |
| 6,130,893 A | 10/2000 | Whittaker et al. |
| 6,130,896 A | 10/2000 | Lueker et al. |
| 6,134,235 A | 10/2000 | Goldman et al. |
| 6,134,308 A | 10/2000 | Fallon et al. |
| 6,137,865 A | 10/2000 | Ripy et al. |
| 6,137,866 A | 10/2000 | Staber et al. |
| 6,141,330 A | 10/2000 | Akers |
| 6,141,339 A | 10/2000 | Kaplan et al. |
| 6,141,356 A | 10/2000 | Gorman |
| 6,141,763 A | 10/2000 | Smith et al. |
| 6,144,292 A | 11/2000 | Brown |
| 6,144,399 A | 11/2000 | Manchester et al. |
| 6,148,006 A | 11/2000 | Dyke et al. |
| 6,151,330 A | 11/2000 | Liberman |
| 6,151,480 A | 11/2000 | Fischer et al. |
| 6,154,465 A | 11/2000 | Pickett |
| 6,154,488 A | 11/2000 | Hunt |
| 6,157,292 A | 12/2000 | Piercy et al. |
| 6,157,645 A | 12/2000 | Shobatake |
| 6,157,716 A | 12/2000 | Ortel |
| 6,160,795 A | 12/2000 | Hosemann |
| 6,160,880 A | 12/2000 | Allen |
| 6,161,134 A | 12/2000 | Wang et al. |
| 6,166,496 A | 12/2000 | Lys et al. |
| 6,167,043 A | 12/2000 | Frantz |
| 6,167,120 A | 12/2000 | Kikinis |
| 6,169,795 B1 | 1/2001 | Dunn et al. |
| 6,175,556 B1 | 1/2001 | Allen, Jr. et al. |
| 6,175,860 B1 | 1/2001 | Gaucher |
| 6,177,884 B1 | 1/2001 | Hunt et al. |
| 6,178,161 B1 | 1/2001 | Terry |
| 6,178,455 B1 | 1/2001 | Schutte et al. |
| 6,178,514 B1 | 1/2001 | Wood |
| 6,181,715 B1 | 1/2001 | Phillips et al. |
| 6,181,775 B1 | 1/2001 | Bella |
| 6,181,783 B1 | 1/2001 | Goodman |
| 6,185,284 B1 | 2/2001 | Goodman |
| 6,186,826 B1 | 2/2001 | Weikle |
| 6,188,314 B1 | 2/2001 | Wallace et al. |
| 6,188,557 B1 | 2/2001 | Chaudhry |
| 6,192,399 B1 | 2/2001 | Goodman |
| 6,195,339 B1 | 2/2001 | Erite et al. |
| 6,195,706 B1 | 2/2001 | Scott |
| 6,202,211 B1 | 3/2001 | Williams, Jr. |
| 6,205,202 B1 | 3/2001 | Yoshida et al. |
| 6,205,495 B1 | 3/2001 | Gilbert et al. |
| 6,207,895 B1 | 3/2001 | Engel |
| 6,208,637 B1 | 3/2001 | Eames |
| 6,212,204 B1 | 4/2001 | Depue |
| 6,212,227 B1 | 4/2001 | Ko et al. |
| 6,212,274 B1 | 4/2001 | Ninh |
| 6,212,658 B1 | 4/2001 | Le Van Suu |
| 6,215,789 B1 | 4/2001 | Keenan et al. |
| 6,215,799 B1 | 4/2001 | Mitchell et al. |
| 6,215,855 B1 | 4/2001 | Schneider |
| 6,216,160 B1 | 4/2001 | Dichter |
| 6,218,930 B1 | 4/2001 | Katzenberg et al. |
| 6,218,931 B1 | 4/2001 | Asghar et al. |
| 6,219,409 B1 | 4/2001 | Smith et al. |
| 6,222,124 B1 | 4/2001 | Pritchard et al. |

(56) References Cited

U.S. PATENT DOCUMENTS

| | | |
|---|---|---|
| 6,222,853 B1 | 4/2001 | Marttinen et al. |
| 6,227,499 B1 | 5/2001 | Jennison et al. |
| 6,229,433 B1 | 5/2001 | Rye et al. |
| 6,229,818 B1 | 5/2001 | Bell |
| 6,236,653 B1 | 5/2001 | Dalton et al. |
| 6,236,664 B1 | 5/2001 | Erreygers |
| 6,236,718 B1 | 5/2001 | Goodman |
| 6,239,672 B1 | 5/2001 | Lutz, Jr. et al. |
| 6,240,091 B1 | 5/2001 | Ginzboorg et al. |
| 6,240,166 B1 | 5/2001 | Collin et al. |
| 6,243,394 B1 | 6/2001 | Deng |
| 6,243,413 B1 | 6/2001 | Beukema |
| 6,243,446 B1 | 6/2001 | Goodman |
| 6,243,571 B1 | 6/2001 | Bullock et al. |
| 6,243,818 B1 | 6/2001 | Schwan et al. |
| 6,246,695 B1 | 6/2001 | Seazholtz et al. |
| 6,246,716 B1 | 6/2001 | Schneider |
| 6,246,748 B1 | 6/2001 | Yano |
| 6,246,868 B1 | 6/2001 | Bullock et al. |
| 6,249,213 B1 | 6/2001 | Horne |
| 6,252,754 B1 | 6/2001 | Chaudhry |
| 6,252,755 B1 | 6/2001 | Willer |
| 6,252,957 B1 | 6/2001 | Jauregui et al. |
| 6,256,518 B1 | 7/2001 | Buhrmann |
| 6,259,676 B1 | 7/2001 | Kellock et al. |
| 6,259,775 B1 | 7/2001 | Alpert et al. |
| 6,266,348 B1 | 7/2001 | Gross et al. |
| 6,272,209 B1 | 8/2001 | Bridger et al. |
| 6,272,219 B1 | 8/2001 | De Bruycker et al. |
| 6,272,551 B1 | 8/2001 | Martin et al. |
| 6,275,144 B1 | 8/2001 | Rumbaugh |
| 6,278,769 B1 | 8/2001 | Bella |
| 6,281,784 B1 | 8/2001 | Redgate et al. |
| 6,282,075 B1 | 8/2001 | Chaudhry |
| 6,282,189 B1 | 8/2001 | Eames |
| 6,282,238 B1 | 8/2001 | Landry |
| 6,282,277 B1 | 8/2001 | DeBalko |
| 6,282,405 B1 | 8/2001 | Brown |
| 6,283,789 B1 | 9/2001 | Tsai |
| 6,286,049 B1 | 9/2001 | Rajakarunanayake et al. |
| 6,288,334 B1 | 9/2001 | Hennum |
| 6,288,631 B1 | 9/2001 | Shinozaki et al. |
| 6,288,632 B1 | 9/2001 | Hoctor et al. |
| 6,290,141 B1 | 9/2001 | Park et al. |
| 6,292,467 B1 | 9/2001 | Keller |
| 6,292,517 B1 | 9/2001 | Jeffress et al. |
| 6,295,356 B1 | 9/2001 | De Nicolo |
| 6,297,450 B1 | 10/2001 | Yu |
| 6,298,037 B1 | 10/2001 | Sharifi |
| 6,300,881 B1 | 10/2001 | Yee et al. |
| 6,301,337 B1 | 10/2001 | Scholtz et al. |
| 6,301,527 B1 | 10/2001 | Butland et al. |
| 6,308,215 B1 | 10/2001 | Kolbet et al. |
| 6,308,240 B1 | 10/2001 | De Nicolo |
| 6,310,286 B1 | 10/2001 | Troxel et al. |
| 6,310,781 B1 | 10/2001 | Karam |
| 6,310,894 B1 | 10/2001 | Counterman |
| 6,310,909 B1 | 10/2001 | Jones |
| 6,310,940 B1 | 10/2001 | Ratz |
| 6,314,102 B1 | 11/2001 | Czerwiec et al. |
| 6,317,839 B1 | 11/2001 | Wells |
| 6,317,884 B1 | 11/2001 | Eames |
| 6,320,494 B1 | 11/2001 | Bartels et al. |
| 6,320,866 B2 | 11/2001 | Wolf et al. |
| 6,320,900 B1 | 11/2001 | Liu |
| 6,324,268 B1 | 11/2001 | Balachandran et al. |
| 6,329,937 B1 | 12/2001 | Harman |
| 6,331,814 B1 | 12/2001 | Albano et al. |
| 6,334,219 B1 | 12/2001 | Hill et al. |
| 6,339,594 B1 | 1/2002 | Civanlar et al. |
| 6,345,047 B1 | 2/2002 | Regnier |
| 6,346,875 B1 | 2/2002 | Puckette et al. |
| 6,346,964 B1 | 2/2002 | Rogers et al. |
| 6,348,874 B1 | 2/2002 | Cole et al. |
| 6,348,875 B1 | 2/2002 | Odinak et al. |
| 6,349,098 B1 | 2/2002 | Parruck et al. |
| 6,349,133 B1 | 2/2002 | Matthews et al. |
| 6,353,629 B1 | 3/2002 | Pal |
| 6,357,011 B2 | 3/2002 | Gilbert |
| 6,359,906 B1 | 3/2002 | Dyke et al. |
| 6,362,610 B1 | 3/2002 | Yang |
| 6,362,987 B1 | 3/2002 | Yurek et al. |
| 6,363,066 B1 | 3/2002 | Frimodig |
| 6,364,535 B1 | 4/2002 | Coffey |
| 6,366,143 B1 | 4/2002 | Liu et al. |
| 6,370,149 B1 | 4/2002 | Gorman et al. |
| 6,373,377 B1 | 4/2002 | Sacca et al. |
| 6,373,944 B1 | 4/2002 | Beavers |
| 6,377,163 B1 | 4/2002 | Deller et al. |
| 6,377,874 B1 | 4/2002 | Ykema |
| 6,380,852 B1 | 4/2002 | Hartman |
| 6,383,076 B1 | 5/2002 | Tiedeken |
| 6,385,024 B1 | 5/2002 | Olson |
| 6,385,203 B2 | 5/2002 | McHale et al. |
| 6,388,990 B1 | 5/2002 | Wetzel |
| 6,389,110 B1 | 5/2002 | Fischer et al. |
| 6,389,125 B1 | 5/2002 | Ubowski |
| 6,389,139 B1 | 5/2002 | Curtis et al. |
| 6,393,050 B1 | 5/2002 | Liu |
| 6,393,607 B1 | 5/2002 | Hughes et al. |
| 6,396,391 B1 | 5/2002 | Binder |
| 6,396,392 B1 | 5/2002 | Abraham |
| 6,396,393 B2 | 5/2002 | Yuasa |
| 6,396,837 B1 | 5/2002 | Wang et al. |
| 6,400,815 B1 | 6/2002 | Gilboy et al. |
| 6,404,773 B1 | 6/2002 | Williams et al. |
| 6,404,861 B1 | 6/2002 | Cohen et al. |
| 6,405,027 B1 | 6/2002 | Bell |
| 6,407,987 B1 | 6/2002 | Abraham |
| 6,408,351 B1 | 6/2002 | Hamdi et al. |
| 6,414,952 B2 | 7/2002 | Foley |
| 6,417,762 B1 | 7/2002 | Comer |
| 6,418,558 B1 | 7/2002 | Roberts et al. |
| 6,420,964 B1 | 7/2002 | Nishikawa et al. |
| 6,424,661 B1 | 7/2002 | Bentley |
| 6,426,942 B1 | 7/2002 | Sienel et al. |
| 6,427,237 B1 | 7/2002 | Aranguren et al. |
| 6,430,199 B1 | 8/2002 | Kerpez |
| 6,433,672 B1 | 8/2002 | Shirmard |
| 6,434,123 B1 | 8/2002 | Park |
| 6,438,109 B1 | 8/2002 | Karaoguz et al. |
| 6,441,723 B1 | 8/2002 | Mansfield, Jr. et al. |
| 6,442,129 B1 | 8/2002 | Yonge, III et al. |
| 6,442,195 B1 | 8/2002 | Liu et al. |
| 6,445,087 B1 | 9/2002 | Wang et al. |
| 6,448,899 B1 | 9/2002 | Thompson |
| 6,449,318 B1 | 9/2002 | Rumbaugh |
| 6,449,348 B1 | 9/2002 | Lamb et al. |
| 6,452,923 B1 | 9/2002 | Gerszberg et al. |
| 6,456,714 B2 | 9/2002 | Shima et al. |
| 6,459,175 B1 | 10/2002 | Potega |
| 6,459,275 B1 | 10/2002 | Ewalt et al. |
| 6,459,692 B1 | 10/2002 | Ben-Michael et al. |
| 6,463,051 B1 | 10/2002 | Ford |
| 6,466,572 B1 | 10/2002 | Ethridge et al. |
| 6,470,053 B1 | 10/2002 | Liu |
| 6,470,401 B1 | 10/2002 | Peterson |
| 6,473,495 B1 | 10/2002 | Willer |
| 6,473,608 B1 | 10/2002 | Lehr et al. |
| 6,474,829 B2 | 11/2002 | Clodfelter |
| 6,475,022 B2 | 11/2002 | Tomino et al. |
| 6,477,457 B1 | 11/2002 | Fendt et al. |
| 6,477,595 B1 | 11/2002 | Cohen et al. |
| 6,480,122 B1 | 11/2002 | Oddy et al. |
| 6,480,510 B1 | 11/2002 | Binder |
| 6,481,013 B1 | 11/2002 | Dinwiddie et al. |
| 6,483,902 B1 | 11/2002 | Stewart et al. |
| 6,483,903 B1 | 11/2002 | Itay |
| 6,490,273 B1 | 12/2002 | DeNap et al. |
| 6,492,897 B1 | 12/2002 | Mowery, Jr. |
| 6,493,325 B1 | 12/2002 | Hjalmtysson et al. |
| 6,493,875 B1 | 12/2002 | Eames et al. |
| 6,496,103 B1 | 12/2002 | Weiss et al. |
| 6,496,104 B2 | 12/2002 | Kline |

(56) References Cited

U.S. PATENT DOCUMENTS

| | | |
|---|---|---|
| 6,501,389 B1 | 12/2002 | Aguirre |
| 6,507,322 B2 | 1/2003 | Fang et al. |
| 6,507,647 B1 | 1/2003 | Mandalia |
| 6,510,204 B2 | 1/2003 | De Clercq et al. |
| 6,518,724 B2 | 2/2003 | Janik |
| 6,519,291 B1 | 2/2003 | Dagdeviren |
| 6,522,352 B1 | 2/2003 | Strandwitz et al. |
| 6,522,515 B1 | 2/2003 | Whitney |
| 6,522,662 B1 | 2/2003 | Liu |
| 6,522,728 B1 | 2/2003 | Willer |
| 6,522,730 B1 | 2/2003 | Timm et al. |
| 6,522,731 B2 | 2/2003 | Matsumoto |
| 6,526,516 B1 | 2/2003 | Ishikawa et al. |
| 6,526,581 B1 | 2/2003 | Edson |
| 6,529,443 B2 | 3/2003 | Downey, Jr. et al. |
| 6,532,279 B1 | 3/2003 | Goodman |
| 6,532,280 B1 | 3/2003 | McDonald |
| 6,535,110 B1 | 3/2003 | Arora et al. |
| 6,535,580 B1 | 3/2003 | Strauss et al. |
| 6,535,587 B1 | 3/2003 | Kobayashi |
| 6,535,983 B1 | 3/2003 | McCormack et al. |
| 6,539,011 B1 | 3/2003 | Keenan et al. |
| 6,539,484 B1 | 3/2003 | Cruz |
| 6,541,878 B1 | 4/2003 | Diab |
| 6,542,465 B1 | 4/2003 | Wang |
| 6,542,585 B2 | 4/2003 | Goodman |
| 6,543,940 B2 | 4/2003 | Chu |
| 6,546,024 B1 | 4/2003 | Sharper et al. |
| 6,546,098 B1 | 4/2003 | Henderson |
| 6,546,494 B1 | 4/2003 | Jackson et al. |
| 6,549,120 B1 | 4/2003 | de Buda |
| 6,549,616 B1 | 4/2003 | Binder |
| 6,553,076 B1 | 4/2003 | Huang |
| 6,556,097 B2 | 4/2003 | Coffey |
| 6,556,564 B2 | 4/2003 | Rogers |
| 6,556,581 B1 | 4/2003 | He et al. |
| 6,559,757 B1 | 5/2003 | Deller et al. |
| 6,560,225 B1 | 5/2003 | Czajkowski et al. |
| 6,560,319 B1 | 5/2003 | Binder |
| 6,560,333 B1 | 5/2003 | Consiglio et al. |
| 6,563,418 B1 | 5/2003 | Moon |
| 6,563,816 B1 | 5/2003 | Nodoushani et al. |
| 6,567,981 B1 | 5/2003 | Jeffrey |
| 6,570,869 B1 | 5/2003 | Shankar et al. |
| 6,570,890 B1 | 5/2003 | Keenan et al. |
| 6,571,181 B1 | 5/2003 | Rakshani et al. |
| 6,571,305 B1 | 5/2003 | Engler |
| 6,572,384 B1 | 6/2003 | Marchevsky |
| 6,574,237 B1 | 6/2003 | Bullman et al. |
| 6,574,242 B1 | 6/2003 | Keenan et al. |
| 6,574,313 B1 | 6/2003 | Chea, Jr. et al. |
| 6,574,741 B1 | 6/2003 | Fujimori et al. |
| 6,577,230 B1 | 6/2003 | Wendt et al. |
| 6,577,231 B2 | 6/2003 | Litwin, Jr. et al. |
| 6,577,631 B1 | 6/2003 | Keenan et al. |
| 6,577,882 B1 | 6/2003 | Roos |
| 6,580,254 B2 | 6/2003 | Schofield |
| 6,580,710 B1 | 6/2003 | Bowen et al. |
| 6,580,727 B1 | 6/2003 | Yim et al. |
| 6,580,785 B2 | 6/2003 | Bremer et al. |
| 6,583,719 B2 | 6/2003 | Okada et al. |
| 6,584,122 B1 | 6/2003 | Matthews et al. |
| 6,584,148 B1 | 6/2003 | Zitting et al. |
| 6,584,197 B1 | 6/2003 | Boudreaux, Jr. et al. |
| 6,584,519 B1 | 6/2003 | Russell |
| 6,587,454 B1 | 7/2003 | Lamb |
| 6,587,473 B2 | 7/2003 | Terry et al. |
| 6,587,479 B1 | 7/2003 | Bianchi |
| 6,587,560 B1 | 7/2003 | Scott et al. |
| 6,587,739 B1 | 7/2003 | Abrams et al. |
| 6,597,732 B1 | 7/2003 | Dowling |
| 6,600,734 B1 | 7/2003 | Gernert et al. |
| 6,601,097 B1 | 7/2003 | Cheston et al. |
| 6,603,220 B2 | 8/2003 | Vergnaud |
| 6,603,808 B1 | 8/2003 | Anne et al. |
| 6,608,264 B1 | 8/2003 | Fouladpour |
| 6,608,894 B1 | 8/2003 | Armenta |
| 6,609,927 B2 | 8/2003 | Kidman |
| 6,611,537 B1 | 8/2003 | Edens et al. |
| 6,616,005 B1 | 9/2003 | Pereira et al. |
| 6,624,532 B1 | 9/2003 | Davidow et al. |
| 6,636,505 B1 | 10/2003 | Wang et al. |
| 6,639,913 B1 | 10/2003 | Frankel et al. |
| 6,640,308 B1 | 10/2003 | Keyghobad et al. |
| 6,643,566 B1 | 11/2003 | Lehr et al. |
| 6,648,308 B2 | 11/2003 | Gunnar Rothoff |
| 6,650,622 B1 | 11/2003 | Austerman, III et al. |
| 6,650,662 B1 | 11/2003 | Arnaud et al. |
| 6,653,932 B1 | 11/2003 | Beamish et al. |
| 6,657,994 B1 | 12/2003 | Rajakarunanayake |
| 6,658,098 B2 | 12/2003 | Lamb et al. |
| 6,658,108 B1 | 12/2003 | Bissell et al. |
| 6,658,109 B1 | 12/2003 | Steinke et al. |
| 6,659,947 B1 | 12/2003 | Carter et al. |
| 6,661,892 B1 | 12/2003 | Fischer |
| 6,665,384 B2 | 12/2003 | Daum et al. |
| 6,665,404 B2 | 12/2003 | Cohen |
| 6,671,360 B2 | 12/2003 | Sumiya et al. |
| 6,671,501 B1 | 12/2003 | Dalichau |
| 6,674,843 B1 | 1/2004 | Ham |
| 6,674,845 B2 | 1/2004 | Ayoub et al. |
| 6,678,321 B1 | 1/2004 | Graham et al. |
| 6,678,721 B1 | 1/2004 | Bell |
| 6,680,940 B1 | 1/2004 | Lewin et al. |
| 6,681,013 B1 | 1/2004 | Miyamoto |
| 6,686,832 B2 | 2/2004 | Abraham |
| 6,690,677 B1 | 2/2004 | Binder |
| 6,690,792 B1 | 2/2004 | Robinson et al. |
| 6,693,916 B1 | 2/2004 | Chaplik et al. |
| 6,697,358 B2 | 2/2004 | Bernstein |
| 6,700,970 B1 | 3/2004 | Aronson et al. |
| 6,701,406 B1 | 3/2004 | Chang et al. |
| 6,701,443 B1 | 3/2004 | Bell |
| 6,704,414 B2 | 3/2004 | Murakoshi |
| 6,704,824 B1 | 3/2004 | Goodman |
| 6,710,553 B2 | 3/2004 | Logan |
| 6,710,704 B2 | 3/2004 | Fisher et al. |
| 6,711,138 B1 | 3/2004 | Pai et al. |
| 6,711,260 B1 | 3/2004 | Russell et al. |
| 6,714,534 B1 | 3/2004 | Gerszberg et al. |
| 6,715,087 B1 | 3/2004 | Vergnaud et al. |
| 6,721,365 B1 | 4/2004 | Yin et al. |
| 6,721,419 B1 | 4/2004 | Stell et al. |
| 6,721,790 B1 | 4/2004 | Chen |
| 6,724,750 B1 | 4/2004 | Sun |
| 6,725,059 B1 | 4/2004 | Bell |
| 6,731,627 B1 | 5/2004 | Gupta et al. |
| 6,732,315 B2 | 5/2004 | Yagil et al. |
| 6,732,368 B1 | 5/2004 | Michael et al. |
| 6,735,217 B1 | 5/2004 | Webber, Jr. et al. |
| 6,738,382 B1 | 5/2004 | West et al. |
| 6,738,470 B1 | 5/2004 | Aronovitz |
| 6,738,597 B1 | 5/2004 | Jeung et al. |
| 6,738,641 B1 | 5/2004 | Elsasser |
| 6,741,162 B1 | 5/2004 | Sacca et al. |
| 6,744,883 B1 | 6/2004 | Bingel et al. |
| 6,747,859 B2 | 6/2004 | Walbeck et al. |
| 6,747,995 B1 | 6/2004 | Brown et al. |
| 6,747,996 B2 | 6/2004 | Holloway et al. |
| 6,748,078 B1 | 6/2004 | Posthuma |
| 6,750,398 B1 | 6/2004 | Richardson |
| 6,751,212 B1 | 6/2004 | Kaji et al. |
| 6,754,186 B1 | 6/2004 | Bullman |
| 6,754,235 B2 | 6/2004 | Van Der Putten et al. |
| 6,755,575 B2 | 6/2004 | Kronlund et al. |
| 6,757,382 B1 | 6/2004 | Wilkes, Jr. et al. |
| 6,759,946 B2 | 7/2004 | Sahinoglu et al. |
| 6,760,384 B1 | 7/2004 | Garreau et al. |
| 6,762,675 B1 | 7/2004 | Cafiero et al. |
| 6,763,097 B1 | 7/2004 | Vitenberg |
| 6,763,109 B1 | 7/2004 | Hoskins |
| 6,764,343 B2 | 7/2004 | Ferentz |
| 6,765,149 B1 | 7/2004 | Ku |
| 6,771,750 B1 | 8/2004 | Nayler et al. |

(56) References Cited

U.S. PATENT DOCUMENTS

| | | | |
|---|---|---|---|
| 6,771,773 B1 | 8/2004 | Hanrieder et al. |
| 6,771,774 B1 | 8/2004 | Phan et al. |
| 6,773,632 B1 | 8/2004 | Marshall et al. |
| 6,775,269 B1 | 8/2004 | Kaczmarczyk et al. |
| 6,775,299 B1 | 8/2004 | Olson et al. |
| 6,778,549 B1 | 8/2004 | Keller |
| 6,778,646 B1 | 8/2004 | Sun |
| 6,778,817 B1 | 8/2004 | Bullock et al. |
| 6,779,423 B2 | 8/2004 | Hammons et al. |
| 6,785,296 B1 | 8/2004 | Bell |
| 6,785,532 B1 | 8/2004 | Rickard |
| 6,788,782 B1 | 9/2004 | Fotsch et al. |
| 6,792,323 B2 | 9/2004 | Krzyzanowski et al. |
| 6,795,539 B2 | 9/2004 | Culli et al. |
| 6,798,767 B1 | 9/2004 | Alexander et al. |
| 6,800,957 B2 | 10/2004 | Nerone et al. |
| 6,804,351 B1 | 10/2004 | Karam |
| 6,804,828 B1 | 10/2004 | Shibata |
| 6,806,425 B1 | 10/2004 | O'Neill |
| 6,807,463 B1 | 10/2004 | Cunningham et al. |
| 6,813,343 B1 | 11/2004 | Vitenberg |
| 6,815,844 B2 | 11/2004 | Kovarik |
| 6,816,512 B2 | 11/2004 | Lazarus et al. |
| 6,819,760 B1 | 11/2004 | Nayler |
| 6,823,047 B1 | 11/2004 | Cruickshank |
| 6,825,672 B1 | 11/2004 | Lo et al. |
| 6,826,174 B1 | 11/2004 | Erekson et al. |
| 6,831,921 B2 | 12/2004 | Higgins |
| 6,831,975 B1 | 12/2004 | Easwaran et al. |
| 6,831,976 B1 | 12/2004 | Comerford et al. |
| 6,834,057 B1 | 12/2004 | Rabenko et al. |
| 6,836,546 B1 | 12/2004 | Willer |
| 6,838,997 B1 | 1/2005 | Davidson |
| 6,839,345 B2 | 1/2005 | Lu et al. |
| 6,841,979 B2 | 1/2005 | Pincu et al. |
| 6,842,426 B2 | 1/2005 | Bogardus et al. |
| 6,842,459 B1 | 1/2005 | Binder |
| 6,844,810 B2 | 1/2005 | Cern |
| 6,847,718 B1 | 1/2005 | Hiraoka |
| 6,853,724 B2 | 2/2005 | Wang |
| 6,854,059 B2 | 2/2005 | Gardner |
| 6,854,895 B2 | 2/2005 | Coffey et al. |
| 6,856,616 B1 | 2/2005 | Schuster et al. |
| 6,856,799 B1 | 2/2005 | Ritter |
| 6,862,353 B2 | 3/2005 | Rabenko et al. |
| 6,864,798 B2 | 3/2005 | Janik |
| 6,865,193 B2 | 3/2005 | Terk |
| 6,868,072 B1 | 3/2005 | Lin et al. |
| 6,868,081 B1 | 3/2005 | Akram et al. |
| 6,868,117 B1 | 3/2005 | Mardinian |
| 6,868,265 B2 | 3/2005 | Zodnik |
| 6,870,282 B1 | 3/2005 | Bischoff et al. |
| 6,876,648 B1 | 4/2005 | Lee |
| 6,880,020 B1 | 4/2005 | Rubinstein et al. |
| 6,882,714 B2 | 4/2005 | Mansfield |
| 6,885,674 B2 | 4/2005 | Hunt et al. |
| 6,886,181 B1 | 4/2005 | Dodds et al. |
| 6,889,095 B1 | 5/2005 | Eidson et al. |
| 6,891,881 B2 | 5/2005 | Trachewsky et al. |
| 6,895,089 B2 | 5/2005 | Wang |
| 6,896,551 B2 | 5/2005 | Hauck et al. |
| 6,898,413 B2 | 5/2005 | Yip et al. |
| 6,901,439 B1 | 5/2005 | Bonasia et al. |
| 6,904,134 B2 | 6/2005 | Jeon et al. |
| 6,904,149 B2 | 6/2005 | Keenum et al. |
| 6,906,618 B2 | 6/2005 | Hair, III et al. |
| 6,907,458 B2 | 6/2005 | Tomassetti et al. |
| 6,909,725 B1 | 6/2005 | Chow |
| 6,912,145 B2 | 6/2005 | Hung et al. |
| 6,912,209 B1 | 6/2005 | Thi et al. |
| 6,912,282 B2 | 6/2005 | Karam |
| 6,917,681 B2 | 7/2005 | Robinson et al. |
| 6,922,135 B2 | 7/2005 | Abraham |
| 6,922,407 B2 | 7/2005 | Wu |
| 6,925,089 B2 | 8/2005 | Chow et al. |
| 6,932,624 B1 | 8/2005 | Hoopes et al. |
| 6,933,686 B1 | 8/2005 | Bishel |
| 6,933,835 B2 | 8/2005 | Kline |
| 6,934,170 B2 | 8/2005 | Ooishi |
| 6,934,300 B2 | 8/2005 | Tomassetti et al. |
| 6,934,754 B2 | 8/2005 | West et al. |
| 6,937,056 B2 | 8/2005 | Binder |
| 6,940,918 B1 | 9/2005 | Nayler et al. |
| 6,940,956 B1 | 9/2005 | Leach |
| 6,941,364 B2 | 9/2005 | Kim et al. |
| 6,943,296 B2 | 9/2005 | Perrella et al. |
| 6,943,297 B2 | 9/2005 | Capella |
| 6,943,683 B2 | 9/2005 | Perret |
| 6,946,988 B2 | 9/2005 | Edwards et al. |
| 6,947,287 B1 | 9/2005 | Zansky et al. |
| 6,947,409 B2 | 9/2005 | Iwamura |
| 6,947,736 B2 | 9/2005 | Shaver et al. |
| 6,950,567 B2 | 9/2005 | Kline |
| 6,952,785 B1 | 10/2005 | Diab et al. |
| 6,954,863 B2 | 10/2005 | Mouton |
| 6,955,560 B1 | 10/2005 | Biggs |
| 6,956,462 B2 | 10/2005 | Jetzt |
| 6,956,463 B2 | 10/2005 | Crenella et al. |
| 6,956,826 B1 | 10/2005 | Binder |
| 6,958,680 B2 | 10/2005 | Kline |
| 6,961,303 B1 | 11/2005 | Binder |
| 6,963,559 B2 | 11/2005 | Elo |
| 6,963,936 B2 | 11/2005 | Billington et al. |
| 6,965,302 B2 | 11/2005 | Mollenkopf et al. |
| 6,965,303 B2 | 11/2005 | Mollenkopf |
| 6,967,952 B1 | 11/2005 | Akers et al. |
| 6,972,688 B2 | 12/2005 | Rapaich |
| 6,973,394 B2 | 12/2005 | Jaeger et al. |
| 6,975,209 B2 | 12/2005 | Gromov |
| 6,975,211 B2 | 12/2005 | Atsuta et al. |
| 6,975,713 B1 | 12/2005 | Smith et al. |
| 6,977,507 B1 | 12/2005 | Pannell et al. |
| 6,977,578 B2 | 12/2005 | Kline |
| 6,980,089 B1 | 12/2005 | Kline |
| 6,980,090 B2 | 12/2005 | Mollenkopf |
| 6,980,091 B2 | 12/2005 | White, II et al. |
| 6,980,638 B1 | 12/2005 | Smith et al. |
| 6,981,892 B1 | 1/2006 | Kostelnik |
| 6,982,611 B2 | 1/2006 | Cope |
| 6,985,072 B2 | 1/2006 | Omidi et al. |
| 6,985,713 B2 | 1/2006 | Lehr et al. |
| 6,985,714 B2 | 1/2006 | Akiyama et al. |
| 6,986,071 B2 | 1/2006 | Darshan et al. |
| 6,987,430 B2 | 1/2006 | Wasaki et al. |
| 6,989,733 B2 | 1/2006 | Simonsen et al. |
| 6,989,734 B2 | 1/2006 | Thomas |
| 6,993,289 B2 | 1/2006 | Janik |
| 6,995,657 B2 | 2/2006 | Zalitzky et al. |
| 6,995,658 B2 | 2/2006 | Tustison et al. |
| 6,996,134 B1 | 2/2006 | Renucci et al. |
| 6,996,213 B1 | 2/2006 | De Jong |
| 6,996,458 B2 | 2/2006 | Pincu et al. |
| 6,996,729 B2 | 2/2006 | Volkening et al. |
| 6,998,962 B2 | 2/2006 | Cope et al. |
| 6,998,964 B2 | 2/2006 | Lomax, Jr. et al. |
| 6,999,433 B2 | 2/2006 | Baum |
| 6,999,505 B2 | 2/2006 | Yokoo et al. |
| 7,002,898 B1 | 2/2006 | Lou |
| 7,003,102 B2 | 2/2006 | Kiko |
| 7,006,445 B1 | 2/2006 | Cole et al. |
| 7,007,305 B2 | 2/2006 | Carson et al. |
| 7,009,527 B2 | 3/2006 | Seo |
| 7,009,946 B1 | 3/2006 | Kardach |
| 7,010,002 B2 | 3/2006 | Chow et al. |
| 7,010,050 B2 | 3/2006 | Maryanka |
| 7,012,922 B1 | 3/2006 | Unitt et al. |
| 7,016,368 B2 | 3/2006 | Binder |
| 7,016,377 B1 | 3/2006 | Chun et al. |
| 7,020,130 B2 | 3/2006 | Krause et al. |
| 7,023,809 B1 | 4/2006 | Rubinstein et al. |
| 7,026,730 B1 | 4/2006 | Marshall et al. |
| 7,026,917 B2 | 4/2006 | Berkman |
| 7,027,483 B2 | 4/2006 | Santhoff et al. |
| 7,027,566 B2 | 4/2006 | Bossemeyer, Jr. et al. |

(56) References Cited

U.S. PATENT DOCUMENTS

| | | |
|---|---|---|
| 7,030,733 B2 | 4/2006 | Abbarin |
| 7,031,394 B2 | 4/2006 | Vitenberg |
| 7,034,225 B2 | 4/2006 | Thompson et al. |
| 7,035,270 B2 | 4/2006 | Moore, Jr. et al. |
| 7,035,280 B2 | 4/2006 | Binder |
| 7,046,124 B2 | 5/2006 | Cope et al. |
| 7,046,882 B2 | 5/2006 | Kline |
| 7,046,983 B2 | 5/2006 | Elkayam et al. |
| 7,049,514 B2 | 5/2006 | Brandt et al. |
| 7,049,939 B2 | 5/2006 | Ikeda et al. |
| 7,050,546 B1 | 5/2006 | Richardson et al. |
| 7,053,501 B1 | 5/2006 | Barrass |
| 7,053,756 B2 | 5/2006 | Mollenkopf et al. |
| 7,054,303 B2 | 5/2006 | Miyazaki et al. |
| 7,054,442 B2 | 5/2006 | Weikle |
| 7,058,174 B2 | 6/2006 | Posthuma |
| 7,061,142 B1 | 6/2006 | Marshall |
| 7,064,654 B2 | 6/2006 | Berkman et al. |
| 7,068,649 B2 | 6/2006 | Fisher et al. |
| 7,068,668 B2 | 6/2006 | Feuer |
| 7,068,682 B2 | 6/2006 | Campbell et al. |
| 7,068,781 B2 | 6/2006 | Le Creff et al. |
| 7,072,408 B2 | 7/2006 | Gehlot et al. |
| 7,072,647 B2 | 7/2006 | Maloney et al. |
| 7,072,995 B1 | 7/2006 | Burroughs |
| 7,079,012 B2 | 7/2006 | Wetmore |
| 7,079,647 B2 | 7/2006 | Tomobe |
| 7,081,827 B2 | 7/2006 | Addy |
| 7,082,141 B2 | 7/2006 | Sharma et al. |
| 7,085,238 B2 | 8/2006 | McBeath |
| 7,088,238 B2 | 8/2006 | Karaoguz et al. |
| 7,089,126 B2 | 8/2006 | Muir |
| 7,091,849 B1 | 8/2006 | Henry |
| 7,095,848 B1 | 8/2006 | Fischer et al. |
| 7,095,849 B2 | 8/2006 | Smith et al. |
| 7,098,773 B2 | 8/2006 | Berkman |
| 7,099,368 B2 | 8/2006 | Santhoff et al. |
| 7,099,707 B2 | 8/2006 | Amin et al. |
| 7,106,261 B2 | 9/2006 | Nagel et al. |
| 7,106,721 B1 | 9/2006 | Binder |
| 7,113,574 B1 | 9/2006 | Haas et al. |
| 7,116,685 B2 | 10/2006 | Brown et al. |
| 7,117,272 B2 | 10/2006 | Rimboim et al. |
| 7,117,520 B2 | 10/2006 | Stewart |
| 7,133,278 B2 | 11/2006 | Amdahl et al. |
| 7,133,423 B1 | 11/2006 | Chow et al. |
| 7,135,982 B2 | 11/2006 | Lee |
| 7,136,270 B2 | 11/2006 | Liebenow |
| 7,136,936 B2 | 11/2006 | Chan et al. |
| 7,142,094 B1 | 11/2006 | Davidow et al. |
| 7,142,560 B2 | 11/2006 | Mansfield |
| 7,142,563 B1 | 11/2006 | Lin |
| 7,142,934 B2 | 11/2006 | Janik |
| 7,143,299 B1 | 11/2006 | Rubinstein et al. |
| 7,145,439 B2 | 12/2006 | Darshan et al. |
| 7,145,996 B2 | 12/2006 | Creamer et al. |
| 7,148,799 B2 | 12/2006 | Cern |
| 7,149,182 B1 | 12/2006 | Renucci et al. |
| 7,149,474 B1 | 12/2006 | Mikhak |
| 7,152,168 B2 | 12/2006 | Boynton et al. |
| 7,154,381 B2 | 12/2006 | Lang et al. |
| 7,154,996 B2 | 12/2006 | Strauss |
| 7,155,214 B2 | 12/2006 | Struthers et al. |
| 7,155,622 B2 | 12/2006 | Mancey et al. |
| 7,162,013 B2 | 1/2007 | Gavette et al. |
| 7,162,234 B1 | 1/2007 | Smith |
| 7,162,377 B2 | 1/2007 | Amrod et al. |
| 7,162,650 B2 | 1/2007 | Ke et al. |
| 7,164,346 B2 | 1/2007 | Hunt et al. |
| 7,164,690 B2 | 1/2007 | Limb et al. |
| 7,167,078 B2 | 1/2007 | Pourchot |
| 7,167,923 B2 | 1/2007 | Lo |
| 7,170,194 B2 | 1/2007 | Korcharz et al. |
| 7,170,405 B2 | 1/2007 | Daum et al. |
| 7,171,506 B2 | 1/2007 | Iwamura |
| 7,176,786 B2 | 2/2007 | Kline et al. |
| 7,180,412 B2 | 2/2007 | Bonicatto et al. |
| 7,181,023 B1 | 2/2007 | Andrews et al. |
| 7,183,902 B2 | 2/2007 | Hamburgen et al. |
| 7,187,695 B2 | 3/2007 | Binder |
| 7,190,716 B2 | 3/2007 | Norrell et al. |
| 7,193,149 B2 | 3/2007 | Polanek et al. |
| 7,194,528 B1 | 3/2007 | Davidow |
| 7,194,639 B2 | 3/2007 | Atkinson et al. |
| 7,198,521 B2 | 4/2007 | Hauck et al. |
| 7,199,699 B1 | 4/2007 | Gidge |
| 7,199,706 B2 | 4/2007 | Dawson et al. |
| 7,203,849 B2 | 4/2007 | Dove |
| 7,203,851 B1 | 4/2007 | Lo et al. |
| 7,206,322 B1 | 4/2007 | Garg et al. |
| 7,206,417 B2 | 4/2007 | Nathan |
| 7,207,846 B2 | 4/2007 | Caveney et al. |
| 7,209,719 B2 | 4/2007 | Liebenow |
| 7,209,945 B2 | 4/2007 | Hicks, III et al. |
| 7,215,763 B1 | 5/2007 | Keller et al. |
| 7,221,261 B1 | 5/2007 | Klingensmith et al. |
| 7,221,679 B2 | 5/2007 | Binder |
| 7,224,272 B2 | 5/2007 | White, II et al. |
| 7,225,345 B2 | 5/2007 | Korcharz et al. |
| 7,231,535 B2 | 6/2007 | Le Creff et al. |
| 7,239,627 B2 | 7/2007 | Nattkemper et al. |
| 7,239,628 B1 | 7/2007 | Pendleton et al. |
| 7,240,224 B1 | 7/2007 | Biederman |
| 7,242,729 B1 | 7/2007 | Heistermann et al. |
| 7,245,625 B2 | 7/2007 | Manis et al. |
| 7,247,793 B2 | 7/2007 | Hinkson et al. |
| 7,254,734 B2 | 8/2007 | Lehr et al. |
| 7,256,684 B1 | 8/2007 | Cafiero et al. |
| 7,256,704 B2 | 8/2007 | Yoon et al. |
| 7,257,106 B2 | 8/2007 | Chen et al. |
| 7,257,108 B2 | 8/2007 | Cheston et al. |
| 7,263,362 B1 | 8/2007 | Young et al. |
| 7,265,664 B2 | 9/2007 | Berkman |
| 7,266,344 B2 | 9/2007 | Rodriguez |
| 7,272,669 B2 | 9/2007 | Mattur et al. |
| 7,274,669 B2 | 9/2007 | Czerwiec et al. |
| 7,276,915 B1 | 10/2007 | Euler et al. |
| 7,280,032 B2 | 10/2007 | Aekins et al. |
| 7,281,141 B2 | 10/2007 | Elkayam et al. |
| 7,283,554 B2 | 10/2007 | Ophir et al. |
| 7,292,600 B2 | 11/2007 | Binder |
| 7,292,859 B2 | 11/2007 | Park |
| 7,293,103 B1 | 11/2007 | Lin et al. |
| 7,299,287 B1 | 11/2007 | Rubinstein et al. |
| 7,299,368 B2 | 11/2007 | Peker et al. |
| 7,301,940 B1 | 11/2007 | Bernstein |
| 7,305,006 B1 | 12/2007 | Bella |
| 7,307,510 B2 | 12/2007 | Berkman |
| 7,308,086 B2 | 12/2007 | Yoshitani |
| 7,310,355 B1 | 12/2007 | Krein et al. |
| 7,316,586 B2 | 1/2008 | Anderson et al. |
| 7,319,717 B2 | 1/2008 | Zitting |
| 7,323,968 B2 | 1/2008 | Iwamura |
| 7,324,824 B2 | 1/2008 | Smith |
| 7,327,765 B1 | 2/2008 | Ojard |
| 7,330,695 B2 | 2/2008 | Karschnia et al. |
| 7,331,819 B2 | 2/2008 | Nelson |
| 7,339,458 B2 | 3/2008 | Cern |
| 7,340,051 B2 | 3/2008 | Phillips et al. |
| 7,340,509 B2 | 3/2008 | Daum et al. |
| 7,343,506 B1 | 3/2008 | Fenwick |
| 7,345,998 B2 | 3/2008 | Cregg et al. |
| 7,346,071 B2 | 3/2008 | Bareis |
| 7,349,325 B2 | 3/2008 | Trzeciak et al. |
| 7,353,407 B2 | 4/2008 | Diab et al. |
| 7,356,588 B2 | 4/2008 | Stineman, Jr. et al. |
| 7,363,525 B2 | 4/2008 | Biederman et al. |
| 7,368,798 B2 | 5/2008 | Camagna et al. |
| 7,373,528 B2 | 5/2008 | Schindler |
| 7,375,445 B1 | 5/2008 | Smith |
| 7,376,734 B2 | 5/2008 | Caveney |
| 7,380,044 B1 | 5/2008 | Liburdi |
| 7,382,786 B2 | 6/2008 | Chen et al. |
| 7,401,239 B2 | 7/2008 | Chan et al. |

(56) References Cited

U.S. PATENT DOCUMENTS

| | | |
|---|---|---|
| 7,404,091 B1 | 7/2008 | Gere |
| 7,404,094 B2 | 7/2008 | Lee et al. |
| 7,406,094 B2 | 7/2008 | Propp et al. |
| 7,406,536 B2 | 7/2008 | Efrati et al. |
| 7,406,614 B2 | 7/2008 | Peleg et al. |
| 7,408,949 B2 | 8/2008 | Baum |
| 7,413,471 B2 | 8/2008 | Chan |
| 7,424,031 B2 | 9/2008 | Binder |
| 7,483,524 B2 | 1/2009 | Binder |
| 7,633,966 B2 | 12/2009 | Binder |
| 7,636,373 B2 | 12/2009 | Binder |
| 7,653,033 B2 | 1/2010 | Beach et al. |
| 7,715,441 B2 | 5/2010 | Binder |
| 7,769,030 B2 | 8/2010 | Binder |
| 7,830,858 B2 | 11/2010 | Binder |
| 7,852,874 B2 | 12/2010 | Binder |
| 2001/0011314 A1 | 8/2001 | Gallagher et al. |
| 2001/0030470 A1 | 10/2001 | Waugh et al. |
| 2001/0030950 A1 | 10/2001 | Chen et al. |
| 2001/0038635 A1 | 11/2001 | Rogers |
| 2001/0039660 A1 | 11/2001 | Vasilevsky et al. |
| 2001/0047418 A1 | 11/2001 | White |
| 2002/0006137 A1 | 1/2002 | Rabenko et al. |
| 2002/0011923 A1 | 1/2002 | Cunningham et al. |
| 2002/0015489 A1 | 2/2002 | Ben-David |
| 2002/0021465 A1 | 2/2002 | Moore, Jr. et al. |
| 2002/0024424 A1 | 2/2002 | Burns et al. |
| 2002/0031114 A1 | 3/2002 | Terry et al. |
| 2002/0035624 A1 | 3/2002 | Kim |
| 2002/0037004 A1 | 3/2002 | Bossemeyer et al. |
| 2002/0038153 A1 | 3/2002 | Amodeo et al. |
| 2002/0039388 A1 | 4/2002 | Smart et al. |
| 2002/0056116 A1 | 5/2002 | Smith |
| 2002/0057581 A1 | 5/2002 | Nadav |
| 2002/0059634 A1 | 5/2002 | Terry et al. |
| 2002/0061012 A1 | 5/2002 | Thi et al. |
| 2002/0063584 A1 | 5/2002 | Molenda et al. |
| 2002/0063924 A1 | 5/2002 | Kimbrough et al. |
| 2002/0064039 A1 | 5/2002 | Clodfelter |
| 2002/0069417 A1 | 6/2002 | Kliger et al. |
| 2002/0076038 A1 | 6/2002 | Barrese et al. |
| 2002/0080010 A1 | 6/2002 | Zhang |
| 2002/0097821 A1 | 7/2002 | Hebron et al. |
| 2002/0104009 A1 | 8/2002 | Zodnik |
| 2002/0110236 A1 | 8/2002 | Karnad |
| 2002/0114325 A1 | 8/2002 | Dale et al. |
| 2002/0116720 A1 | 8/2002 | Terry et al. |
| 2002/0118676 A1 | 8/2002 | Tonnby et al. |
| 2002/0128009 A1 | 9/2002 | Boch et al. |
| 2002/0131422 A1 | 9/2002 | Chu et al. |
| 2002/0144159 A1 | 10/2002 | Wu et al. |
| 2002/0145509 A1 | 10/2002 | Karny et al. |
| 2002/0150100 A1 | 10/2002 | White et al. |
| 2002/0150155 A1 | 10/2002 | Florentin et al. |
| 2002/0154629 A1 | 10/2002 | Lohman et al. |
| 2002/0159402 A1 | 10/2002 | Binder |
| 2002/0159512 A1 | 10/2002 | Matsumoto |
| 2002/0166124 A1 | 11/2002 | Gurantz et al. |
| 2002/0166125 A1 | 11/2002 | Fulmer |
| 2002/0174423 A1 | 11/2002 | Fifield et al. |
| 2002/0176567 A1 | 11/2002 | Chen et al. |
| 2002/0180592 A1 | 12/2002 | Gromov |
| 2002/0188762 A1 | 12/2002 | Tomassetti et al. |
| 2002/0194383 A1 | 12/2002 | Cohen et al. |
| 2002/0194605 A1 | 12/2002 | Cohen et al. |
| 2002/0198952 A1 | 12/2002 | Bell |
| 2003/0006881 A1 | 1/2003 | Reyes |
| 2003/0016794 A1 | 1/2003 | Brothers |
| 2003/0035556 A1 | 2/2003 | Curtis et al. |
| 2003/0039257 A1 | 2/2003 | Manis et al. |
| 2003/0046377 A1 | 3/2003 | Daum et al. |
| 2003/0048895 A1 | 3/2003 | Kiko et al. |
| 2003/0061522 A1 | 3/2003 | Ke et al. |
| 2003/0062990 A1 | 4/2003 | Schaeffer, Jr. et al. |
| 2003/0066082 A1 | 4/2003 | Kliger et al. |
| 2003/0067910 A1 | 4/2003 | Razazian et al. |
| 2003/0088706 A1 | 5/2003 | Chan et al. |
| 2003/0090368 A1 | 5/2003 | Ide et al. |
| 2003/0099228 A1 | 5/2003 | Alcock |
| 2003/0103521 A1 | 6/2003 | Raphaeli et al. |
| 2003/0107269 A1 | 6/2003 | Jetzt |
| 2003/0112965 A1 | 6/2003 | McNamara et al. |
| 2003/0133473 A1 | 7/2003 | Manis et al. |
| 2003/0133476 A1 | 7/2003 | Stone et al. |
| 2003/0146765 A1 | 8/2003 | Darshan et al. |
| 2003/0151695 A1 | 8/2003 | Sahlin et al. |
| 2003/0154273 A1 | 8/2003 | Caveney |
| 2003/0154276 A1 | 8/2003 | Caveney |
| 2003/0198246 A1 | 10/2003 | Lifshitz et al. |
| 2003/0198341 A1 | 10/2003 | Smith et al. |
| 2003/0204393 A1 | 10/2003 | Czerwiec et al. |
| 2003/0206623 A1 | 11/2003 | Deichstetter et al. |
| 2003/0207696 A1 | 11/2003 | Willenegger et al. |
| 2004/0006484 A1 | 1/2004 | Manis et al. |
| 2004/0013098 A1 | 1/2004 | Tseng et al. |
| 2004/0033817 A1 | 2/2004 | Gorsuch et al. |
| 2004/0037317 A1 | 2/2004 | Zalitzky et al. |
| 2004/0073597 A1 | 4/2004 | Caveney et al. |
| 2004/0083262 A1 | 4/2004 | Trantow |
| 2004/0087214 A1 | 5/2004 | Cho |
| 2004/0090984 A1 | 5/2004 | Saint-Hilaire et al. |
| 2004/0105539 A1 | 6/2004 | Auzizeau et al. |
| 2004/0107299 A1 | 6/2004 | Lee et al. |
| 2004/0107445 A1 | 6/2004 | Amit |
| 2004/0121648 A1 | 6/2004 | Voros |
| 2004/0130413 A1 | 7/2004 | Mentz et al. |
| 2004/0136373 A1 | 7/2004 | Bareis |
| 2004/0136384 A1 | 7/2004 | Cho |
| 2004/0136388 A1 | 7/2004 | Schaff |
| 2004/0146061 A1 | 7/2004 | Bisceglia et al. |
| 2004/0147232 A1 | 7/2004 | Zodnik |
| 2004/0156513 A1 | 8/2004 | Kaylor et al. |
| 2004/0164619 A1 | 8/2004 | Parker et al. |
| 2004/0170262 A1 | 9/2004 | Ohno |
| 2004/0172658 A1 | 9/2004 | Rakib et al. |
| 2004/0177167 A1 | 9/2004 | Iwamura et al. |
| 2004/0178888 A1 | 9/2004 | Hales et al. |
| 2004/0180573 A1 | 9/2004 | Chen |
| 2004/0198236 A1 | 10/2004 | Paine et al. |
| 2004/0204017 A1 | 10/2004 | Eckel et al. |
| 2004/0204040 A1 | 10/2004 | Heijnen |
| 2004/0208167 A1 | 10/2004 | Kishida |
| 2004/0230846 A1 | 11/2004 | Mancey et al. |
| 2004/0232768 A1 | 11/2004 | Hung et al. |
| 2004/0236967 A1 | 11/2004 | Korcharz et al. |
| 2004/0250273 A1 | 12/2004 | Swix et al. |
| 2004/0268160 A1 | 12/2004 | Atkinson et al. |
| 2005/0015805 A1 | 1/2005 | Iwamura |
| 2005/0018766 A1 | 1/2005 | Iwamura |
| 2005/0038875 A1 | 2/2005 | Park |
| 2005/0047379 A1 | 3/2005 | Boyden et al. |
| 2005/0053087 A1 | 3/2005 | Pulyk |
| 2005/0063108 A1 | 3/2005 | Voll et al. |
| 2005/0073968 A1 | 4/2005 | Perlman |
| 2005/0076148 A1 | 4/2005 | Chan et al. |
| 2005/0076149 A1 | 4/2005 | McKown et al. |
| 2005/0078700 A1 | 4/2005 | Thompson et al. |
| 2005/0086389 A1 | 4/2005 | Chang |
| 2005/0086694 A1 | 4/2005 | Hicks et al. |
| 2005/0097369 A1 | 5/2005 | Bowser et al. |
| 2005/0114325 A1 | 5/2005 | Liu et al. |
| 2005/0125083 A1 | 6/2005 | Kiko |
| 2005/0125507 A1 | 6/2005 | Atias et al. |
| 2005/0136972 A1 | 6/2005 | Smith et al. |
| 2005/0136989 A1 | 6/2005 | Dove |
| 2005/0150100 A1 | 7/2005 | Merdan et al. |
| 2005/0152306 A1 | 7/2005 | Bonnassieux et al. |
| 2005/0152323 A1 | 7/2005 | Bonnassieux et al. |
| 2005/0152337 A1 | 7/2005 | Wurtzel et al. |
| 2005/0177640 A1 | 8/2005 | Rubinstein et al. |
| 2005/0184915 A1 | 8/2005 | Nagel et al. |
| 2005/0194176 A1 | 9/2005 | Johnsen et al. |
| 2005/0201306 A1 | 9/2005 | Engel |
| 2005/0208825 A1 | 9/2005 | Chan |

(56) References Cited

U.S. PATENT DOCUMENTS

| | | |
|---|---|---|
| 2005/0226200 A1 | 10/2005 | Askildsen et al. |
| 2005/0228889 A1 | 10/2005 | Cohen et al. |
| 2005/0239400 A1 | 10/2005 | Narikawa |
| 2005/0245127 A1 | 11/2005 | Nordin et al. |
| 2005/0268120 A1 | 12/2005 | Schindler et al. |
| 2005/0268322 A1 | 12/2005 | Watson |
| 2005/0272372 A1 | 12/2005 | Rodriguez |
| 2005/0273790 A1 | 12/2005 | Kearney, III et al. |
| 2005/0280598 A1 | 12/2005 | Webb et al. |
| 2005/0281326 A1 | 12/2005 | Yu |
| 2006/0006817 A1 | 1/2006 | Chason et al. |
| 2006/0007945 A1 | 1/2006 | Schoettle et al. |
| 2006/0017324 A1 | 1/2006 | Pace et al. |
| 2006/0029210 A1 | 2/2006 | Feugere |
| 2006/0053324 A1 | 3/2006 | Giat et al. |
| 2006/0056444 A1 | 3/2006 | Binder |
| 2006/0079969 A1 | 4/2006 | Seguin |
| 2006/0089230 A1 | 4/2006 | Biederman et al. |
| 2006/0104291 A1 | 5/2006 | Rodriguez et al. |
| 2006/0140178 A1 | 6/2006 | Cheng et al. |
| 2006/0140260 A1 | 6/2006 | Wasaki et al. |
| 2006/0153169 A1 | 7/2006 | Koifman et al. |
| 2006/0165097 A1 | 7/2006 | Caveney |
| 2006/0168459 A1 | 7/2006 | Dwelley et al. |
| 2006/0181398 A1 | 8/2006 | Martich et al. |
| 2006/0193310 A1 | 8/2006 | Landry et al. |
| 2006/0193313 A1 | 8/2006 | Landry et al. |
| 2006/0197387 A1 | 9/2006 | Hung et al. |
| 2006/0215680 A1 | 9/2006 | Camagna |
| 2006/0222086 A1 | 10/2006 | Frye, Jr. |
| 2006/0238250 A1 | 10/2006 | Camagna et al. |
| 2006/0251094 A1 | 11/2006 | Van Vleck et al. |
| 2006/0251159 A1 | 11/2006 | Huotari et al. |
| 2006/0251179 A1 | 11/2006 | Ghoshal |
| 2006/0262727 A1 | 11/2006 | Caveney |
| 2006/0269001 A1 | 11/2006 | Dawson et al. |
| 2006/0280197 A1 | 12/2006 | Stone |
| 2006/0291493 A1 | 12/2006 | Schley-May et al. |
| 2007/0025368 A1 | 2/2007 | Ha et al. |
| 2007/0036171 A1 | 2/2007 | Magin |
| 2007/0041577 A1 | 2/2007 | Ghoshal et al. |
| 2007/0058666 A1 | 3/2007 | Pratt |
| 2007/0082649 A1 | 4/2007 | Chan |
| 2007/0083668 A1 | 4/2007 | Kelsey et al. |
| 2007/0112939 A1 | 5/2007 | Wilson et al. |
| 2007/0167144 A1 | 7/2007 | Koga et al. |
| 2007/0198748 A1 | 8/2007 | Ametsitsi et al. |
| 2007/0206629 A1 | 9/2007 | Choi |
| 2007/0206749 A1 | 9/2007 | Pincu et al. |
| 2007/0208961 A1 | 9/2007 | Ghoshal et al. |
| 2007/0213879 A1 | 9/2007 | Iwamura |
| 2007/0220618 A1 | 9/2007 | Holmes et al. |
| 2007/0236853 A1 | 10/2007 | Crawley |
| 2007/0254714 A1 | 11/2007 | Martich et al. |
| 2007/0260904 A1 | 11/2007 | Camagna et al. |
| 2008/0013612 A1 | 1/2008 | Miller et al. |
| 2008/0013637 A1 | 1/2008 | Kodama et al. |
| 2008/0058018 A1 | 3/2008 | Scheinert |
| 2008/0125187 A1 | 5/2008 | Chang et al. |
| 2008/0136915 A1 | 6/2008 | Iwamura |
| 2008/0140565 A1 | 6/2008 | DeBenedetti et al. |
| 2008/0153415 A1 | 6/2008 | Block et al. |
| 2008/0165463 A1 | 7/2008 | Chan |
| 2008/0186150 A1 | 8/2008 | Kao |

FOREIGN PATENT DOCUMENTS

| | | |
|---|---|---|
| EP | 0355532 A2 | 2/1990 |
| EP | 0385695 A2 | 9/1990 |
| EP | 0961466 A1 | 12/1999 |
| EP | 1343253 A2 | 9/2003 |
| GB | 2368979 A | 5/2002 |
| JP | 55132197 A | 10/1980 |
| JP | 56087192 A | 7/1981 |
| JP | 57204655 A | 12/1982 |
| JP | 58206257 A | 12/1983 |
| JP | 01027358 A | 1/1989 |
| JP | 07336379 A | 12/1995 |
| JP | 09084146 A | 3/1997 |
| JP | 10200544 A | 7/1998 |
| WO | 9623377 A1 | 8/1996 |
| WO | WO-96/23377 A1 | 8/1996 |
| WO | 9750193 A1 | 12/1997 |
| WO | 9802985 A1 | 1/1998 |
| WO | 9827748 A2 | 6/1998 |
| WO | 9831133 A2 | 7/1998 |
| WO | 9935753 A2 | 7/1999 |
| WO | 9953627 A1 | 10/1999 |
| WO | 0007322 A2 | 2/2000 |
| WO | 0028689 A2 | 5/2000 |
| WO | 0128215 A1 | 4/2001 |
| WO | 0143238 A1 | 6/2001 |
| WO | 0180030 A1 | 10/2001 |
| WO | 0219623 A2 | 3/2002 |
| WO | 02091652 A2 | 11/2002 |
| WO | 02102019 A2 | 12/2002 |
| WO | 2005094176 A2 | 10/2005 |
| WO | 2006052216 A1 | 5/2006 |
| WO | 2007069241 A2 | 6/2007 |

OTHER PUBLICATIONS

"Serconet Ltd V Netgear Inc" Case No. CV-06-04646 PJH, Order Construing Claims, 1-27, Jul. 30, 2007.

NetSpeed, "Speed Runner 202 Customer Premise ATM ADSL Router", 1-4, Jan. 1, 1997.

Mandeville, Robert et al, "Forget the Forklift", Data Communications, 11 pages, Sep. 1, 1996.

International Telecommunication Union, "ISDN User-Network Interfaces—Interface Structures and Access Capabilities", I.412, 1988, 7 pages.

"Home Phoneline Networking Alliance", Interface Specification for Home PNA 2.0 10 M8 Technology Link Layer Protocol, pp. 1-77, 1-78, Dec. 1, 1999.

"Release Notes for Cisco uBR904 Cable Access Router for Cisco Ios Release 11.3NA", Text Part No. 78-5546-09, 1-22, Aug. 9, 1999.

"End of Sales, Engineering, and Life for the Cisco uBR924 Cable Access Router", 1-4, Jul. 11, 2001.

"Serconet Ltd V Netgear Inc" Case No. CV-06-04646 PJH, Claim Comparison Chart for USP 6,480,510, 1-37, Jan. 29, 2007.

Society of Cable Telecommunications Engineers, Inc. "Data-Over-Cable Service Interface Specification: DOCSIS 1.0 Radio Frequency Interface (RFI)", ANSI/SCTE (formerly DSS 02-05), Jan. 22, 2002.

Bell Communications Research, Bellcore: Request for Information: Asymmetrical Digital Subscriber Line (ADSL) Systems That Support Simplex High-Bit-Rate Access and POTS in the Copper Loop Plant, Jun. 1, 1991.

"Compaq Deskpro 4000S Series of Personal Computers", 1-133, Jul. 1, 1997.

Bell, Robert, "IEEE Standards Project, P802.9F Draft Standard for Local and Metropolitan Area Netoworks—Supplement to Integrated Services (IS) LAN Interface at the Medium Access Control (MAC) and Physical (PHY) Layers", 1-34, Jul. 8, 1997.

*Serconet, Ltd.*, v. *Netgear. Inc.*Case No. CV-06-04646 PJH, Defendant's Invalidity Contentions, 1-15, Jan. 29, 2007.

"IEEE 802.9A, IEEE Standards for Local and Metropolitan Area Networks: Supplement to Integrated Services (IS) LAN Interface at the Medium Access Control (MAC) and Physical (PHY) Layers: Specification of ISLAN16-T", 344 pages, Feb. 16, 1996.

Dostert, Klaus, "Telecommunications Over the Power Distribution Grid-Possibilities and Limitations" Proceedings, 1997 Int'l Symposium on Power-Line communications and its Applications, 10 pages, Apr. 2, 1997.

Rivkin, Steven R, "Co-Evolution of Electric and Telecommunications Networks", The Electricity Journal , pp. 71-76, May 1, 1998.

LAN Emulation, 16 pages, Nov. 15, 1995.

"Cable Modem Security: Insulating Your Network While Keeping Your Subcribers Safe From Each Other", Oct. 1, 2001.

(56) References Cited

OTHER PUBLICATIONS

Teshima, A, et al, "Still Video Telecommunications Over the Analog Telephone Network", Journal of the Institute of Television Engineers of Japan, vol. 42, No. 11, pp. 1162-1167, Nov. 1, 1988.
Hightower, N.C., "Integrated Voice, Data and Video in the Local Loop", IEEE 1986, pp. 915-919, Jan. 1, 1986.
Cisco, "Internal DOCSIS Configurator File Generator for the Cisco Cable Modem Termination System", Cisco Cable Modem Termination System Feature Guide., 1-22, Oct. 14, 2002.
SX-200 Digital PABX/Circuit Card Descriptions 9109-094-125-NA, Issue 4, Revision 1, pp. 1-48, Nov. 1, 1990.
Beene, G.W., "Design Considerations for a CO-Powered Distributed-Drop PCM Station Carrier", IEEE Transactions on Communications, vol. COM-30, No. 9 , pp. 2022-2028, Sep. 1, 1982.
Gershon, Eugen, "FDDI on Copper with AMD PHY Components"; Advanced Micro Devices Inc., pp. 1-8, Jun. 1, 1991.
"Cisco Ios Software Releases 12.0T Configuring the Cisco uBR900 Series Cable Access Routers", 1-103.
"Powerhouse Wireless Wall Switches", 3 pages, Apr. 5, 2005.
Burranscano, P et al, "Digital Signal Transmission on Power Line Carrier Channels: An Introduction", IEEE Transactions on Power Delivery, vol. PWRD-2, No. 1, pp. 50-56, Jan. 1, 1987.
Horowitz, Paul et al, "Art of Electronics", Second Edition, Cambridge University Press, 1989, pp. 1-205, (Part 1).
Horowitz, Paul et al, "Art of Electronics", Second Edition, Cambridge University Press, 1989, pp. 1-205, (Part 2).
Horowitz, Paul et al, "Art of Electronics", Second Edition, Cambridge University Press, 1989, pp. 1-205, (Part 3).
Horowitz, Paul et al, "Art of Electronics", Second Edition, Cambridge University Press, 1989, pp. 1-205, (Part 4).
Horowitz, Paul et al, "Art of Electronics", Second Edition, Cambridge University Press, 1989, pp. 1-205, (Part 5).
Horowitz, Paul et al, "Art of Electronics", Second Edition, Cambridge University Press, 1989, pp. 1-205, (Part 6).
Platt, Richard, "Why IsoEthernet Will Change the Voice and Video Worlds", IEEE Communications Magazine, vol. 34, Issue 4, Apr. 1996, 55-59.
Marketing Assessment Presentation Entitled "Powerline Telecommunications", 9 pages, Jul. 16, 2002.
Fanshawe, David G.J., "Architectures for Home Systems", Conference , IEEE Colloquium on Home Systems—Information, Entertainment and Control, London, United Kingdom, 4 pages, Oct. 1, 1990.
Sado, W.N. et al, "Personal Communicaitons on Residential Power Lines—Assessment of Channel Parameters"; Fourth IEEE International Conference , pp. 532-537, Nov. 6, 1995.
"DSLPipe Reference Guide"; by Ascend Communications, 162 pages, Jun. 2, 1997.
Fuchs, Harry et al, "Providing Full Duplex Transmission Over Two-Wire Subscriber Loops", Telephony, vol. 208, No. 11, pp. 76,77,78 and 84, Mar. 18, 1985.
*Serconet, Ltd.*, v. *Netgear, Inc.* Case No. CV-06-04646 PJH, Claim Comparison Chart for USP 7,035,280, 1-124, Jan. 29, 2007.
"Webstar TM DPX2203CTM and EPX2203C TM VOIP Cable Modem User's Guide", 1-52, May 1, 2005.
Yamazaki, T. et al, "Home Appliance Technologies", NEC Research and Development, No. 96, pp. 292-299, Mar. 1, 1990.
Communications Technology, "Cable Modem Security: Insulating Your Network While Keeping Your Subscribers Safe from Each Other", 1-6, Oct. 1, 2001.
"Intellon Corporation Test Summary for Transformerless Coupler Study", Intellon No News Wires, DOT/NHTSA Order No. DTNH22-98-P-07632, pp. 1-18, Dec. 24, 1998.
"Air Connect Access Point User Guide, Version 1.0", 1-90, Jan. 1, 2000.
"Quick Installation and Reference for the Model RPSU Redundant Power Supply Unit", Bay Networks, Sep. 1995, 1-15.
"The Mac Reborn; Macworld Sep. 1996", 104-115, Sep. 1, 1996.
"White Paper on Medium Voltage Powerline Communication" (PLC) Networks CIGRE SC D2 WG 14, Broadband PLC, pp. 1-58, Mar. 1, 2005.

Zakowski, Wayne A., "IEEE 802.9 Draft Standard Integrated Services (IS) LAN Interface at the MAC and PHY Layers (IEEE Unapproved Draft)", 1-502, Nov. 8, 1992.
Keller et al, "Performance Bottlenecks in Digital Movie Systems", Proceedings of the 4th International Workshop on Network and Operating System Support for Digital Audio and Video. , pp. 161-172, Jan. 1, 1993.
Tatum, Roger A., "Project Victoria—the 7-in-1 Solution", Telephone Engineer and Management, vol. 90, No. 1, pp. 47-50, Jan. 1, 1986.
St Johns, Mike, "Radio Frequency (RF) Interface Management Information Base for MCNS/DOCSIS Complaint RF Interfaces", pp. 1-67, Feb. 17, 1999.
"DPX2213 TM VOIP Cable Modem User's Guide", 1-52, Aug. 1, 2006.
Lin, Dar-Ying, "On IEEE 802.14 Medium Access Control Protocol", IEEE Communications Survey Fourth Quarter, pp. 1-27, Jan. 1, 1998.
Cable Television Laboratories Inc., Data-Over-Cable Service Interface Specifications: Radio Frequency Interface Specification SP-RFIv1.1-l09-020830, Aug. 30, 2002.
"IEEE 802.9, IEEE Standards for Local and Metropolitan Area Networks: Integrated Services (IS) LAN Interface at the Medium Access Control (MAC) and Physical (PHY) Layers, IEEE Standard 802.9", 1994, 437 pages.
"Using the LonWorks PLT-22 Power Line Transceiver in European Utility Application", Version 1, Echelon Coporation 1996-1999, 118 pages, Jan. 1, 1996.
Cisco Systems, "Cisco Catalyst 5000 Product Announcement : Industry's First Modular, Multilayer-Capable Switching System for the Wiring Closer", 22 pages, Jan. 1, 1996.
Willet, M., "Token-Ring Local Area Networks—An Introduction", IEEE Network Magazine, vol. 1, No. 1., pp. 8 and 9, Jan. 1, 1987.
"Installing the Cisco uBR924 Router, Chapter 3, Cisco uBR924 Router Hardware Installation Guide", 1-16, Mar. 1, 2000.
"New and Changed Commands Reference, Appendix D", Cisco uBR905/uBR925 Cable Access Router Software Configuration Guide, 1-52, Jul. 1, 2001.
"Powerline Network Communications Module" Adaptive Networks, 2 pages, Jan. 1, 2010.
"Video Transmission System—Send Video Over Ordinary Wire—No Coax Required", Javelin Brochure (published before Jul. 3, 1995), 2 pages, Jul. 3, 1995.
Onunga, J. et al, "Distribution Line Communications Using CSMA Access Control with Priority Acknowledgements" IEEE Transactions on Power Delivery, vol. 4, No. 2, pp. 878-886, Apr. 1, 1989.
St.Johns, Michael, "Cable Device Management Information Base for DOCSIS Compliant Cable Modems and Cable Modem Termination Systems", pp. 1-54, Mar. 30, 1999.
Lauback, Mark, "Logical IP Subnetworks over IEE 802.14 Services", pp. 1-36, Mar. 13, 1998.
Funkschau, "CEBus: US Households Are Being Networked", Funkschau, No. 9, 4 pages, Apr. 21, 1989.
3COM, "3ComImpact IQ External ISDN Modem User Guide", 158 pages, Jul. 1, 1997.
Mandeville, Robert et al, "Canned Heat: High Stress Tests Turn Up High-Speed Switches That Burn Through Backbone Bottlenecks", Data Communications of the Web, 10 pages, Feb. 1, 1996.
"Universal Serial Bus Specification" -Rev.1.0 , Sec. 7.2.1-7.2.1.5 pp. 131-135, Jan. 15, 1996.
"LonWorks LPI-10 Link Power Interface Module User's Guide", Echelon Corporation, 37 pages, Jan. 1, 1995.
Lokken, G. et al, "The Proposed Wisconsin Electric Power Company Load Management System Using Power Line Carrier Over Distribution Lines", 1976 National Telecommunications Conference, IEEE , 2.2-12.2-3, Jan. 1, 1976.
"CyberSURFR Cable Modem Specifications", Motorola, 4 pages, Apr. 13, 1998.
"AT and T Practice, SLC 96 Subscriber Loop Carrier System, Remote Terminal Pair Gain Systems", Select Code 363-202-401, Issue 1, Feb. 1982, 506 pages.
"Series V: Data Communication Over the Telephone Network: Interface and Voiceband Modems", 74 pages, Oct. 1, 1996.

(56) References Cited

OTHER PUBLICATIONS

Chow, Peter S. et al, "A Multi-drop in house ADSL Distribution Network", International Conference on Communication., pp. 456-460, Jan. 1, 1994.
"Integrated Services Digital Network (ISDN)", International Telecommunications Union, vol. III, Fascicle III.8, pp. 175-176 and 204-209, Jan. 1, 1988.
"Power Line Communications Solutions" COPYRGT 2002, 2 pages, Jan. 1, 2002.
RAD Data Comm. Ltd., "Token Ring Design Guide", #TR-20-01/94, chapters 1 through 4-21, Jan. 1, 1994.
Adiraju, S and Fijolek, J., Telephony-Return Interface (TRI) Management Information Base for DOCSIS compliant Telephony-Return Cable Modems and Cable Modem Termination Sytems. , pp. 1-27, Apr. 2, 1999.
"PL DSK 2.1 Power Line Smart Transceiver Development Support Kit User's Guide", Echelon Corporation, 2005-2006, 18 pages, Jan. 1, 2005.
"Powerhouse Wireless Remote Controls", 3 pages, Apr. 5, 2005.
"Motorola CableComm CyberSURFR Cable Modem Specifications", 4 pages, Apr. 1, 1998.
Droms, "Dynamic Host Configuration Protocol", 1-45, Mar. 1, 1997.
"Bridging and Routing Features for the Cisco uBR904 Cable Modem, Cisco Ios Release 12.0(3) T", 1-38.
Hoe-Young, Noh, "Home Automation", Korea Information Science Society Review, vol. 7 No. 2 pp. 40-44, Republic of Korea., 1-14, Apr. 1, 1989.
"LonWorks 78kbps Self-Healing Ring Architecture", LonWorks Marketing Bulletin, Echelon Coporation, 6 pages, Aug. 1, 1993.
"Texas Instruments: System Block Diagrams; Power Line Communication (Generic)", COPYRGT 1995-2002, 1 page, Jan. 1, 1995.
"IEEE 802.1D, IEEE International Standard: Information Technology-Telecommunications and Information Exchange Between Systems-Local Area Networks-Media Access Control (MAC) Bridges", 181 pages, Jul. 8, 1993.
Ciciora, Walter et al, "Modern Cable Television Technology: Video, Voice, and Data Communications" , Section 4.5, pp. 205-213, Jan. 1, 1999.
"EIA-600.38 Power Line / RF Symbol Encoding Sublayer"; Revision, Draft Copy, 64 pages, Nov. 15, 1991.
Cable Television Laboratories, Inc., "Data-Over-Cable Service Interface Specifications: Baseline Privacy Plus Interface Specification", SP-BPI+-109-020830, Aug. 30, 2002.
Bienz, Albert, "1+1=1—Oder Das Telefonnetz Als Datennetz", Sysdata, vol. 16, pp. 41-42, Sep. 1, 1985.
Alves, John, "Data Over Voice—A Low Cost LAN Alternative", Communications Show and Conference, MECOM '87, pp. 13-15, Jan. 1, 1987.
"Universal Serial Bus Specification Revision 1.0" pp. 29-30, Sec 4.2.1, Jan. 15, 1996.
Agazzi, O. et al, "Large Scale Integration of Hybrid-Method Digital Subscriber Loops", IEEE Transactions on Communications, vol. COM-30, No. 9, pp. 2095-2108, Sep. 1, 1982.
"*Serconet Ltd* v *Netgear Inc*" Case No. CV-06-04646 PJH Claim Comparison Chart for USP 7,016,368, 1-105, Jan. 29, 2007.
"Ethernet Wireless LAN Systems"; BYTE, 3 pages, Feb. 1, 1996.
"Dedicated Passive Backbone for Power Line Communications", IBM Technical Disclosure Bulletin, pp. 183-185, Jul. 1, 1997.
Woundy, R., "Baseline Privacy Interface Management Information Base for MCNS Complaint Cable Modems and Cable Modem Termination Systems", pp. 1-35, Jul. 1, 1998.
Donnan, Robert et al, "Token Ring Access Method and Physical Layer Specifications", ANSI/IEEE Standard for Local Area Networks, 44 pages, Apr. 29, 1985.
Adaptive Networks, Inc., "AN1000 Powerline Network Communications Chip Set", 1-29 pages, Jan. 1, 1995.
3COM, "3Com Product Details, NBX 2101PE Basic Phone", pp. 1-3, Jan. 18, 2007.
Wakerly, John F., "A Voice/Data/Packet Switching Architecture", David Systems, Inc., 1985, 6 pages.

"Overview, Chapter 1", Cisco uBR905/uBR925 Cable Access Router Software Configuration Guide, 1-18, Jul. 1, 2001.
Azzam, Albert A., High-Speed Cable Modems, pp. 247-570, ISBN: 0-07-006417-2, 1-321, Jan. 1, 1997, Sep. 7, 2013.
Radford, Denny, "Spread-spectrum Data Leap Through AC Power Wiring", IEEE Spectrum, pp. 48-53, Nov. 1, 1996.
Media Access Control (MAC) Parameters, Physical Layer, Medium Attachment Units, and Repeater for 100 Mb/s Operation, Type 100BASE-T (Clauses 21-30); IEEE Standards for Local Metropolitan Area Networks: Supplement to Carrier Sense Multiple Access with Collision Detection (CSMA/CD) Access Method and Physical Layer Specifications; 1995, 200 pages.
Sodeyama T, et al, "Intelligent House", Journal of the Institute of Electronics, Information and Communication Engineers, vol. 72, No. 9, pp. 1024-1026, Sep. 1, 1989.
"MCNS Data-Over-Cable Service Interface Specifications: Baseline Privacy Interface Specification SP-BPI-I02-990319", 1-96, Mar. 1, 1999.
"IEEE P802.9af, Draft Standard for Local and Metropolitan Area Networks—Supplement to Integrated Services (IS) LAN Interface at the Medium Access Control (MAC) and Physical (PHY) Layers", 1997, 1-34.
"Hardware Troubleshooting for Cisco uBR9XX Series Cable Modems, Document ID: 10154", 1-3, Oct. 4, 2005.
Cisco Systems, "Catalyst 5000 Series", Cisco Systems, 1996, pp. 589-600.
"Beginners FAQ for uBR900 Series Cable Modem End Users, Document ID: 14561", 1-2, Oct. 31, 2008.
Jacobs, David et al, "Bandwidth Burglary in Broad Daylight: How to Prevent a Simple Hack", 4 pages, Jan. 1, 2003.
"David Information Manager Technical Overview", Sep. 1988, pp. 1-74.
"AT and T Practice, SLC 24 and 96 Carrier Systems, Channel Unit Installation, Loop Transmission Systems", Select Code 363-202-402, Issue 2, Jul. 1985, 335 pages.
Droms, R., "Dynamic Host Configuration Protocol (DCHCP) Request for Comments 1531", Bucknell University, Oct. 1993, 1-40.
Quigley, Thomas J., "Cablemodem Standards for Advanced Quality of Service Deployments", Digest of Technical Papers, International Conference on Consumer Electronics, pp. 282-283, Jun. 22, 1999.
"Signalling on Low-Voltage Electrical Installations in the Frequency Band 3kHz to 148.5 kHz-Part 4: Filters at the Inferface of the Indoor and Outdoor Electricity Network", CLC SC 105A (Secretariat), pp. 1-11, May 1, 1992.
Campbell, Chris, "Building a Business Case for PLC: Lessons Learned From the Communication Industry Trenches", KPMG Consulting, 5 pages, Jul. 16, 2002.
"HiGain Remote Unit, Engineering Services Technical Practice Section 150-412-181-01, Revision 01", 42 pages, Mar. 31, 1998.
"Introduction to Pyxos FT Platform", Echelon Corporation 2007, 34 pages, Jan. 1, 2007.
Anderson, Milton M., "Video Services on Copper", Conference : ICC 91, International Conference on Communications Conference Record. Denver, CO, pp. 302-306, Jun. 23, 1991.
Pernin, Jean-Louis, "Related Evolution of Subscriber Loop Plant and Residential Data Transmission Needs", Intelcon '79 Exposition Proceedings, Dallas, TX, pp. 596-599, Feb. 26, 1979.
Karia, Arvind J. et al, "A Digital Subscriber Carrier System for the Evolving Subscriber Loop Network", IEEE Transactions on Communications, vol. COM-30, No. 9, pp. 2012, 2014, 2015, Sep. 1, 1982.
"Data Carrier System Allows Simultaneous Voice/Data Transmission for PABX Telephone Systems", Computer Design, vol. 21, No. 5, pp. 68 and 70, May 1, 1982.
Piety, Robert A., "Intrabuilding Data Transmission Using Power-Line Wiring", Hewlett-Packard Journal, pp. 35-40, May 1, 1987.
"SuperStack II Desktop Switch User Guide"; 3Com, 148 pages, Jun. 1, 1997.
Bisaglia, Paola et al, "Receiver Architectures for Home PNA 2.0", Hewlett Packard Laboratories, Bristol UK, 1-6, Oct. 17, 2001.
Cisco Systems, Catalyst 5000 Group Switching Ethernet Modules, 5 pages, May 6, 1996.

(56) References Cited

OTHER PUBLICATIONS

Vry, M.G. et al, "The Design of 1+1 System for Digital Signal Transmission to the Subscriber", NTG-Bachberichte, vol. 73, pp. 36-40, 36-40, Jan. 1, 1980.
Jelski, Robert, "Subscriber Subcarrier System—A New Life", Communications International, vol. 4, No. 5, pp. 29-30, May 1, 1977.
Eldering, Charles et al, "Engineering Requirements for Hybrid Fiber—Coax Telephony Systems", 1994 National Cable Television Association Show, May 1994, 219-231.
Nichols, Keith, "Line Carrier Modems-2: Build a Pair of Line-Carrier Modems (Part 2)", Radio Electronics, 5 total pages, Aug. 1, 1988.
Ross, Floyd E. et al, "IsoEthernet: An Integrated Services LAN", IEEE Communications, vol. 34, Issue 8, Aug. 1996, 74, 79-84.
Dostert, Klaus, "Powerline Communications" Ch. 5, Prentice Hall PTR, Upper Saddle River NJ COPYRGT 2001, pp. 286, 288-292, Jan. 1, 2001.
Echelon Corporation, "Building a Lon Talk-to-PLC Gateway", Lon Works Engineering Bulletin, 1-63, May 1, 1994.
"LTM-10A User's Guide", Revision 4, Echelon Coporation, 1995-2001, 46 pages, Jan. 1, 2010.
"The Mac Reborn", Macworld, vol. 13, Issue 9., pp. 1-10, Sep. 1, 1996.
Matthews, Tom, "Telecomm System is Nerve Center", Infosystems, vol. 31, No. 5, pp. 68-69, May 1, 1984.
"Using Cisco Ios Software, Appendix A", Cisco uBR905/uBR925 Cable Access Router Software Configuration Guide, 1-12, Jul. 1, 2001.
Kong, Isaac et al, "Cablenet: A Local Area Network Reservation Scheme", Digest of Papers Spring Compcon 82, High Technology in the Information Industry, IEEE Computer Society International Conference, Feb. 22, 1982.
Bearfield, J.M., "Control the Power Interface of USB's Voltage Bus", Electronic Design, U.S. Penton Publishing, Clev. Ohio, vol. 45, No. 15, pp. 80, 82, 84 and 86, Jul. 1, 1997.
Cisco Systems, Inc., Respondents' Notice of Prior Art (Redacted); in the Matter of Certain Equipment for Communications Networks, Including Switches, Routers, Gateways, Bridges, Wireless Access Pointes, Cable Modems, IP Phones and Products Containing Same; ITC Investigation No. 337-TA-778, 86 pages, Aug. 12, 2011.
Stallings, W., "Local Networks-Third Edition", pp. I-v, x-xvi, 499-510, Jan. 1, 1990.
"IEEE Guide for Power-Line Carrier Applications, ANSI/IEEE Std 643-1980", COPYRGT 1980 by The Institute of Electrical and Electronics Engineers, Inc., pp. 1-84, Jan. 1, 1980.
"SuperStack II Desktop Switch", 3Com, 1-2, Sep. 1, 1996.
Summary of an IEEE Guide for Power-Line Carrier Applications, A Report by the Power System Communications Committee, IEEE Transactions on Power Apparatus and Systems, vol. PAS-99, No. 6, pp. 2334-2337, Nov. 1, 1980.
"Configuring the uBR900 Series Modem, Document ID: 43060", 1-11, Oct. 31, 2008.
"EIA 600.41 Description of the Data Link Layer"; Revision IS-60, 60 pages, Jan. 31, 1996.
Wu, Chien-Ting et al., "Extended DQRAP (EXQRAP) a Cable TV Protocol Functioning as a Distributed Switch"; Illinois Institute of Technology (Comp. Science Dept), pp. 1-7, Mar. 12, 1994.
Data-Over Cable Technical Reports; Operations Support System Framework for Data Over Cable Services; TR-DOCS-OSSIW08-961016; MCNS Holdings, LP, pp. 1-23, Oct. 16, 1996.
"Motorola Announces Key New Features to CyberSURFR Cable Modem System", Motorola, 3 pages, Mar. 17, 1997.
"PL3120/PL3150 Power Line Smart Transceiver Data Book", Version 2, Echelon Corporation, 1996-2005, 255 pages, Jan. 1, 1996.
Vo, Joe, "A Comparison of Differential Termination Techniques", National Semiconductor Application Note 903, National Semiconductor Corporation, pp. 1-10, Aug. 1, 1993.
"Superstack II Baseline Switch 610 User Guide", 3Com, pp. 1-54, May 1, 1999.

Hasler, E.F. et al, "Communication Systems Using Bundle Conductor Overhead Power Lines", IEEE Transactions on Power Apparatus and Systems, vol. PAS-94, No. 2, pp. 344-349, Mar. 1, 1975.
"Cisco 1-Port Euro/J-DOCSIS Cable High-Speed WAN Interface Card, DOCSIS Integration for Select Cisco Devices", 1-2.
Wakerly, John F. et al, "Attaching RS-232 and LAN Capabilities to an Existing Voice-Only Switching Network", published as early as 1985, pp. 1-11.
Laubach, Mark, "To foster residential area broadband internet technology: IP datagrams keep going, and going, and going . . .", Computer Communications, NL, Elsvier Science Publishers BV, Amsterdam, vol. 19, No. 11, pp. 867-875, Sep. 1, 1996.
Adaptive Networks, Inc., "AN1000EVK Evaluation Unit Manual, Draft 1.0", 31 pages, Aug. 1, 1996.
Burr, A.G, et al, "Effect of HF Broadcast Interference on PowerLine Telecommunications Above 1 MHZ" COPYRGT 1998 IEEE, pp. 2870-2875, Jan. 1, 1998.
"Data Transmission Without Wires", Material Handling Engineering, 1 page, Jan. 1, 1993.
Horowitz, Paul et al., Art of Electronics, Second Edition, Cambridge University Press, 1989, pp. 44, 45, 47, 48, 316-319.
Burranscano, P et al, "Performance Evaluation of Digital Signal Transmission Channels on Coronating Power Lines"COPYRGT 1988 IEEE, pp. 365-368, Jan. 1, 1988.
Intelogis Simplifies Networking, (Passport Plug-In Network), 1 page, Jul. 20, 1998.
Sala, Dolors and Limb, John, O., "Scheduling Disciplines for HFC Systems: What can we learn from ATM Scheduling", GA Tech, pp. 1-6, May 23, 1996.
Shimizu, Hiroshi et al, "IVDLAN Standardization and Development", IEICE Transactions on Communications, vol. E74-B, No. 9, Sep. 1991, 2696-2702.
SX-200 Digital PABX/Features Description 9109-094-105-NA, Issue 4, Revision 1, pp. 1-350, Nov. 1, 1990.
Gutzwiller, F.W. et al, "Homenet: A control Network for Consumer Applications", IEEE Transactions on Consumer Electronics, vol. CE-29, No. 3, pp. 297-304, Aug. 1, 1983.
Cisco Systems, "Catalyst 5000 ATM Dual PHY LAN Emulation Module", pp. 1-4, Sep. 24, 1996.
Okazaki, Hideaki et al, "A Transmitting and Receiving Method for CDMA Communications Over Indoor Electrical Power Lines", IEEE, pp. 522-528, Mar. 1, 1998.
Kosiur Dave et al, "Macworld Networking Bible", Second Edition, pp. 1-331, Jan. 1, 1994.
Azzam, Albert, A., "High Speed Cable Modems", 1997, ISBN: 0-07-006417-2 pp. 247-570, 247-570, Jan. 1, 1997.
Neumann, Gerd, "Flexible and Cost-Minimising System Concept" (Ericsson Digital PABX MD 110), NET Nechrichten Elektronik-Telematik, Special Issue, 5 pages, Mar. 1, 1988.
Network Based Exchange—The Complete Communications Solution, NBX Corporation, 16 pages, Jan. 1, 1997.
Gibson, Richard et al, Fiber Distributed Data Interface (FDDI)—Token Ring Physical Layer Medium Dependent (PMD); Americal National Standard for Intormation Systems; ANSI X3.166, 1-57, Jan. 1, 1990.
Hughes, John B. et al, "A Receiver IC for a 1+1 Digital Subscriber Loop", IEEE Journal of Solid-State Circuitry, vol. S.C. 20, No. 3, pp. 671-678, Jun. 1, 1985.
"JVC Introduces Ethernet Compatible Wireless LAN System"; Business Wire, 1 page, Sep. 25, 1995.
Archnet Technology Ltd., "Archnet: Automatic Meter Reading System Power Line Carrier Communication", 3 pages, Jan. 1, 2001.
Nichols, Keith, "Line Carrier Modems-1: Build a Pair of Line-Carrier Modems (Part 1)", Radio Electronics, 7 total pages, Jul. 1, 1988.
US 5,888,769, 03/1999, White et al. (withdrawn).
"Setting up MacIP", cisco.com, May 1995, 1-6.
Masuda, Tadashi et al, "2-Wire Video Intercom System with Telephone", National Technical Report, vol. 37, No. 6, pp. 74-80, Dec. 1, 1991.
Pye Telecommunications Limited, "Coaxial Feeder Cables", 15 pages, Jun. 1, 1975.

(56) References Cited

OTHER PUBLICATIONS

Oneal Jr., J.B., "The Residential Power Circuit as a Communication Medium", IEEE Transactions on Consumer Electronics, vol. CE-32, No. 3, pp. 567-577, Aug. 1, 1986.

Olshanksy, Robert, "Broadband Digital Subscriber Line: A Full Service Network for the Copper Plant", Telephony, vol. 228, No. 24, 8 pages, Jun. 12, 1995.

Simple, High-Speed Ethernet Technology for the Home, A White Paper, The Home Phoneline Networking Alliance, pp. 1-11, Jun. 1, 1998.

"SuperStack II PS Hub User Guide"; 3Com, 188 pages, Jul. 1, 1997.

Feduschak, Natalia A., "Waiting in the Wings: Is Powerline Technology Ready to Compete with Cable?", 5 pages, Mar. 1, 2001.

Amada, Eiichi et al, "An Integrated PABX/LAN System Architecture", Communications, 1988, ICC '88, Digital Technology—Spanning the Universerse, Conference Record, IEEE International Conference, vol. 3., Jun. 1988, 1533-1538.

Morgan, Hank, "Two-Wire Full-Duplex Modem Simplifies Voice and Data Networking", Mini-Micro Systems, vol. 17, No. 3, 4 pages, Mar. 1, 1984.

Devault, M. et al, "Resaux Domestiques et Terminaux Audiovisuels Numeriques", L'Echo Des Recherches, No. 126, pp. 37-46, Jan. 1, 1986.

International Telecommunication Union, "ISDN User-Network Interfaces—Basic User-Network Interface—Layer 1 Specification", I.430, Mar. 1993, 106 pages.

"Connector and Cable Specifications, Appendix B, Cisco uBR924 Router Hardware Installation Guide", 1-6, Mar. 1, 2000.

Chang, S.S.L., "Power-Line Carrier", Fundamentals Handbook of Electrical and Computer Engineering, vol. II Communication, Control, Devices and Systems, John Wiley and Sons, New York, pp. 617-627, Jan. 1, 1983.

Ahamed, Syed V et al, "A Tutorial on Two-Wire Digital Transmission in the Loop Plant", IEEE Transactions on Communications, vol. COM-29, No. 11, pp. 1554-1564, Nov. 1, 1981.

De Wilde, W.R. et al, "Upwards to a Reliable Bi-Directional Communication Link on the LV Power Supplies for Utility Services: Field Tests in Belgium", Sixth International Conference, pp. 168-172, Apr. 3, 1990.

Stallings, W., "Local Networks—Second Edition", pp. I-v, vii-xiv, 427-434, Jan. 1, 1987.

"English Language Abstract for Japanese Patent 1-27358 (64-27358)", whole document, Jan. 30, 1989.

Yoshitoshi, M et al, "Proposed Interface Specifications for Home Bus", IEEE Transactions on Consumer Electronics, vol. CE-32, No. 3, pp. 550-557, Aug. 1, 1986.

Naredo, J.L et al, "Design of Power Line Carrier Systems on Multitransposed Delta Transmission Lines" IEEE Transactions on Power Delivery. vol. 6. No. 3, pp. 952-958, Jul. 1, 1991.

"Technical Report TR-001 ADSL Forum System Reference Model", 6 pages, May 1, 1996.

"AT and T Practice, SLC 96 Carrier System, Maintenance Pair Gain System", Select Code 363-202-500, Issue 1, Aug. 1983, 497 pages.

Wakerly, John, The Simple, Definitive Backplane and Timeslot Explanation; D.A.V.I.D. Systems, Inc., pp. 1-8, Sep. 1, 1984.

"DOCSIS-Bridging Configuration, Chapter 2 Cisco uBR905/uBR925 Cable Access Router Software Configuration Guide", 1-10, Jul. 1, 2001.

Parry, Christopher, "Netgear's Patent L.R. 3-3 and 3-4 dislosures" *Serconet Ltd.* v. *Netgear Inc.*, Case No. CV-06-04646 PJH, 1-15, Jan. 29, 2007.

Tanaka, Mosaoki, "High Frequency Noise Power Spectrum, Impedance and Transmission Loss of Power Line in Japan on Intrabuilding Power Line Communications" IEEE Transactions on Consumer Electronics, vol. 34, No. 2, pp. 321-326, May 1, 1988.

"Shared Services (Data/Voice Network)", Communications News, vol. 25, No. 11, pp. 46-47, Nov. 1, 1988.

Barstow, J.M., "A Carrier Telephone System for Rural Service", AIEE Transcations, 1947, vol. 66, pp. 301-307, Jan. 1, 1947.

Wimer, W., "Clarifications and Extensions for the Bootstrap Protocol, Request for Comments 1542", Carnegie Mellon University, Oct. 1993, 1-23.

Data-Over Cable Service Interface Specifications; Operations Support System Interface Specification; SP-OSSI-102-990113; Cable Television Laboratories, Inc. , pp. 1-28, Jan. 13, 1999.

"MCNS Data-Over-Cable Service Interface Specifications: Cable Modem to Customer Premise Equipment Interface Specification SP-CMCI-104-000714", 1-65, Jul. 14, 2000.

3COM, "48 Volt DC Power Supply Connection Guide for the SuperStack II Switch 3900", pp. 1-12, Mar. 1, 2000.

Bramblett, Steve, "Connect Terminals to your CPU Over PBX Telephone Lines", EDN, vol. 31, No. 5, pp. 239-243, 245, 246, 248, Mar. 6, 1986.

Sala, Dolors et al, "A Protocol for Efficient Transfer of Data over Fiber/Cable Systems" GA Tech., pp. 1-8, Jan. 1, 1997.

Cisco Systems, "Quick Start Guide: Cisco 2610 Router Cabling and Setup", 18 pages, Jan. 1, 1998.

"Release Notes for Cisco uBR904 Cable Access Router for Cisco Ios Release 12.0(7)T", Text Part No. 78-6482-04, 1-30, Dec. 13, 1999.

Hatori, Mitsutoshi et al, "Home Informatization and Standardization of Home Bus", IEEE Transactions on Consumer Electronics, CE-32, No. 3, pp. 542-549, Aug. 1, 1986.

"TeleConcepts . . . Introduces the Just Plug It in Intercom System". TeleConcepts Brochure, Newington, CT (published before Jul. 3, 1995), 4 pages, Jul. 3, 1995.

Cervenka, Dana, "Building Cablephone Systems Piece by Piece", CED: Communications Engineering and Design, 6 pages, Mar. 1, 1996.

"Troubleshooting Tips for the Cisco uBR924 Cable Access Router, Cisco IOS Release 12.0(5) T", 1-74.

Claims Chart for United States Patent No. 5,841,360; Netgear's Patent L.R. 3-3 and 3-4 Disclosures dated, 1-53, Jan. 29, 2007.

"Draft IS-60.04 Node Communications Protocol; Part 6: Application Layer Specification", 129 pages, Apr. 18, 1996.

"uBR900 Cable Modem Error Messages, Document ID: 43063", 1-5, Nov. 4, 2008.

Gibson, Richard et al, "Fiber Distributed Data Interface (FDDI)—Token Ring Physical Layer Protocol (PHY)"; American National Standard for Information Systems, 34 pages, Jan. 1, 1988.

"Claim Charts for United States Patent 6,970,538; Netgear's Patent L.R. 3-3 and 3-4 Disclosures", 1-26, Jan. 29, 2007.

"LonWorks Router User's Guide Revision 3", Echelon Corporation, 68 pages, Jan. 1, 1995.

Webb, Joseph A., "A New Concept in Data-Above-Voice (DAV)", PTC '86: Evolutions of the Digital Pacific Telecommunications—Asia, Americas, Pacific: PTC '86 Proceedings, Honolulu , Hawaii, pp. 260-265, Jan. 12, 1986.

"Bridging and Routing Features for the Cisco uBR904 Cable Modem", 1-27.

"VISPLAN-10 Infrared Wireless LAN System"; JVC, 10 pages, May 1, 1996.

Sheets, William et al, "Carrier Current Receiver", Radio Electronics, vol. 60, No. 2, 5 pages, Feb. 1, 1989.

"Echelon Customer Support Alert Re: RTR-10 Core Module and RTR-10 Motherboard Changes", 2 pages, Jan. 1, 1996.

"Cisco Systems, Inc., Cisco Consumer Products LLC, Scientific-Atlanta LLD, and Cisco Systems International B.V.'s Response to Complaint of Mosaid Technologies Inc., Response to Complaint", Investigation No. 337-TA-778, 1-72, Jul. 21, 2011.

Evans, Grayson , "The CEBus Standard Users Guide, 1st Edition", 317 pages, pp. 1-317, May 1, 1996.

"David Co-Net Command Reference, Revision A, Doc No. 7915-08", 1-342, Dec. 1, 1988.

"EMETCON Automated Distribution System: Communications Guide", Westinghouse ABB Power T7D Company Technical Manual 42-6001A, 55 pages, Sep. 1, 1989.

Abraham, K.C. et al, "A Novel High-Speed PLC Communication Modem", IEEE Transactions on Power Delivery, pp. 1760-1767, Oct. 1, 1992.

David Systems, David Information Manager-Overview, 1986, pp. 1-38.

(56) References Cited

OTHER PUBLICATIONS

Ogiwara, Haruo et al, "Design Philosophy and Hardware Implementaion for Digital Subscriber Loops", IEEE Transactions on Communications, vol. COM-30, No. 9, pp. 2057-2065, Sep. 1, 1982.
Azzam, Albert, A., "High Speed Cable Modems: Including IEEE 802.14 Standards", pp. 1-597, Jan. 1, 1997.
Cisco Systems, "Catalyst 5000 Series Configuration Worksheet", pp. 1-11, Jan. 1, 1996.
International Telecommunication Union, "ISDN User-Network Interface Data Link Layer—General Aspects", CCITT, Q.920, Nov. 1988, 20 pages.
Meng, H. et al, "A Transmission Line Model for High-Frequency Power Line Communication Channel" IEEE, pp. 1290-1295, Jan. 1, 2002.
"ASCEND Pipeline 25 ISDN Remote Lan Access, Bandwidth on Demand, Getting Started Guide", 111 pages, Aug. 18, 1995.
Held, Gilbert, "The Complete Modem Reference: The Technician's Guide to Installation, Testing, and Trouble-Free Communications", Third Edition, pp. 1-488, Jan. 1, 1997.
Davis, Steve, "Integrating Voice and Data: A Marriage of Convenience", Today's Office, vol. 24, No. 9, pp. 28-30, Feb. 1, 1990.
Pietrasik, A. et al, "Subscriber Carrier Telephony System 1+1", Wiadomosci Telekomunikacyjne, vol. 17, No. 7-8, pp. 193-198, Jul. 1, 1977.
Data-Over Cable Service Interface Specifications; Radio Frequency Interface Specification; SPRFIv1.1-101-990311, Cable Televison Laboratories, pp. 1-320, Mar. 11, 1999.
Echelon Corporation, "Centralized Commercial Building Applications with the LonWorks PLT-21 Power Line Transceiver", LonWorks Engineering Bulletin, Echelon Corporation, 22 pages, Apr. 1, 1997.
"David Information Manager Feature Reference"; David Systems, 1-44.
Kosiur Dave,et al, "Macworld Networking Bible", Second Edition, pp. 332-687, Jan. 1, 1994.
"HomePlug.TM.Powerline Alliance, HomePlug Initial Draft Medium Interface Specification", 104 pages, Jul. 27, 2000.
"EIA 600.42 Node Medium Access Control Sublayer"; Revision IS-60, 54 pages, Feb. 22, 1996.
Coronaro, M. et al, "Integrated Office Communication System" Electrical Communication, vol. 60, No. 1, Face Research Center, Pomezia, Italy, pp. 17-22, Jan. 1, 1986.
Waring, D.L., "The Asymmetrical Digital Subscriber Line (ADSL): A New Transport Technology for Delivering Wideband Capabilities to the Residence" Globecom '91, IEEE, pp. 1979-1986, Jan. 1, 1991.
"Data Xcellerator Cable Modem User's Guide", 1-46, Apr. 1, 1997.
"Phoneline/HPNA/Home PNA Networks", 1-3, Jul. 29, 2003.
Byrne, Thomas P. et al, "Positioning the Subscriber Loop Network for Digital Services", IEEE Transactions on Communications, vol. COM-30, No. 9, pp. 2006-2011, Sep. 1, 1982.
Cisco Systems, "Catalyst 5000 ATM LAN Emulation Module: Data Sheet", 2 pages, Nov. 1, 1995.
Goldberg, Lee, "MCNS/DOCSIS MAC Clears a Path for the Cable-Modem Invasion", Electronic Design, US, Penton Publishing, vol. 45, No. 27, pp. 69-70, 74, 78, 80, Dec. 1, 1997.
"Recall, End of Sales, End of Engineering and End of Life for Cisco uBR914 Cable Data Service Unit, Product Bulletin, No. 1380", 1-2, Aug. 1, 2001.
Wakerly, John, TSBUS Signal Specifications, Rev. 4; D.A.V.I.D. Systems, Inc., pp. 1-8, May 7, 1985.
Bastian, M., "Voice-Data Integration: An Architecture Perspective", IEEE Communications Magazine, vol. 24, No. 7, pp. 8-12, Jul. 1, 1986.
Kawamura, A et al, "Autonomous Decentralized Manufacturing System Using High-Speed Network with Inductive Transmission of Data and Power", IEEE, pp. 940-945, Jan. 1, 1996.
"Fast Ethernet 100 Mbps Solutions", Posted March, 10 pages, Mar. 1, 1996.
Stallings, W., "Local Networks—An Introduction", pp. ii, xii-xvi, 373-381, Jan. 1, 1984.
Amodei, Aurelio et al, "Increasing the Throughput of the HomePNA Mac Protocol" Proceedings of the 29th Annual IEEE International Conference on Local Computer Networks (LCN '04), 8 pages, Nov. 1, 2004.
Cisco Systems, "Cisco Catalyst 5002 Switching System", 1999, 4 pages.
"Preface, Cisco uBR905/uBR925 Cable Access Router Software Configuration Guide", 1-12, Jul. 1, 2001.
"Miscellaneous Questions About uBR900 Series Cable Modems, Document ID: 107616", 1-3, Oct. 31, 2008.
Perlman, Radia, "Interconnections Bridges and Routers", ISBN: 0-201-56332-0, 393 pages, Jan. 1, 1992.
Tsuruta, Shichiro et al, "Home Media Bus: An Integrated Network for Home Information Systems" 1984 IEEE International Conference on Consumer Electronics, Digest of Technical Papers, Rosemont, IL, 2 pages, Jun. 6, 1984.
"Model DPX203TM and EPX2203 TM VOIP Cable Modem User's Guide", 1-51, Aug. 1, 2006.
Little, Arthur D et al, "Data Over Cable Interface Specifications: Cable Modem Termination System—Network Side Interface Specification", pp. 1-17, Jul. 2, 1996.
Wakerly, John, TNIM Timeslot Allocation; D.A.V.I.D. Systems, Inc., pp. 1-3, Apr. 18, 1983.
"Cisco uBR900 Series Cable Access Router Q and A, Revision 1", 1-5, Nov. 15, 2001.
Markwalter, Brian E. et al, CEBus Router Testing, IEEE Transactions on Consumer Electronics, vol. 37, No. 4, 8 pages, Nov. 1, 1991.
Suranyi, Gabriel G., "The Need for Home Power: It Is Just Around the Corner", Telecommunications Energy Conference, INTELEC, 19th International, Oct. 1997, 80-86.
Carse, G.D., "New and Future Technologies in the Local Telephone Network: The Victoiria System", Conference IEEE International Conference on Communications'86, Integrating the World Through Communications Conference Record, Toronto ON Canada, pp. 410-412, Jun. 22, 1986.
"IBM LAN Bridge and Switch Summary", Jan. 1996, 208 pages.
Mitel, ISO-CMOS ST-Bus Family, MT8971B/72B; Digital Subscriber Interface Circuit/Digital Network Interface Circuit; Issue 7, pp. 1-21, May 1, 1995.
Inoue, Masahiro et al, "A Home Automation System", IEEE Transactions on Consumer Electronics, vol. CE-31, No. 3, pp. 516-527, Aug. 1, 1985.
"Tohoku Electric Develops High-Speed Communications System Using Power Distribution Lines" Tohoku Currents, Spring 1998, 8(1), 2 pages, Jan. 1, 1998.
"Communications System Uses Standard Powerlines", Computer Design, 3 pages, Nov. 1, 1995.
Data-Over Cable Service Interface Specifications: Cable Modem Telephony Return Interface Specification; SP-CMTRI-I01-970804, Cable Television Laboratories, Inc., pp. 1-80, Aug. 4, 1997.
"TeleVideo Brochure" (published before Jul. 3, 1995), 2 pages, Jul. 3, 1995.
Cisco Systems, "Cisco Catalyst 5002 Switching System", 4 pages, Jan. 1, 2010.
3COM, "3ComImpact IQ External ISDN Modem User product brochure", pp. 1-4, Jun. 1, 1996.
Gershon, Ron et al, "A Token Passing Network for Powerline Communications" by Adaptive Networks, IEEE Transactions on Consumer Electronics, vol. 37, No. 2, 6 pages, May 1, 1991.
"PowerDsine Product Catalogue" Israel, pp. 56-79 and 95-105, Jan. 1, 1999.
LonWorks Custom Node Development, LonWorks Engineering Bulletin, Echelon Corporation, 16 pages, Jan. 1, 1995.
Croft, Bill et al, "Bootstrap Protocol (BOOTP)", Sep. 1, 1985.
Treves, S.R. et al, "Text, Image and Data Integration in a Distributed Control Digital Voice Switching System", International Switching Symposium—ISS '81 CIC, Montreal, QC Canada, pp. 1-7, Sep. 21, 1981.
Goodenough, Frank, "Chip Set Plus 100 Kbit/s of Data on Noisy Power Lines", Electronic Design, 9 pages, Mar. 18, 1996.
Strole, N., "The IBM Token-Ring Network—A functional Overview", IEEE Network Magazine, vol. 1, No. 1, pp. 23-30, Jan. 1, 1987.

(56) References Cited

OTHER PUBLICATIONS

Platt, Richard, "New Standard Helps Multimedia Get Off the Ground", IEEE Multimedia, vol. 3, Issue 2, Summer 1996, 78-82.
Cornell Ronald G. et al, "Progress Towards Digital Subscriber Line Services and Signaling", IEEE Transactions on Communications, vol. COM-29, No. 11, pp. 1589-1594, Nov. 1, 1981.
Dostert, K, "EMC Aspects of High Speed Powerline Communications", Proceedings of the 15.sup.th International Wroclaw Symposium and Exhibition on Electromagnetic Capability, Wroclaw, Poland, pp. 98-102, Jun. 27, 2000.
"Universal Serial Bus Specification Revision 1.0." Sec. 9.2.1-9.2.5.1 pp. 170-171, Jan. 15, 1996.
"Computerized Telephone System Integrates Voice and Data Switching", Computer Design, vol. 20, No. 4,, 6 pages, Apr. 1, 1981.
Cisco, "Cisco Catalyst 5000 Family Fast EtherChannel Switching Modules Data Sheets", 3 pages, Jan. 1, 1999.
"LonWorks Twisted Pair Control Module User's Guide Version 2", Echelon Corporation, 1992-1996, 50 pages, Jan. 1, 1996.
Ulm, John et al, Data-Over-Cable Interface Specifications/Radio Frequency Interface Specification, SP-RFII01-970326, 1-189, Mar. 26, 1997.
Roeck, Guenter, "Cable Device Management Information Base for MCNS Compliant Cable Modems and Cable Modem Termination Systems", pp. 1-32, May 22, 1998.
"EIA-600.37 Symbol Encoding Sublayer"; Revision, Draft Copy., 30 pages, Nov. 15, 1991.
Wakerly, John, Clock Synchronization of DAVID Managers, D.A.V. I.D. Systems, Inc., pp. 1-8, Mar. 6, 1985.
Lavoisard, J.L., "ISDN Customer Equipments", Commutation and Transmission, No. 3, pp. 35-50, Jan. 1, 1987.
"EMETCON Automated Distribution System, ABB Power T and D Company Inc.", Raleigh North Carolina, No. B-919A, 14 pages, Jan. 1, 1990.
United States International Trade Commission, Order No. 21: Construing the Terms of the Asserted Claims of the Patents At Issue (Public Version); In the Matter of Certain Equipment for Communications Networks, Including Switches, Routers, Gateways, Bridges, Wireless Access Points, Cable Modems, IP Phones, and Products Containing Same; ITC Investigation No. 337-TA-778, 148 pages, Feb. 14, 2012.
Dougligeris C. et al, "Communications and Control for a Home Automation System", Conference IEEE Proceedings of the Southeastcon '91, vol. 1, pp. 171-175, Jan. 1, 1991.
"DSLPipe User's Guide"; by Ascend Communications, 245 pages, Jun. 3, 1997.
International Telecommunication Union, "ISDN User-Network Interfaces—Primary Rate User-Network Interface—Layer 1 Specification", 1.431, Mar. 1993, 44 pages.
Kilbourne, B, "EEI Electric Perspectives: The Final Connection", 7 pages, Jul. 1, 2001.
"Data-Over Cable Service Interface Specifications; Operations Support System Interface Specification Radio Frequency Interface; SP-OSSI-RFI-I03-990113" Cable Television Laboratories Inc. , pp. 1-33, Jan. 13, 1999.
Detreville, John et al, "A Distributed Experimental Communications System", IEEE Journal on Selected Areas in Communications, vol. Sac-1, No. 6, pp. 1070-1075, Dec. 1, 1983.
Batlle, Sala Dolors, "MAC Protocols for Multimedia Data over HFC Architecture", pp. 1-30, Oct. 27, 1995.
Held, Gilbert, "High Speed Networking with LAN Switches",, pp. 1-290, Jan. 1, 1997.
"DPC2203 and EPC2203 VOIP Cable Modem User's Guide", 1-58, Oct. 1, 2006.
Wildstrom, Stephen, "Now This is Plug and Play", Business Week, Updated Jun. 14, 1997, 2 pages, Jun. 14, 1997.
Valenti, C., "Study of the Feasibility and Advisability of Digital Subscriber Lines Operating at Rates Substantially in Excess of the Basic Access Rate", T1E1.r Technical Subcommittee (T1E.4/91-115) pp. 2 and 4., Aug. 26, 1991.

"Continuation of IBM LAN Bridge and Switch Summary", Jan. 1996, 1-70.
Throwbridge, Dave, "High Cost of Wiring Sparks Wireless LAN Alternatives"; Computer Technology Review vol. XIV, No. 3, 8 pages, Mar. 1, 1994.
"EIA-600.31-PL Physical Layer and Medium Specification", pp. 1-24, Jan. 1, 2010.
"Data-Over Cable Service Interface Specifications: Cable Modem to Customer Premise Equipment Interface Specification"; SP-CMCI-12-980317, Cable Television Laboratories, Inc., pp. 1-40, Mar. 17, 1998.
Boubekker, Mansouria, "Bandwidth Reduction for the Transmission of Sign Language Over Telephone Lines", Proceedings of the SPIE—The International Society for Optical Engineering, vol. 1001, Part 1, pp. 223-230, Nov. 9, 1988.
"Information on Home PhoneLine Networking Alliance (Home PNA)", dated Jun. 1998 and before. , 1-52, Jun. 1, 1998.
Chen, Y.F. et al, Baseband Transceiver Design of a 128-Kbps Power-Line Modem for Household Applications, IEEE Transactions, 17 (2), 338-344, Apr. 1, 2002.
"Centex LAN Can Provide Advanced Network Capabilities Over the Existing Telephone Wires", Communications News. vol. 25, No. 6, p. 27, Jun. 1, 1988.
Motoyama, Shusaburo et al, "A Subscriber Loop Multiplexing System for Integrated Service Digital Networks" Conference : NTC '81, IEEE 1981 National Telecommunications Conference, Innovative Telecommunications—Key to the Future, New Orleans LA, 6 pages, Nov. 29, 1981.
Nicholas, Vun C.H. et al, "A Power LAN for Telecommunication Power Supply Equipment", IEEE Region 10 Conference on Computer, Communication, Control and Power Engineering, vol. 3 of 5., 6 pages, Oct. 19, 1993.
Pfendtner, "DOCSIS Network Security at WH-Netz", Nov. 20, 2002.
Metcalfe, Bob, From the Ether-Bob Mecalfe, Cheap, reliable net connections may be as close as an electrical socket, by Bob Metcalfe Info World, vol. 19, Issue 6, 4 pages, Feb. 10, 1997.
Patrick, M and Harvey, J, "Data Over Cable System Quality of Service Management Information Base (DOCSIS-QOS MIB)" Motorola ING, pp. 1-43, Jun. 25, 1999.
Abrahams, Richard, "Socket to me: networks linked by electrical lines", Mass High Tech, 1 page, Jan. 1, 1997.
Inoue, M et al, "The MELON Home Automation Housekeeping System", Mitsubishi Denki Giho, vol. 63, No. 2, pp. 36-41, Jan. 1, 1989.
"Demand Side Management with LonWorks Power Line Transceivers", LonWorks Engineering Bulletin, Echelon Corporation, 36 pages, Dec. 1, 1996.
"NE5050 Power line modem product specification", Philips semiconductors , 6 pages, Apr. 15, 1992.
Yamamoto, Kazuyuki et al, "A Home Terminal System Using the Home Area Information Network", IEEE Transactions on Consumer Electronics, vol. CE-30, No. 4, pp. 608-616, Nov. 1, 1984.
"Ascend DSLPipe-S Specifications", 1997, 2 pages.
"HomePlug TM Powerline Alliance, HomePlug 1.01 Specification", 139 pages, Dec. 1, 2001.
"Upgrading Cisco I0S Software on a uBR900 Series Cable Modem, Document ID: 107613", 1-5, Sep. 26, 2003.
"White Paper on Medium Voltage Powerline Communication" (PLC) Networks Annexes CIGRE SC D2 WG 14, Broadband PLC, pp. 1-15, Apr. 1, 2005.
Andrews, S.B., "The Generic Digital Channel Concept", IEEE International Conference on Communications, Chicago IL, pp. 7.1.1-7.1.3, Jun. 23, 1985.
Cooper, Edward, "Broadband Network Technology—An Overview for the data and Telecommunications Industries", Sytek Systems, Mountain View CA, 4 pages, Jan. 1, 1984.
Ise, Masahiro et al, "Sharp Home Bus Sytem", Sharp Technical Journal, No. 29, pp. 49-55, Jan. 1, 1984.
Sumner, Mark, "DOCSIS 1.1 Overview" cablemodem.com—Documents, Online! May 3-7, 1999, XP-002165493—Overview, pdf, retrieved on Apr. 18, 2001, pp. 196-205, May 3, 1999.

(56) References Cited

OTHER PUBLICATIONS

Punj, V., "Broadband Applications and Services of Public Switched Networks", IEEE Transactions on Consumer Electronics, vol. 35, No. 2, 8 pages, May 1, 1989.
"Home Phoneline Networking Alliance", Interface Specification for Home PNA 2.0 10 M8 Technology Link Layer Protocol, pp. 1-39, pp. 1-78, Dec. 1, 1999.
"DPR2325, EPR2325, DPR2320, and EPR2320 Cable Modem Gateway With Wireless Access Point User's Guide", 1-125, Aug. 1, 2006.
Freeman, Roger L., "Telecommunication Transmission Handbook" 2. sup.nd.Ed., Cover, A Wiley-Interscience Publication;, pp. xi-xxvii, Chapter 3 (pp. 79-127), Chapter 5 (pp. 172-252), Chapter 6 (pp. 253-288), Jan. 1, 1981.
Tzerfos P. et al, "Delivery of Low Bit Rate Isochronous Streams Over the DOCSIS 1.0 Cable Television Protocol", IEEE Transactions on Broadcasting, US, vol. 45, No. 2, pp. 206-214, Jun. 1, 1999.
Cisco Systems, et al, Internetworking Technologies Handbook Chapter 7, Fourth Edition, Cisco Press; First Printing; Copyright 2004 Cisco Systems, Inc., 1-38, Sep. 11, 2003.
"JVC Introduces First Ethernet Compatible Wireless LAN System"; Business Wire, 1 page, Nov. 7, 1995.
Cisco Systems, "CiscoPro EtherSwitch CPW2115", 4 pages, Dec. 1, 1995.
"Intelogis to Present on Stage at Internet Showcase 1998" PR Newswire, 1 pages, Jan. 28, 1998.
"Deliver Secure, High-Speed DOCSIS Data and Voice Commercial Services With the Cisco uBR900 Series Cable Access Router Data Sheet", 1-4, Sep. 1, 2001.
Olshansky, Robert, "Broadband Digital Subscriber Line: A Full Service Network for the Copper Plant", Telephony, pp. 52-60, Jun. 12, 1985.
Hunt, John M. et al, "Electrical Energy Monitoring and Control System for the Home" IEEE Transactions on Consumer Electronics, vol. CE-32, No. 3, pp. 578-583, Aug. 1, 1986.
"Advanced Data-Only Configurations, Chapter 3", Cisco uBR905/ uBR925 Cable Access Router Software Configuration Guide, 1-16, Jul. 1, 2001.
"Cisco 1805 DOCSIS 2.0 Cable Router, Quick Start Guide", 1-4, Jan. 1, 2007.
Cable Television Laboratories Inc., "Data-Over-Cable Service Interface Specifications: Radio Frequency Interface Specification", SP-RFIv2.0-I03-021218, Dec. 18, 2002.
Stallings, William, "Local Networks: An Introduction", pp. 1-97, Jan. 1, 1984.
Merrow, Jack K., "A New Approach to Integrating Local Area Data and Voice Transmission", Telephony, vol. 250, No. 17, 2 pages, Oct. 1, 1983.
Vry, M.G. et al, "Digital 1+1 Systems for Local Network Enhancement", Conference on Communications Equipment and Systems, Birmingham, UK. , pp. 61-64, Apr. 20, 1982.
"Fieldbus Standard for use in Industrial Control Systems Part 2: Physical Layer Specification and Service Definition", 106 pages, May 17, 1994.
Stallings, William, Local Networks (Third Edition), 1990, 1-534.
Fukagawa, H. et al, "Bus Wiring System for Residences", Matsushita Electric Works Technical Report, No. 36, pp. 31-35, Feb. 1, 1988.
Liu, ER et al, "Broadband Characterization of Indoor Powerline Channel", Communications Laboratory , Helsinki Univeristy of Technology, Finland (presented at the 2004 International Symposium on PowerLine Communications and its Applications, Zaragoza, Spain,), 6 pages, Mar. 31, 2004.
Lim, C. K. et al, "Development of a Test Bed for High-Speed Power Line Communications", School of Electrical and Electronic Egineering, Nanyang Technological University, Singapore, IEEE, pp. 451-456, Jan. 1, 2000.
Brosio, Alberto et al, "A Comparison of Digital Subscriber Line Transmission Systems Employing Different Line Codes", IEEE Transactions on Communications, vol. COM-29, No. 11, pp. 1581-1588, Nov. 1, 1981.
Coakley, N. G. et al, "Real-Time Control of a Servosystem Using the Inverter-Fed Power Lines to Communicate Sensor Feedback", IEEE Transactions on Industrial Electronics, pp. 360-369, Jan. 1, 1999.
"LonWorks for Audio Computer Control Network Applications", Echelon Corporation, 30, Jan. 1, 1995.
Advanced Micro Devices, Inc. et al, "An Interoperable Solution for FDDI Signaling Over Shielded Twisted Pair", Advanced Micro Devices Inc. , pp. 1-18, May 21, 1991.
Johnson, Johna Till, "Videohub Cuts Costs, Opens Options", Data Communications, 4 pages, Feb. 1, 1992.
International Telecommunication Union, "ISDN User-Network Interfaces—Reference Configurations", I.411, Mar. 1993, 11 pages.
"SuperStack II Baseline Switch User Guide", 3Com, 8 pages, Mar. 1, 1998.
"Data-Over Cable Service Interface Specifications; Operations Support System Interface Specification Baseline Privacy Interface MIB"; SP-OSSI-BPI-101-980331; 1997 and 1998, MCNS Holdings. LP., pp. 1-37, Jan. 1, 1997.
"Introduction to the CEBus Standard", Revision Feb. 5, 1995 , EIA-600.10, Draft Copy, 19 pages, Feb. 5, 1995.
Schwartz, Jeffrey, "Commtek Intros Video Over UTP", Communications Week, 3 pages, Feb. 10, 1992.
Brightfield, Keith, Power Line Communications Conference Entitled, "PLC, A New Competitor in Broadband Internet Access", Washington DC, 60 pages, Dec. 11, 2001.
Glick, David et al, "Providing Telco Customers Continuous Data Services", Telephony, vol. 205, No. 22, pp. 46, 50, 51, 54, Nov. 1, 1983.
"End-Of-Sale and End-Of-Life Announcement for the Cisco 1841 DOCSIS 2.0 Cable Modem Bundles", 1-2, Dec. 1, 2008.
Broadbridge, R., "Power Line Modems and Networks", Second IEEE National Conference on Telecommunications, 294-296, (6 pages), Apr. 2, 1989.
Cervenka, Dana, Cablephone Not Ringing Yet; CED: Communications Engineering and Design, Mar. 1995, pp. 32, 33, 34, 36, 38, 40 and 42.
Gunnerson, Gary, "Switching Hubs-Switching to the Fast Track", PC Magazine, 24 pages, Oct. 11, 1994.
"Claim Chart presented in request for reexamination of US Patent No. 5,841,360 request filed", pp. 1-53, Oct. 22, 1996.
Plexeon Logistics, Inc. "Power Line Communications", COPYRGT 1998-2003, 2 pages, Jan. 1, 1998.
Urui, Klyoshi et al, "Integrated Voice/Data Digital EPBX", Toshiba Review, No. 150, Winter 1984,., pp. 30-33, Jan. 1, 1984.
Heite, C et al, "Powernet-Das Neue Eib-Medium", Elektrotechnik und Informationstechnik, Spinger Verlag, Wein, AT, vol. 114,. No. 5, pp. 254-257, Jan. 1, 1997.
"Data-Over-Cable Service Interface Specifications" Cable Modem Termination System—Network Side Interface Specification, SP-CMTS-NSII01-960702, 1-17, Jul. 2, 1996.
"EIA-600.33-Coax Cable Physical Layer and Medium Specification", 50 pages, Sep. 25, 1995.
"HomePlug TM Powerline Alliance, HomePlug 0.5 Draft Medium Interface Specification", 133 pages, Nov. 28, 2000.
Cisco Systems, "Cisco Catalyst 5000: Industry's First Modular, Multilayer-Capable Switching System for the Wiring Closet", pp. 1-22, May 16, 1996.
"IP Addressing on the Workgroup Catalyst 1200 Series", cisco.com, Aug. 1995, 1-2.
Esmailian, T. et al, "A Discrete Multitone Power Line Communications System", Department of Electrical and Computer Engineering, University of Toronto, Ontario, Canada, 2000 IEEE, pp. 2953-2956, Jan. 1, 2000.
"Universal Serial Bus Specification Revision 1.0." Sec. 9.6.2 pp. 184-185, Jan. 15, 1996.
Fogarty, Kevin, "ZAP! NetWare users get really wired-over electric power lines", Network World. , 1-2, Jul. 3, 1995.
"AT and T's Systemax Premises Distribution System Solves Networking Problems", Fiber Optics Magazine, vol. 12, No. 4, Jul. 1, 1990.
"Embedded Power Line Carrier Modem", Archnet Electronic Technology, COPYRGT 2001, 3 pages, Jan. 1, 2001.

(56) References Cited

OTHER PUBLICATIONS

"RCA Wireless Phone Jack for DirecTV from Amazon.com website", 5 pages, Jan. 1, 2010.
Cable Television Laboratories, Inc., "Cable Data Modem Performance Evaluation: A Primer for Non-Technical Readers", pp. 1-8, Nov. 15, 1996.
Hogan Lovells US LLP, "U.S. ITC Complaint in the Matter of Certain Equipment for Communications Networks, Including Switches, Routers, Gateways, Bridges, Wireless Access Points, Cable Modems, IP Phones and Products Containing Same", 1-59, May 13, 2011.
"uBR900 Cable Modem Performance Issues, Document ID: 43062", 1-5, Oct. 31, 2008.
"*Cisco Systems, Inc.* v. *Mosaid Technologies Inc.*—Complaint for Declaratory Judgement" (full version of the Complaint having been filed under seal and thus unavailable to the public), 23 pages, Aug. 16, 2010.
Nguyen, Hung and Yao, Felix, "Hybrid-Fiber Coax", pp. 1-11, Apr. 22, 1996.
Kim, Woo-Seop et al, "A Control Network Architecture Based on EIA-709.1 Protocol for Power Line Data Communications", IEEE Transactions on Consumer Electronics, vol. 48, No. 3 , pp. 650-655, Aug. 1, 2002.
Sheets, William et al, "Carrier Current Audio Transmitter", Radio Electronics, 5 pages, Jan. 1, 1989.
Artom, A et al, "The Possible Use of Customer Loop for New Services During the Transition From Analogue to Digital", Revue F.I.T. C.E.vol. 20, No. 2, pp. 50-56, Mar. 1, 1981.
Lohse et al, "Fiber Distributed Data Interface (FDDI)—Token Ring Media Access Control (MAC); American National Standards for Information Systems; ANSI X3. 139-1987", 1-64, Nov. 5, 1986.
Golmie, Nada et al., "A Review of Contention Resolution Algorithms for IEEE 802.14 Networks"; National Institute of Standards and Technology, pp. 1-11, Jan. 1, 1999.
"SuperStack II Entry Hub User Guide", 3Com, pp. 1-8, Nov. 1, 1996.
Lechleider, J.W., "Study of the Feasibility and Advisability of Digital Subscriber Lines Operating at Rates Substantially in Excess of the Basic Access Rate" T1E1.4 Technical Subcommittee (T1E1.4/89-070), Mar. 13, 1989.
SX-200 Digital PABX/General Description 9109-094-100-NA, Issue 4, Revision 1, pp. 1-46, Nov. 1, 1990.
Ciciora, Walter et al, "Protocol Issues", Modern Cable Television Technology, Video, Voice and Data Communications, Section 4.4, Copyright 1999 by Morgan Kauffmann Publishers Inc. , 1-22, Jan. 1, 1999.
Ascend Communications, Inc., "Ascend DSLPipe-S Features", 2 pages, May 12, 1997.
"Troubleshooting Tips for the Cisco uBR904 Cable Modem, Cisco IOS Release 12.0(3)T", 1-62.
"PassPort PC Plug in Quick Setup Guide", Intelogis P/N 30030202, 1998, 8 pages.
Murakoshi, R., "Home Automation", Journal of the Society of Instrument and Control Engines, vol. 23, No. 11, pp. 955-958, Nov. 1, 1984.
ITU-T 1.430 Integrated Services Digital Network—Basic User-Network Interface—Layer 1 Specification, 1-106, Jan. 1, 1996.
SX-200 Digital and SX-200 Light PABX, General Information Guide Lightware 15, 9109-952-006-NA, Issue 1, Revision 0, pp. 1-222, Mar. 1, 1992.
Tanaka H et al, "Telecontrol Systems VJ-501", National Technical Report, vol. 32, No. 6, pp. 809-817, Dec. 1, 1986.
"Claim Chart presented in request for reexamination of US Patent No. 6,480,510 request filed", pp. 1-37, Jul. 28, 1998.
Nishi, H et al, "Control of a Star/Bus Key Telephone System", NTT R and D, vol. 39, No. 8, pp. 122, 1222, 1224-1228, Jan. 1, 1990.
Bell, Robert, IEEE P802.9F Draft Standard for Local and Metropolitan Area Networks—Supplement to Integrated Services (IS) LAN Interface At the Medium Access Control (MAC) and Physical (PHY) Layers, Nov. 1996, pp. 1-22.
Van Den Berg, A.F. et al, "Principes van de Modem: Technieken en Specificaties", Elektronica, vol. 32, No. 5, pp. 11, 13, 15, 17, 19 and 21, Mar. 9, 1984.

"Universal Serial Bus Specification", Revision 1.0, 268 total pages, Jan. 15, 1996.
Boggs, David R. et al, WRL Research Report 88/4; "Measured Capacity of an Ethernet: Myths and Reality", 1-39, Sep. 1, 1988.
"LTS-10 SLTA Core Module Model 65200" Echelon, 12 pages, Jan. 1, 1993.
Limb, John O et al, "An Access Protocol to Support Multimedia Traffic Over Hybrid Fiber/Coax Systems", pp. 1-6, Jan. 1, 2010.
"Cisco Model DPC2607 and EPC2607 Channel-Bonded EMTA User Guide", 1-51, Feb. 1, 2008.
Propp, Michael, Dr., "The Use of Reliable Communications in Telemanagment Trials", Proceedings, 1997, International Symposium on Power-Line Communications and its Applications, 2nd Ed. , 9 pages, Jan. 1, 1997.
"Using the Cable Monitor Tool, Appendix B", Cisco uBR905/uBR925 Cable Access Router Software Configuration Guide, 1-24, Jul. 1, 2001.
Twisted Pair Physcial Layer and Medium Specification Revision: IS-60 8-18-95, EIA-600.32, 49 pages, Aug. 18, 1995.
Tanaka, Masaoki, "Transmission Characteristics of a Power Line Used for Data Communications at High Frequencies", IEEE Transactions on Consumer Electronics, vol. 35, No. 1, pp. 37-42, Feb. 1, 1989.
IEEE Standard for a High Perfomance Serial Bus; IEEE Std. 1394-1995, 392 pages, Jul. 22, 1996.
Loh, L, Ozturk, Y., Quality of Support and Priority Management in Home PNA 2.0 Link Layer, quadrature.. quadrature. Computers and Communications (ISCC 2003). Proceedings Eighth IEEE International Symposium, vol. 2, pp. 861-866, Jun. 30, 2003.
International Telecommunication Union, "ISDN User-Network Interface Data Link Layer Specification" CCITT, Q.921, Nov. 1988, 118 pages.
"Troubleshooting Tips for the Cisco uBR904 Cable Modem", 1-39.
Tsuda, Toru et al, "Experimental In-House Multiservice Communication System", Fujistu Scientific and Technical Journal, vol. 16, No. 3, pp. 29-45, Sep. 1, 1980.
"Instant Network Rides on Phone Lines", Electronic Design, 1, Jan. 1, 1987.
Yamamoto, K. et al, "New Home Telephone System Using Japanese Home Bus System Standard", IEEE Transactions on Consumer Electronics, vol. 35, No. 3, pp. 687-697, Aug. 1, 1989.
"Home PNA Specification 1.0 Field Tests Status", Home Phoneline Networking Alliance Inc. , pp. 1-6, Mar. 1, 1999.
Sdralia V. et al, "Performance Characterisation of the MCNS DOCSIS 1.0 CATV Protocol with Prioritised First Come First Served Scheduling", IEEE Transactions on Broadcasting, US, vol. 45, No. 2, pp. 196-205, Jun. 1, 1999.
"LonWorks LPT-10 Link Power Transceiver User's Guide Version 2.1", Echelon Corporation, 60 pages, Jan. 1, 1995.
Drudy, Francis, "Considerations and Recommendations on Power Feeding at AN 802.9", IEEE 802.9-IVD LAN Interface Working Group, Reference IEEE 802.87*9.618, 1-6, Nov. 5, 1987.
Hofman, J., "Cable, Television, and the Consumer Electronic Bus":, Panasonic Technologies Inc., 9 Pages, Jun. 11, 1987.
"Connectivity Problems for uBR900 Cable Modems, Document ID: 43061", 1-5, Oct. 31, 2008.
"David Information Manager System Description Manual, Revision A", 1-114, Mar. 1, 1987.
"US Robotics Courier V. Everything External Modem—Getting Started Guide", 1-64, Apr. 1, 1996.
Azzam, Albert A., High-Speed Cable Modems, pp. 1-246, ISBN: 0-07-006417-2, 1-276, Jan. 1, 1997.
Marthe, Emmanuel et al, "Indoor Radiated Emission Associated with Power Line Communication Systems", Swiss Federal Institute of Technology Power Systems Laboratory IEEE , pp. 517-520, Jan. 1, 2001.
"Technical Specifications, Appendix A, Cisco uBR924 Router Hardware Installation Guide", 1-6, Mar. 1, 2000.
"HomePlug TM Powerline Alliance, HomePlug Initial Draft Medium Interface Specification", 111 pages, May 19, 2000.
Artom, A. et al, "Medium-Term Prospects for New Services to the Telephone Customers", Conference Record, Int'l Conf. On Communications, Denver CO, pp. 14.4-14.4-6, Jun. 14, 1981.

(56) References Cited

OTHER PUBLICATIONS

Roek, Guenter, Radio Frequency (RF) Interface Management Information Base for MCNS Compliant RF Interfaces Draft-ietf-Jipcdn-rf-interface-mib-07.txt;, pp. 1-55, May 22, 1998.
"Hart Field Communication Protocol—an introduction for users and manufacturers", Hart Communication Foundation, 12 pages, Oct. 1, 1995.
Nash, R.D. et al, "Simultaneous Transmission of Speech and Data Over an Analog Telephone Channel". GLOBECOM '85. IEEE Global Telecommunications Conference, Conference Record. Communicaiton Technology to Provide New Services, New Orleans LA. , pp. 4.2.1-4.2.4, Dec. 2, 1985.
Bak, David, "LAN Operates Over Existing Power Lines", Design News,, 3 pages, Jan. 23, 1989.
Cisco Systems, "Catalyst 5000 Switching System", 1996, pp. 1-4.
Herbold, Jacob et al, "Banish Those "Wall-Warts" With Power Over Ethernet", Electronic Design Online, 8 pages, Oct. 27, 2003.
Strassberg, Dan, "Home Automation Buses", Protocols Really Hit Home, EDN, 1-9, Apr. 13, 1995.
Russell, B. Don, "Communication Alternatives for Distribution Metering and Load Mangement", IEEE Transactions on Power Apparatus and Systems, vol. PAS-99, No. 4, pp. 1448-1455, Jul. 1, 1980.
Cable Television Laboratories Inc., "Data-Over-Cable Service Interface Specifications: Radio Frequency Interface Specification—SP-RFI-104-980724", pp. 1-204, Jan. 1, 1997.
"Cable Hardware and Software: uBR7200, uBR7100, uBR10K, uBR905 FAQ, Document ID: 63990", 1-5, Sep. 3, 2006.
"The DSL Sourcebook", Paradyne Corporation, DSL-BOOK-3.0-0900, 98 pages, Jan. 1, 2000.
Hiroshi, Takeda, "Patent Abstracts of Japan", Japanese Publication No. 10200544 A2, (Matsushita Electric Works, Ltd.), 1, Jul. 31, 1998.
"Spread Spectrum Carrier Technology Enabling Reliable Communications Over Noisy Media", Intellon, 8 pages, Jan. 1, 2010.
Metcalfe, Bob, "Cheap, Reliable Powerful Net Connections May Be as Close as an Electrical Socket Vo. 19, issue 6", 4 pages, Feb. 10, 1997.
21145 Phoneline/Ethernet LAN Controller, Intel Corporation Copyright 1999 http://developer.intel.com/design/network/21145.htm, 1-3, Aug. 31, 1999.
Abramson, H., "Docsis 1.1 IGMP MIB" Motorola, pp. 1-13, Jun. 1, 1999.
"Data Over Voice is Solution for Corporate Network", Telephone Engineer and Management, vol. 91, No. 9, pp. 67-69, May 1, 1987.
"SuperStack II Baseline 10/100 Switch User Guide", 3Com, pp. 1-8, May 1, 1998.
Diclementi, Domenic A. et al, "Electrical Distribution System Power Line Characterization" COPYRGT 1996, IEEE, pp. 271-276, Jan. 1, 1996.
Faust, A. et al, "Remote Powered Data Transmission System, Telecommunications Energy Conference", INTELEC ' 89, Conference Proceedings, Eleventh International, vol. 2, Oct. 1989, 1-5.
Cisco, "Cisco 677—SOHO/Telecommuter ADSL Router", Cisco Product Catalog, Dec. 2000, 6 pages.
3COM Netbuilder Data Sheet, "NETBuilder II Intelligent Routers 3Com", 1998, 8 pages.
Apple Computer, Inc., "AirPort", Apple Computer, Inc. 1999, 5 pages.
Cornerstone, "Cornerstone Voice—Economical Delivery of Telephony Services in the Hybrid Fiber/Coax Network", Issue 2, Aug. 1996, 22 pages.
Cervenka, Dana, "Building cablephone systems piece by piece, Manufacturers provide an update", Cable Telephony, CED: Communications Engineering & Design, Mar. 1996, 6 pages.
Business Wire, "Phasecom Announces Wireless System Headend Controller for Business and Residential MMDS/LMDS Modems.", Sep. 18, 1999, Business Wire, 2 pages.
Business Wire, Phasecom's New Broadband Bridge Cable Modem Will Help MSOs Tap Into Major Growth Market for Private Data Networks Over Cable., Oct. 8, 1996, Business Wire, 2 pages.

Scientific-Atlanta, Inc., "CoAxiom™ CoAxium Customer Interface Unit", © 1996, 1997 Scientific-Atlanta, Inc., 3 pages.
Scientific-Atlanta, "Cable Telephony, CoAxiom™ Cable Telephony System Architecture", Copyright 1994, 1 page.
Eldering, Charles, et al., "Engineering Requirements for Hybrid Fiber—Coax Telephony Systems", 1994 NCTA Technical Papers, pp. 219-231.
Drudy, Francis, et al., "Considerations and Recommendations on Power Feeding at an 802.9 Interface", IEEE 802.9—IVD LAN Interface Working Group, Nov. 5, 1987, 6 pages.
Pairgain Technologies, Inc., "HiGain Line Unit Quick Installation Guide", PairGain Technologies, Inc. Engineering Services Technical Practice, Section 350-231-165-01, Sep. 15, 1998, 28 pages.
Pairgain Technologies, "Quick Installation Guide for PairGain™ Technologies HiGain™ Remote Enclosure Model HRE-421 Issue 1", PairGain Technologies, Technical Practice, Engineering-Plant Series, Section 100-421-100, Revision 05, Aug. 15, 1995, 6 pages.
Ciscopro, "CiscoPro EtherSwitch Stack System", Copyright 1995 Cisco Systems, 4 pages.
Cisco Systems, "Catalyst 3000 Ethernet Modules, Easy-to-Install Modules for Cient/server or Shared Connectivity Applications", Data Sheet, Copyright 1997 Cisco Systems, 3 pages.
IEEE Standard for Information Technology, "Part 3: Carrier Sense Multiple Access with Collision Detection (CSMA/CD) access method and Physical Layer specifications", IEEE, 2006, 790 pages.
Riddel, Jeff, "PacketCable Implementation", Cisco Press, Feb. 2007, 1104 pages.
Wood, Robert, "Next-Generation Network Services", Cisco Press, Nov. 2005, 624 pages.
Committee T1—Telecommunications, "T1.413 Issue 2", 1998, 270 pages.
Dye, Mark A., et al., "Network Fundamentals CCNA Exploration Companion Guide", Cisco Press, Feb. 2011, 560 pages.
The Institute of Electrical and Electronics Engineers, Inc., "Part 11: Wireless LAN Medium Access Control (MAC) and Physical Layer (PHY) specifications", Jun. 26, 1997, 465 pages.
The Institute of Electrical and Electronics Engineers, Inc., "Part 11: Wireless LAN Medium Access Control (MAC) and Physical Layer (PHY) specifications, High-speed Physical Layer in the 5 GHz Band", Jun. 12, 2003, 91 pages.
The Institute of Electrical and Electronics Engineers, Inc., "Part 11: Wireless LAN Medium Access Control (MAC) and Physical Layer (PHY) specifications: Higher-Speed Physical Layer Extension in the 2.4 GHz Band", Jun. 12, 2003, 96 pages.
First Pacific Networks, "Response to CableLabs RFI on Cable Telecommunications Equipment and Systems", Mar. 10, 1994, 46 pages.
First Pacific Networks, Inc., "1997 Business Plan Appendix", 1997, 79 pages.
Communications Industry Researchers, Inc., "Cablephone: A Technology and Market Assessment for Cable-Telephony Systems", 1995, 199 pages.
Canada Newswire Ltd., "Norther Telecom (Nortel) to Market Com21 Cable Modems with Cornerstone Voice", Dec. 4, 1996, 20 pages.
Bernier, Paula, "Northern Telecom joins HFC bandwagon", Telephony, Nov. 21, 1994, 26 pages.
DSC Communications Corporation, "News Release: DSC and General Instrument Announce New Integrated Video and Telephony System", May 3, 1994, 8 pages.
The Institute of Electrical and Electronics Engineers, Inc., "Digest of Papers, Spring Compcon 82", Feb. 1982, 7 pages.
Motorola, "CableComm™. Building on the Strength of the Coax/Fiber Cable Infrastructure.", 1994, 18 pages.
Phasecom, "Broadband Bridge System—P545", 1997, 8 pages.
Scientific-Atlanta, Inc., "Broadband Communications Group Backgrounder", Mar. 1995, 4 pages.
COM21, "ComPORT Cable Modem Specifications", 1997, 3 pages.
Cyberlab University, "The Broadband Bob Report", Jul. 1, 1997, 24 pages.
Motorola Multimedia Group, "Cable Data Modems, A Primer for Non-Technical Readers", 1995, 66 pages.
Drudy, Francis, et al., "Considerations and Recommendations on Power Feeding at an 802.9 Interface", Nov. 5, 1987, 6 pages.

(56) References Cited

OTHER PUBLICATIONS

International Telecommunication Union, "ISDN User-Network Interfaces—Reference Configurations", Mar. 1993, 11 pages.
International Telecommunication Union, "Basic User-Network Interface—Layer 1 Specification", Mar. 1993, 106 pages.
Pairgain Technologies, Inc., "HiGain Line Unit Quick Installation Guide", Sep. 15, 1998, 28 pages.
Pairgain Technologies, Inc., "HiGain Line Unit Model HLU-231 List No. 8 Installation Guide", Aug. 13, 1999, 78 pages.
Pairgain Technologies, Inc., "HiGain Line Unit Model HLU-319 List No. 4B Installation Guide", Dec. 22, 1997, 56 pages.
Pairgain Technologies, Inc., "HiGain Remote Unit Model HRU-412 List No. 8A Installation Guide", Mar. 31, 1998, 42 pages.
Pairgain Technologies, Inc., "HiGain Remote Unit Model HRU-412 List No. 6 Installation Guide", Oct. 28, 1998, 39 pages.
ADC Telecommunications, Inc., "HiGain HDSL2 Modules Specifications", Feb. 2003, 12 pages.
David Systems, Inc. "David Co-Net Command Reference", 1988, 342 pages.
David Systems, Inc. "David Co-Net Installation Manual", 1988, 228 pages.
David Systems, Inc. "David Systems David Information Manager", Feb. 1985, 38 pages.
David Systems, Inc. "David Information Manager System Description Manual", Mar. 1987, 114 pages.
David Systems, Inc. "David Information Manager Technical Overview", Sep. 1988, 74 pages.
David Systems, Inc. "David Co-Net Technical Reference Manual", 1988, 326 pages.
David Systems, Inc. "David Co-Net Maintenance Manual", 1990, 309 pages.
David Systems, Inc., "David Co-Net Voice and Data Configuration Manual", Oct. 1990, 233 pages.
Verilink Corporation, "ConnecT1 DSU", 1988, 12 pages.
Verilink Corporation, "ConnecT1 DSU (Data Service Unit)", Jul. 28, 1992, 88 pages.
3COM, "AirConnect Access Point User Guide", Jan. 2000, 91 pages.
3COM, "OfficeConnect® ISDN LAN Modem 3C892 User Guide", Feb. 1999, 129 pages.
American National Standards Institute, Inc., "American National Standards for Telecommunications—Network and Customer Installation Interfaces—Asymmetric Digital Subscriber Line (ADSL) Metallic Interface", Nov. 11, 1998, 264 pages.
AT&T, "ISDN Installation and Test Manual", Issue 3, Feb. 1993, 313 pages.
IEEE Computer Society, "IEEE Standards for Local and Metropolitan Area Networks: Supplement to Integrated Services (IS) LAN Interfact at the Medium Access Control (MAC) and Physical (PHY) Layers: Specification of ISLAN16-T", Feb. 16, 1996, 344 pages.
Cervenka, D., "When Will Cablephone Ring?", Communication Engineering & Design Magazine, Mar. 1995, 8 pages.
Cisco Systems, Inc., "Cisco 4000 Series", 1996, 37 pages.
David Systems, Inc., "David Co-Net System Administrator's Guide", 1991, 187 pages.
Stallings, W., "Local Networks Third Edition", 1990, 534 pages.
Dunsmore, B., et al., "Telecommunications Technologies Reference", Cisco Systems, May 2009, 640 pages.
The Institute of Electrical and Electronics Engineers, Inc., "IEEE Standards for Local and Metropolitan Area Networks: Supplement to Carrier Sense Multiple Access with Collision Detection (CSMA/CD) Access Method and Physical Layer Specifications. Media Access Control (MAC) Parameters, Physical Layer, Medium Attachment Units, and Repeater for 100 Mb/s Operation, Type 100BASE-T (Clauses 21-30)", 1996, 415 pages.
Correia, A., et al., "SnmpMan 1.1 Instructions", University of Lisbon Faculty of Sciences, Jun. 13, 1994, 3 pages.
Burroughs, Rs, "A Point of Entry Interface for 2-Way Broadband Information Delivery", Panasonic Technologies, Inc., 1993 NCTA Technical Papers, pp. 52-61.
Haug, C., "DLC Technology Update", Telephony, Jun. 8, 1992, 4 pages.
Lyford, R., et al., "Telephony over cable: CISN and CLC-500", Communications Technology, Dec. 1993, 4 pages.
Best, A., "Preparing for the future: How much bandwidth and fiber is enough?", Communications Technology, Jan. 1994, 5 pages.
Pinkham, R., "Combining apples and oranges: The modern fiber/coax network—Part 2 of a four-part series", Telephony, Feb. 7, 1994, 5 pages.
Pinkham, R., "Combining apples and oranges: the modern fiber/coax network—Part 3 of a four-part series", Telephony, Feb. 21, 1994, 4 pages.
Cisco Systems, "Catalyst 3000 Highlights", Catalyst 3000 and Catalyst Matrix, 1996, 3 pages.
Ciscopro, "CiscoPro EtherSwitch 1400 Series Modules", Workgroup Solutions, 1995, 2 pages.
Cisco Systems, "Cisco 10S(tm) Software Feature Matrices: Releases 8.3 through 11.2", Product Bulletin—Public #511, 1996, 30 pages.
Cisco, "About This Guide", 1997, 52 pages.
Ciscopro, "CiscoPro EtherSwitch CPW2115", Workgroup Solutions, 1995, 4 pages.
Adtran, "HDSL T200 HTU-R, Span Powered, 60 mA Installation and Maintenance Practice", Apr. 2008, 49 pages.
3Com, "NetBuilder II Intelligent Routers", Routers Routing and VPN Tunneling, 1998, 8 pages.
3COM, "NETBuilder II Features and Benefits", 2000, 8 pages.
3COM Corporation, "ISDN LAN Modem Getting Started Guide", 3Com Office Connect, Jul. 1999, 8 pages.
3COM, "OfficeConnect™ Remote Getting Started Guide", OfficeConnect The Complete Network Solution for Small Offices, Sep. 1997, 36 pages.
Allied Telesyn, "AT-MC101XL, AT-MC102XL, AT-MC103XL, AT-MC103LH Fast Ethernet Media Converters Installation Guide", Allied Telesyn Simply Connecting the World, 1998, 27 pages.
ISO/IEC, "ISO/IEC JTC1 SC25: Information Technology Equipment Working Group I—Home Electronic Systems (HES)", Jun. 16, 1997, 13 pages.
ISO/IeEC, "HomeGate: A Residential Gateway Model for HES", ISO / IEC JTC1 SC25 WG1 N7387, Feb. 16, 1998, 7 pages.
ISO/IEC, "HomeGate: A Residential Gateway Model for HES", May 25, 1998, 8 pages.
ISO/IEC, HomeGate: A Residential Gateway Model for HES, rev. 5, Oct. 14, 1998, 14 pages.
ISO/IEC, "xTR 15045-1: Information technology Architecture for Residential Gateways", Dec. 30, 1999, 35 pages.
ISO/IEC, "CD1 15045-01: Information technology—Interconnection of information technology equipment—Architecture for HomeGate, the residential gateway (AHRG)", Apr. 1, 2000, 40 pages.
Crystal Semiconductor Corporation, "Highly-Integrated ISA Ethernet Controller", Dec. 1995, 132 pages.
U.S. Robotics Access Corp., "Courier I-Modem Command Reference", 1996, 219 pages.
Westell, Inc., "Installation Guide—3116-10 Westell DS1 Network Interface Unit with Performance Monitoring", Equipment Issue B, Rev. B, Sep. 2005, 4 pages.
Westell, Inc., "Westell® 3125-52 DS1 Neetwork Interface Unit", Equipment Issue A, Rev. D, Jul. 2008, 12 pages.
ADC Telecommunications, Inc., "Homeworx Access Platform Telephony System", Jul. 1997, 7 pages.
Telecommunications, "ADC Provides Homeworx Telephony System to Nanjing CATV.", Business Wire, Nov. 6, 1997, 2 pages.
ADC Telecommunications, "HomeworxTM Access Platform", 1994, 16 pages.
ADC Telecommunications, "HomeworxTM Access Platform—Overview", 1997, 5 pages.
Cervenka, D., "Building cablephone systems piece by piece, Manufacturerss provide an update", CED: Communications Engineering & Design, Mar. 1996, 6 .pages.
Cablelabs/CCTA, "Unisys Digital Cable Services System", CableNET 1994, 26 pages.
Platt, R., "Why IsoEthernet Will Change the Voice and Video Worlds", IEEE Communications Magazine, Apr. 1996, 5 pages.

(56) References Cited

OTHER PUBLICATIONS

Cisco Systems, Inc., "Installing the Cisco RPS Adapter Plate in Cisco 4000 Series Routers", 1997, 14 pages.
Platt, R., "New Standard Helps Multimedia Get Off the Ground", 1996, IEEE, 5 pages.
Platt, R., et al., "Selsius Next Generation Ethernet Phone, Product Requirements Document", 1998, 12 pages.
Selsius Systems Inc., "The Selsius-IP PBX Overview", 1998, 6 pages.
Zgliczynski, C., "Selsius Systems™ 'Converged Platforms for Enterprise Networks", Jun. 11, 1998, 16 pages.
Zgliczynski, C., "Selsius Systems™ The Distributed IP PBX", Jun. 8, 1998, 14 pages.
Corley, Dave, "The Selsius-LAN PBX", Oct. 30, 1997, 6 pages.
NetworkWorld, Inc., NetworkWorld Reprint, "PBX spin off takes IP plunge", Sep. 22, 1997, vol. 14, No. 58, 5 pages.
Zgliczynski, C., Selsius SystemsTM, "IP Telephony Appliances-Next Generation IP Telephony endpoints", 1998, 10 pages.
Droms, R., "Dynamic Host Configuration Protocol", Oct. 1993, 40 pages.
Wimer, W. "Clarifications and Extensions for the Bootstrap Protocol", Oct. 1993, 23 pages.
Efficient Networks, Inc., Product Data Sheet for Internal SpeedStream 3010, 1999, 2 pages.
Efficient Networks, Inc., Product Data Sheet for Internal SpeedStream 3020, 1999, 2 pages.
Efficient Networks, Inc., Product Data Sheet for Internal SpeedStream 3060, 1999, 2 pages.
Efficient Networks, Inc., Product Data Sheet for Standalone SpeedStream 4020 USB Modem, 1999, 2 pages.
Efficient Networks, Inc., Product Data Sheet for Standalone SpeedStream 4041 USB Modem, 1999, 2 pages.
Efficient Networks, Inc., Product Data Sheet for Standalone SpeedStream 4060 USB modem, 1999, 2 pages.
Efficient Networks, Inc., Product Data Sheet for Standalone SpeedStream 5010 Ethernet modem, 1999, 2 pages.
Efficient Networks, Inc., Product Data Sheet for SpeedStream Ethernet DSL modems, SpeedStream 5200 series, 2000, 2 pages.
Efficient Networks, Inc., Product Data Sheet for SpeedStream 5250 SDSL modem, 1999, 2 pages.
Efficient Networks, Inc., Product Data Sheet for SpeedStream5250, 1999, 2 pages.
Efficient Networks, Inc., Product Data Sheet for SpeedStream 5621 Ethernet DSL Router, 1999, 2 pages.
Efficient Networks, Inc., Product Datasheet for SpeedStream 5660 Ethernet DSL Router, 1999, 2 pages.
Efficient Networks, Datasheet for Business Class DSL Routers, 2000, 2 pages.
Efficient Networks, Inc. "SpeedStream 5260 ADSL LAN Modem Installation Guide", 11 pages, 2000.
Efficient Networks, Inc. "SpeedStream 5600 Series ADSL Router Installation Guide", 39 pages., 1999.
Efficient Networks, Inc. "SpeedStream 5861 ADSL Business Class Router Quick Start Guide", 47 pages, 2000.
Efficient Networks, Inc. Product Datasheet for Business Class VoDSL, 2 pages., 2000.
Efficient Networks, Inc. "SpeedStream® DSL USB Modem Installation Guide", 18 pages, 2000.
Aware, "Aware Announces Commercial Availability of the X200 ADSL Access Router at Networld+Interop '97", 3 pages., Oct. 7, 1997.
Aware Inc., Datasheet for x200 ADSL Access Router, 5 pages, Jan. 20, 1993.
3COM, "NETBuilder II Ethernet 2-Port 10BASE-Fl Module Installation Guide", Sep. 1993, 16 pages.
Flowpoint Cabletron Systems, FlowPoint FP2200 SDSL Router Customer Release Notes, Jun. 21, 1999, 5 pages.
Flowpoint Cabletron Systems, "FlowPointTM Router 2200-12 SDSL Router Quick Start Guide", Mar. 1999, 48 pages.
2WIRE, Inc., Datasheet for HomePortalTM 1000, 1999, 2 pages.
Proxim, Inc., Datasheet for Symphony Cordless Ethernet Bridge, 1999, 4 pages.
Pairgain Technologies, PairGain® Technologies HiGain® Doubler Unit Model HDU-451 Issue 1, Section 150-451-132-02, Revision 02, Nov. 13, 1997, 22 pages.
Pairgain Technologies, Inc., "HiGain Line Unit Engineering Services Technical Practice Manual", Dec. 22, 1997, 56 pages.
Verilink Corporation, "ConnecT1 DSU (Data Service Unit)", Jul. 28, 1992, 87 pages.
Verilink Corporation, "Verilink Connect1 DSU Data Service Unit Addendum 3 to User's Manual", Dec. 3, 1990, 72 pages.
Cisco, "EtherSwitch 1420 and EtherSwitch 1220 Reference Manual", 2001, 162 pages.
Selsius Systems Inc., "A Fundamental Shift in Telephony Networks, A White Paper", Mar. 1, 1998, 20 pages.
Selsius Systems, "Corporate Fact Sheet" and "System Overview", Aug. 26, 1998, 34 pages.
Selsius Systems, Inc., "Voice over LAN/WAN Infrastructure", 1997, 14 pages.
Wireless, Inc., "2.4 GHz ACCESS MicroLink™ Operations Manual", Nov. 1998, 107 pages.
Cayman Systems, Inc., Press Release for Cayman Systems ADSL 3220 Router With Alcatel's DynaMiTe ADSL Chipset, Jan. 11, 1999, 3 pages.
Cayman Systems, Inc., Datasheet for ADSL 3220 Router, 2000, 2 pages.
Cayman Systems, Inc., "Getting Started with the Cayman 3220-H", Jan. 2000, 4 pages.
Cayman Systems, Inc., Cayman 3220-H Series Gateways Manual, 2000, 4 pages.
Cayman Systems, Inc., "Getting Started with the Cayman 3220-H-W11", Oct. 2000, 4 pages.
Cervenka, D., "Building cablephone systems piece by piece: Manufacturers provide an update", CED: Communications Engineering & Design, Mar. 1996, 6 pages.
Pairgain Technologies, Inc., HiGain Line Unit Manual, Revision 01, Dec. 22, 1997, 56 pages.
Suranyi, Gabriel G., "The Need for Home Power: It Is Just Around the Corner", IEEE, Jul. 1997, 7 pages.
Verilink Corporation, Datasheet for Connectl DSU, 1988, 12 pages.
Ansi/IEEE, "Local Area Networks, Carrier Sense, Multiple Access with Collision Detection", Dec. 1984, 146 pages.
Pairgain Technologies Inc., PairGain™ Technologies HiGain-2TM Remote Unit Model HRU-612 Manual, Revision 02, Aug. 21, 1996, 19 pages.
Cisco Systems, Inc., "Cisco 675 ADSL Router Installation and Operation Manual", Version 2.0.0, Aug. 1998, 118 pages.
Cisco Systems, Inc., Cisco 675 SOHO/Telecommuter ADSL Router Data Sheet, 1999, 3 pages.
Cisco Systems, Inc., Cisco 675e Small Office Home Office/Telecommuter ADSL Router Data Sheet, 1999, 3 pages.
Cisco Systems, Inc., Cisco 678 Small Office/Home Office/Telecommuter ADSL Router Data Sheet, 2000, 3 pages.
Cisco Systems, Inc., "Cisco Aironet 340 Series LAN Wireless Solutions", Mar. 20, 2000, 24 pages.
Cisco Systems, Inc., Cisco Aironet 340 Series Client Adapters and Access Points—In-Building Wireless Solutions Data Sheet, 2000, 7 pages.
Cisco Systems, Inc., "Quick Start for the Cisco ADSL 675 Router", 1998, 2 pages.
Cisco Systems, Inc., "Release Notes for Cisco Aironet 340 Series Access Points", Apr. 4, 2000, 8 pages.

* cited by examiner

LOCAL AREA NETWORK OF SERIAL INTELLIGENT CELLS

This is a continuation of copending parent application Ser. No. 11/300,313, which is a continuation of Ser. No. 10/178,223, filed Jun. 25, 2002, which itself is a continuation of U.S. patent application Ser. No. 09/123,486 filed Jul. 28, 1998, now U.S. Pat. No. 6,480,510, issued Nov. 12, 2002

FIELD AND BACKGROUND OF THE INVENTION

The present invention relates to local area networks and, more particularly, to local area network topologies based on serial intelligent cells.

Bus Topology

Most prior art local area networks (LAN) use a bus topology as shown by example in FIG. 1. A communication medium 102 is based on two conductors (usually twisted pair or coaxial cable), to which data terminal equipment (DTE) units 104, 106, 108, 110, and 112 are connected, via respective network adapters 114, 116, 118, 120, and 122. A network adapter can be stand-alone or housed within the respective DTE.

This prior art bus topology suffers from the following drawbacks:

1. From the point of view of data communication, the medium can vary significantly from one installation to another, and hence proper adaptation to the medium cannot always be obtained.

2. The bus topology is not optimal for communication, and hence:
  a) the maximum length of the medium is limited;
  b) the maximum number of units which may be connected to the bus is limited;
  c) complex circuitry is involved in the transceiver in the network adapter;
  d) the data rate is limited.

3. Terminators are usually required at the ends of the medium, thus complicating the installation.

4. Only one DTE can transmit at any given time on the bus, and all other are restricted to be listeners.

5. Complex arbitration techniques are needed to determine which DTE is able to transmit on the bus.

6. In case of short circuit in the bus, the whole bus malfunctions, and it is hard to locate the short circuit.

7. Addresses should be associated independently with any network adapter, and this is difficult to attain with bus topology.

Star Topology

A number of prior art network devices and interconnections summarized below utilize star topology.

The multiplexer is a common item of equipment used in communication, both for local area networks and wide-area networks (WAN's). It is used in order to provide access to a data communications backbone, or in order to allow sharing of bandwidth between multiple stations. As shown in FIG. 2, one side of a multiplexer 202 is usually connected to a single high data rate connection 204 ("highway"), but several such connections can also be used. The other side of multiplexer 202 has multiple low data rate connections 206, 208, 210, 212, and 214. The ellipsis . . . indicates that additional connections can be made. Each low data rate connection uses part of the bandwidth offered by the high data rate connection. These low data rate connections can be of the same type or different types, and can have different or identical data rates. The multiplexing technique most commonly used is time-domain multiplexing (TDM). However, frequency-domain multiplexing (FDM) is also used.

A popular multiplexer in use is the voice multiplexer, shown in FIG. 3. A pulse-code modulation (PCM) bus 304 handling 2.048 megabits per second, containing 30 channels of 64 kilobits per second is connected to one side of a PABX/PBX 302, and up to 30 telephone interfaces 308, 312, and 316 are connected to the other side via connections 306, 310, and 314. The ellipsis . . . indicates that additional connections can be made. In this configuration, each channel in the PCM bus can be switched or be permanently dedicated to a specific telephone line. An example of such system is disclosed in U.S. Pat. No. 3,924,077 to Blakeslee.

Similarly a small private branch exchange (PABX/PBX), as shown in FIG. 4, is widely used (usually in an office or business environment) where several outside lines 403, 404, and 405 are connected to one side of a PABX/PBX 402, and multiple telephones 408, 412, and 416 are connected to the other side via lines 406, 410, and 414, respectively. The ellipsis . . . indicates that additional connections can be made. The PABX/PBX connects an outside line to a requesting or requested telephone, and allows connection between telephones in the premises.

In the configurations described above, star topology is used in order to connect to the units to the multiplexer, which functions as the network hub. The disadvantages of star topology include the following:

1. A connection between each unit and the network hub is required, and the wiring required for this connection can involve a lengthy run.

Thus, when adding new unit, an additional, possibly lengthy, connection between the new unit and the network hub must be added.

2. No fault protection is provided: Any short circuit or open circuit will disrupt service to the affected units.

3. The multiplexer can impose extensive space and power requirements.

Computer Interfaces

Various interface standards have been established in order to allow interoperability between the PC (personal computer) or workstation and its various connected elements. These standards usually relate to both mechanical and electrical interfaces, and include industry standard architecture (ISA), extended industry standard architecture (EISA), Personal Computer Memory Card Industry Association (PCMCIA), intelligent drive electronics (IDE), small computer system interface (SCSI), and others. Each added hardware unit usually utilizes a specific software driver for interoperability with the specific platform. These protocols are applicable to small distances only, and allow units to be housed within or nearby the PC or workstation enclosures. For example, equipping a PC for video capture could involve a plug-in ISA card housed within the PC on the motherboard, a video camera connected to the card, and a software driver. This configuration does not allow remote video monitoring.

Relevant Prior Art

The use of the same wire pair or pairs for both power and data communication is well known, and is widely used in telecommunications, from "Plain Old Telephone Service" ("POTS") to Integrated Services Digital Network (ISDN) and broadband services in the local-loop including other Digital Subscriber Line (xDSL) technologies. Such a concept is described, for example, in U.S. Pat. No. 4,825,349 to Marcel, describing using two pairs for such a scheme. A DC-to-DC converter for such DC feeding is described, for example, in U.S. Pat. No. 4,507,721 to Yamano et al.

The concept of power line communication (PLC) is also widely known. However, in most cases the connection is similar to a LAN environment, in which a single transmitter occupies the entire medium. Examples of such techniques include X-10 and the consumer electronics bus (CEBus, described in the EIA-600 standard). Much of this technology uses complex spread-spectrum techniques in order to accommodate problematic media (characterized by high amounts of noise and interference). Even with such improved technologies, however, the data rate obtained is relatively low.

Prior art in this field includes U.S. Pat. No. 5,684,826 to Ratner, U.S. Pat. No. 5,491,463 to Sargeant et al., U.S. Pat. No. 5,504,454 to Daggett et al., U.S. Pat. No. 5,351,272 to Abraham, U.S. Pat. No. 5,404,127 to Lee et al., U.S. Pat. No. 5,065,133 to Howard, U.S. Pat. No. 5,581,801 to Spriester et al., U.S. Pat. No. 4,772,870 to Reyes, and U.S. Pat. No. 4,782,322 to Lechner et al. Other patents can be found in U.S. Class 340/310 (sub-classes A/R and others) and International Class H04M 11/04.

The concept of using existing telephone wiring also for data communication is first disclosed in U.S. Pat. No. 5,010,399 to Goodman et al., where video signals superimposed over the telephone signals are used. However, the scheme used is of the bus type and has the drawbacks of that topology. Similarly, the idea of data transmission over a public switched telephone network (PSTN) using the higher frequency band is widely used in the xDSL systems, as is disclosed in U.S. Pat. No. 5,247,347 to Litteral et al. The patent discloses an asymmetric digital subscriber line (ADSL) system. However, only a single point-to-point transmission is described over the local-loop, and existing in-house wiring is not discussed, and thus this prior art does not disclose how to configure a full multipoint network. Multiplexing xDSL data and the POTS/ISDN data uses FDM principles, based on the fact that the POTS/ISDN services occupy the lower portion of the spectrum, allowing for the xDSL system to use the higher bandwidth.

A home bus network using dedicated wiring is disclosed in U.S. Pat. No. 4,896,349 to Kubo et al., and a home automation network based on a power line controller (PLC) is disclosed in U.S. Pat. No. 5,579,221 to Mun. U.S. Pat. No. 4,714,912 to Roberts et al. is the first to suggest communicating data over power lines not in bus topology but as 'break-and-insert'. However, only single conductor is used, and the receivers are all connected again using a bus topology.

In addition, U.S. patent application Ser. No. 08/734,921, Israel Patent Application No. 119454, and PCT Patent Application No. PCT/IL97/00195 of the present inventor disclose a distributed serial control system of line-powered modules in a network topology for sensing and control. These documents, however, do not disclose a local area network for data communications.

The prior art documents mentioned above are representative examples in the field. Certain applications are covered by more than one issued patent.

There is thus a widely recognized need for, and it would be highly advantageous to have, a means of implementing a local area network for data communications which does not suffer from the limitations inherent in the current methods. This goal is met by the present invention.

SUMMARY OF THE INVENTION

The present invention is of a local area network for data communication, sensing, and control based on serially connected modules referred to as "serial intelligent cells" (SIC's). An example of a local area network of such devices according to the present invention is illustrated in FIG. 7, to which reference is now briefly made. In this example, SIC's 700, 702, 704, 706, and 708 are connected by one or more conducting wire pairs (such as a twisted pair 710). This allows chaining, such as SIC 700 to SIC 702 to SIC 704. However, SIC 700, SIC 706, and SIC 708, located at the ends are equipped with single connection. SIC 704 is equipped with three connections, and even more connections are possible. A SIC may be interfaced to one or more DTE's, as illustrated by a DTE 714 interfaced to SIC 700 and by DTE's 716 and 718 interfaced to SIC 704. SIC's need not have an interface, however, as is illustrated by SIC 706 and SIC 702. SIC 702, though, serves as a repeater, connecting SIC 700 and SIC 704. It is to be noted that the networks according to the present invention utilize electrically-conducting media to interconnect the SIC's. Each electrically-conducting medium connects exactly two SIC's into a communicating pair of SIC's which communicate bidirectionally and independently of other communicating pairs in the local area network. Electrically-conducting media are media which transmit signals by conducting electrical current or by propagating electrical potential from one point to another. Electrically-conducting media include, but are not limited to wires, twisted pair, and coaxial cable. But electrically-conducting media do not include media such as fiber optic lines, waveguides, microwave, radio, and infrared communication media.

As noted above, SIC's in a communicating pair communicate bidirectionally. For example, SIC 704 can initiate communication (as a sender) to SIC 702 (as a receiver), but SIC 704 can just as well initiate simultaneous communication (as a sender) to SIC 700 (as a receiver). Bidirectional communication can take place simultaneously, and herein is taken to be equivalent to "full duplex" communication. In addition, as noted above, the communication between the SIC's of a communicating pair is independent of the communication between the SIC's of any other communicating pair, in that these communications neither preclude nor affect one another in any way. Furthermore, every communication between SIC's is a "point-to-point communication", which term herein denotes a communication that takes place between exactly one sender and exactly one receiver. This is in contrast to a bus-based communication, in which there are many (potential) receivers and many (potential) senders. Consequently, in the topology according to the present invention, there is automatically a termination in the physical layer at each end of a connection (a SIC), both simplifying the installation and insuring more reliable communication.

The topology according to the present invention is superior to the prior art bus topology in the following ways:

1. There is no physical limit to the number of SIC's which may be installed in the network, and hence no physical limit to the number of DTE's in the network.

2. Point-to-point communication allows higher data rates over greater distances.

3. Point-to-point communication requires less complex circuitry than bus circuitry.

4. Several SIC's can transmit and receive simultaneously. For example, SIC 700 can communicate with SIC 702 while SIC 704 communicates simultaneously with SIC 706.

5. There is no need for arbitration, allowing more efficient utilization of the network. Furthermore, priorities can be assigned to each SIC or, alternatively, to each specific message to allow the data routing to take care of priorities.

6. Addresses may be assigned by the network.

7. In the case of failure of any conductor or SIC, the network can sense the fault immediately, and the specific location of the fault (up to the specific SIC pair) is easily obtained.

Therefore, according to the present invention there is provided a local area network for data communication, sensing, and control including a plurality of serial intelligent cells interconnected exclusively by electrically-conducting media into at least one communicating pair, wherein: (a) each of the electrically-conducting media interconnects no more than two of the serial intelligent cells; (b) each of the communicating pair includes one of the electrically-conducting media and exactly two of the serial intelligent cells; (c) each of the communicating pair engages in a communication exclusively over the electrically-conducting media; and (d) each of the communicating pair engages in the communication bidirectionally and independently of the communication of any other of the communicating pair.

BRIEF DESCRIPTION OF THE DRAWINGS

The invention is herein described, by way of example only, with reference to the accompanying drawings, wherein.

DESCRIPTION OF THE PREFERRED EMBODIMENTS

The principles and operation of a local area network according to the present invention may be better understood with reference to the drawings and the accompanying description.

Figure 1:
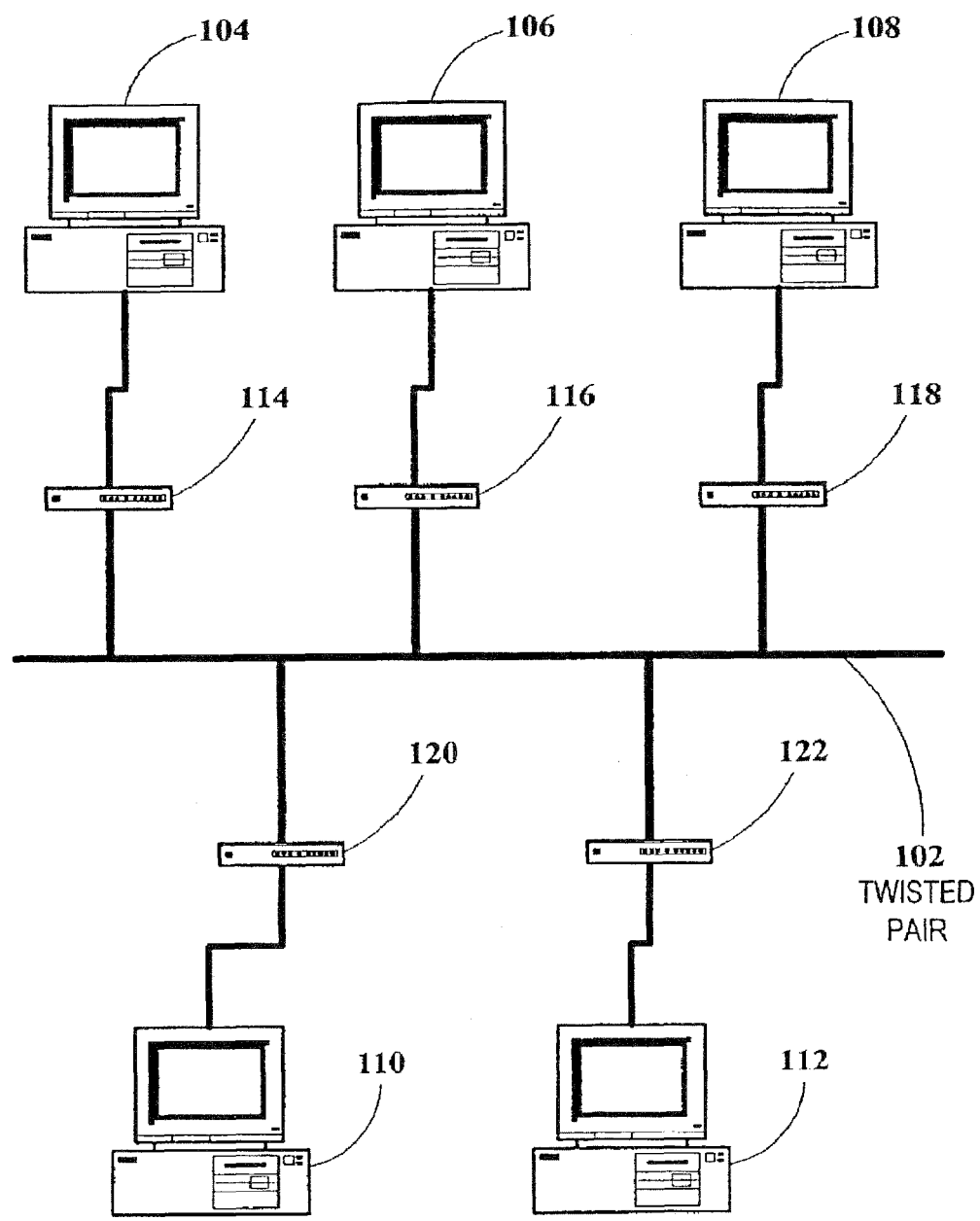
FIG. 1 shows a common prior art LAN bus topology.
Figure 2:
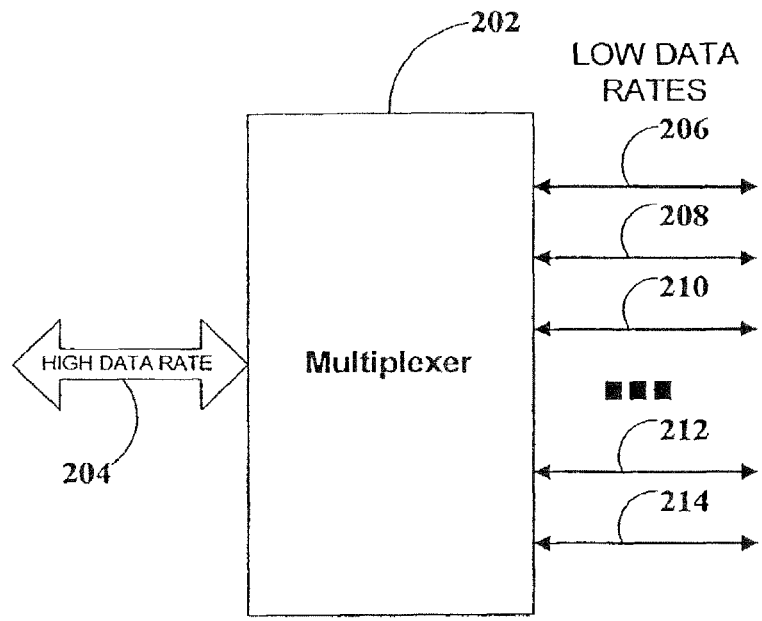
FIG. 2 shows a typical prior art multiplexer.
Figure 3:
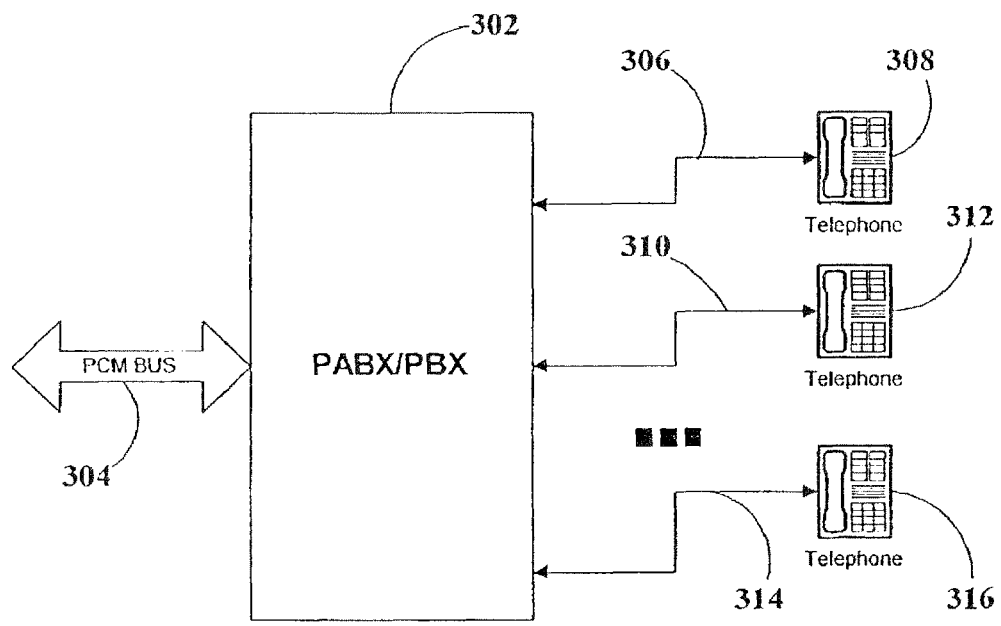
FIG. 3 shows a prior art voice multiplexer (star topology).
Figure 4:
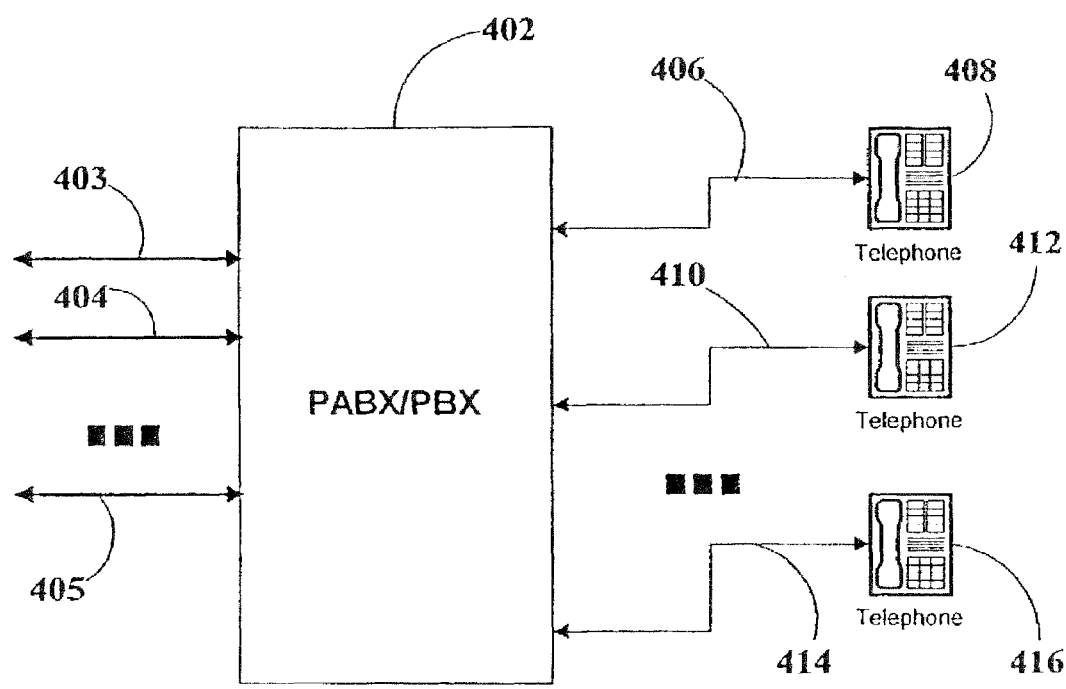
FIG. 4 shows a prior art voice exchange configuration (star topology).
Figure 5:
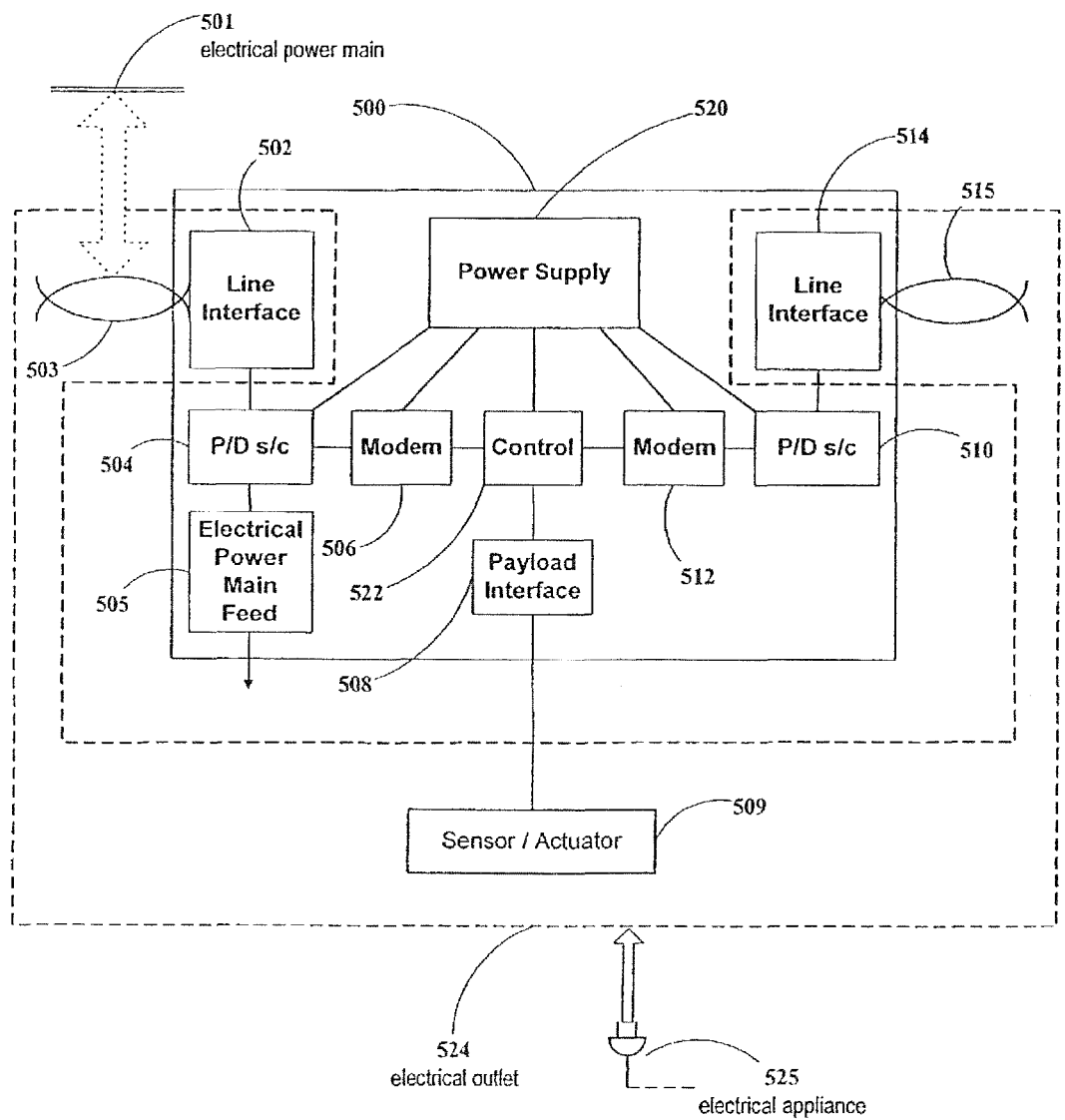
FIG. 5 is a block diagram of a SIC for control applications according to the present invention.

FIG. 5 is a block diagram of a representative SIC 500 for use in control applications. A first line interface 502 is a first port for connecting to the previous SIC to receive incoming electrical power and local area network data over electrically-conducting medium 503, which may optionally be connected to an electrical power main 501, so that SIC 500 may be powered from electrical power main 501. Line interface 502 may include the connector, fuse, lightning arrester and other protection such as noise filters, etc. The incoming power/data signal is fed to a first power/data splitter/combiner 504, which de-couples the (high frequency alternating current) data signal from the power. Such a power/data splitter/combiner 504 (denoted for brevity in FIG. 5 as "P/D s/c") can be implemented by methods well-known in the art, such as using a center-tap transformer, or alternatively with active components. The data signal is fed to a first modem 506 allowing bidirectional communication, while the power is fed to a power supply 520. The above scheme assumes that both power and data are carried by the same network wires (line-powering). FIG. 5 illustrates the case where the SIC is line-powered by alternating current (for example, by the electrical power main), in which case power/data splitter/combiner 504 is an AC power/data splitter/combiner, which separates a low-frequency alternating current power from the higher-frequency data signal. Otherwise, in the case where the SIC is line-powered by direct current, power/data splitter/combiner 504 is a DC power/data splitter/combiner, which separates direct current power from the data signal. In some cases the line-powering method is not used. For example, power can be carried by dedicated lines routed in conjunction with the data wiring. Alternatively, the SIC can be locally powered by a local power-supply. In both cases, the power/data splitter/combiner is not required, and the power lines are directly connected to the SIC power-supply, while the data connects directly to the modems. Parts of the SIC are shown optionally housed within an electrical outlet 524, such that connections to the local area network as well as to the electrical power mains may be made from electrical outlet 524. Electrical power from electrical outlet 524 can be fed to an optional electrical appliance 525. In addition, SIC 500 contains an optional electrical power main feed 505 which can also power electrical appliances or other devices.

Power-supply 520 provides the required voltages for the SIC and payload operation, and also outputs the power to a second Power/data splitter/combiner 510, for coupling to the next SIC. Communication with the next (fed) SIC is performed via a second modem 512 connected to a second line interface 514 via power/data splitter/combiner 510, similar to power/data splitter/combiner 504 as previously described. Line interface 514 feeds to electrically-conducting medium 515, which connects to the next SIC. Modems 506 and 512 can be standard RS-485, RS-232, or any simple similar data interface transceiver. Alternatively, a complex transceiver can be used for achieving long ranges or high-speed operation. CPU and firmware contained in a control block 522 control and monitor the unit operation and communication, as well as control the payload through a payload interface 508 interfacing with a payload illustrated by a sensor/actuator 509. For example, interface 508 can implement a 4-20 ma standard interface. In a similar way, SIC 500 can be used for communication over the power line. To do this, payload interface 508 is replaced by a communication port and sensor/actuator 509 will be replaced by a DTE.

Figure 6:
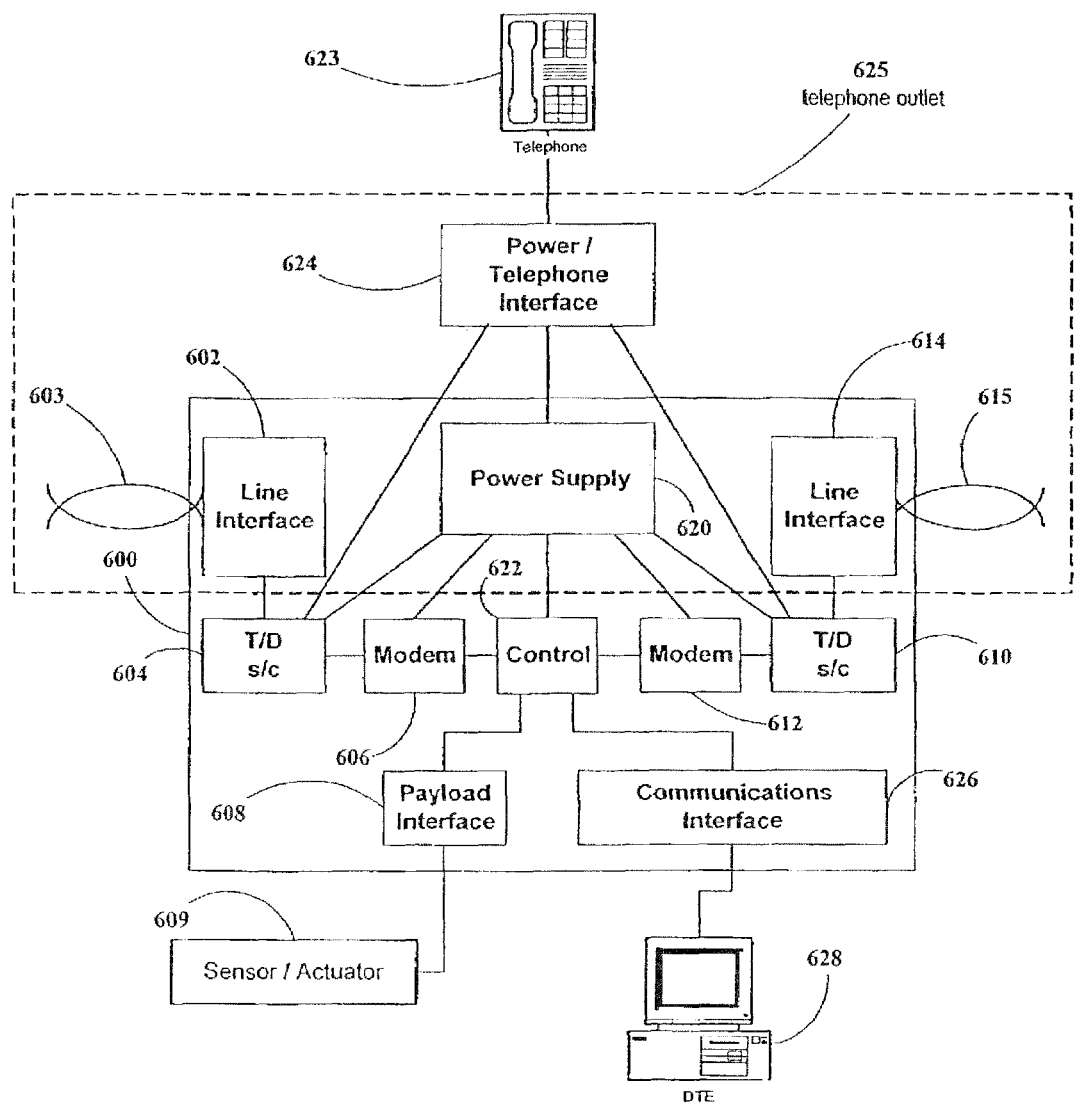
FIG. 6 is a block diagram of a SIC for data communications according to the present invention.

A SIC for use in data communications as shown in FIG. 6 is substantially similar to that used in control applications as shown in FIG. 5, but has some specific differences as noted. Also illustrated in FIG. 6 is the case where the local area network data is carried over electrically-conducting media which are part of the telephone wiring of a building. A SIC 600 has a first line interface 602 as a first port for connecting to the previous SIC to receive incoming power, local area network data, and telephony data via an electrically-conducting medium 603. Line interface 602 may include the connector, fuse, lightning arrester and other protection such as noise filters, etc. The incoming power/telephony/data signal is fed to a first telephony/data splitter/combiner 604 (denoted for brevity in FIG. 6 as "T/D s/c"), which de-couples the local area network data from the power and telephony data. Such a telephony/data splitter/combiner 604 can be implemented by methods well-known in the art, such as using a high-pass/low pass filter, or alternatively with active components. The local area network data signal is fed to a first modem 606 allowing bidirectional communication, while the power (DC) is fed to a power supply 620, and the telephony data is fed to power/telephone interface 624.

Power-supply 620 provides the required voltages for the SIC and payload operation, and also outputs the power to a second telephony/data splitter/combiner 610, for coupling to the next SIC. Communication with the next (fed) SIC is performed via a second modem 612 connected to a second line interface 614 via telephony/data splitter/combiner 610, similar to telephony/data splitter/combiner 604 as previously described. Line interface 614 connects to an electrically-conducting medium 615, which connects to the next SIC. Modems 606 and 612 can be standard RS-485, RS-232 or any simple similar data interface transceiver. Alternatively, a complex transceiver can be used for achieving long ranges or high-speed operation. CPU and firmware contained in a control block 622 control and monitor the unit operation and communication, as well as control the payload through a payload interface 608 interfacing with a payload 609, which may include sensors and actuators. For example, interface 608 can implement a 4-20 ma standard interface. SIC 600 also includes an optional power/telephone interface 624, contained for example in a telephone outlet 625, as well as one or more communications interfaces, such as a communication interface 626 connected to a DTE 628.

In the case of DC line feeding, the power supply may be equipped with a line reversal function (for example, a diode-based bridge) in order to accommodate a possible wire reversal.

Note that a SIC can be implemented as single device with all component parts contained within one enclosure, but does not necessarily have to be so implemented. In the case of a SIC used for data communications or control applications, the hardware may be optionally divided between the SIC module and the DTE/Payload units. In the case of a SIC used for telephone applications, the hardware may optionally be divided between the SIC, the DTE payload unit, and the telephone outlet, such as telephone outlet 625, which allows connections to both telephone services (such as through a telephone 623) and the local area network (such through DTE 628). Telephone outlet 625 may be a wall outlet or jack. All or part of the SIC may be housed within a telephone outlet such as telephone outlet 625, if desired. Furthermore, for SIC's used only as repeaters, a payload interface is not necessary.

Power/data splitter/combiner 510 (FIG. 5) can use various techniques known in the art. Coupling can be implemented, for example, as disclosed in U.S. Pat. No. 4,745,391 to Gajjar. Power-supply 520 (FIG. 5) can be connected to the network using dedicated adapter or via specific SIC. The payload can also be connected using standard Ethernet or other LAN interface, hence emulating the network using the SIC's. This configuration makes use of standard interfaces, but operates at higher throughput and data-rates than a conventional LAN.

SIC Addressing

A SIC can include an address. Addresses of SIC's on the network can be assigned via automatic assignment by the local area network itself by algorithms known in the art, for example as disclosed in U.S. Pat. No. 5,535,336 to Smith et al. Addresses can also be assigned via manual assignment, such as by the setting of mechanical switches on the SIC unit. Addresses can also be determined by the DTE connected to the SIC, either by means of higher layers as done in most LAN systems, or physically be means of the connection to the SIC (such as by address lines).

SIC Powering

Figure 7:
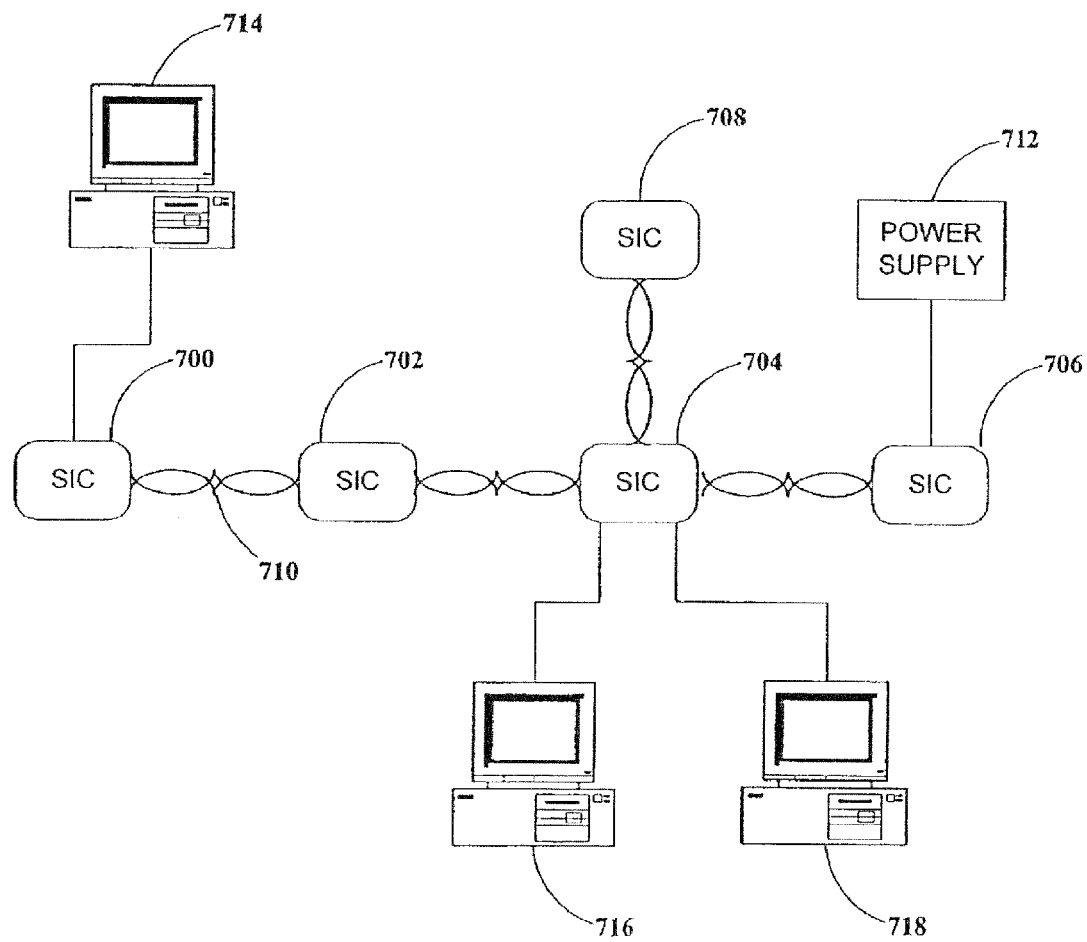
FIG. 7 shows a LAN topology utilizing the devices of the present invention.

A SIC can receive electrical power locally, via a power source located near the SIC. However, one power source may be used to power some or all the SIC's in the local area network using dedicated power lines. These lines can be routed with the data communication wires. Alternatively, the same electrically-conducting media (the data communication wires) can be used to carry both electrical power and local area network data to the SIC's, by means of techniques well-known in the art, for example as in telephone systems. In such a case, a unit is required for coupling the power supply to the local area network. This can make use of a SIC (such as SIC 706 in FIG. 7) or in a specific dedicated module. Since electrical power is typically distributed at low frequencies (e.g., 60 Hertz), whereas local area network data is typically at a much higher frequency, electrical power can be combined with local area network data using frequency-domain multiplexing. A SIC can therefore be powered from the electrical power mains, and can also deliver electrical power, as illustrated in FIG. 5 and detailed herein above.

The DTE's, sensors, and actuators connected to the SIC's can also be locally powered from the SIC's, or can use the same power resources via the same channels as the SIC's. Part or all of a SIC can be housed within an electrical outlet so that the electrical outlet allows connection to the local area network as well as to electrical power.

Control

Although mainly intended to be used as communication network, the system according to the present invention can also be used as a platform to implement a sensing, control, and automation system. This is achieved by adding to one or more of the SIC's interfaces to sensors or actuators. The signals received by the sensors are transmitted over the network via logic contained in the SIC's or in the DTE's, which thereupon operate the relevant actuators. This automation function can be monitored by one or more of the DTE's.

The operation of the control may be associated with data communicated over the network (for example, sensing the availability of power to a DTE) or may be independent of it, to allow control decisions to be made locally.

DTE Interface

The DTE interface can be a proprietary interface or any standard serial or parallel interface, such as ITU-T V.35, ITU-T V.24, etc. In addition, a telephone interface (POTS) or ISDN may be used. This can suit intercom or PBX applications.

Fault Protection

Figure 8:
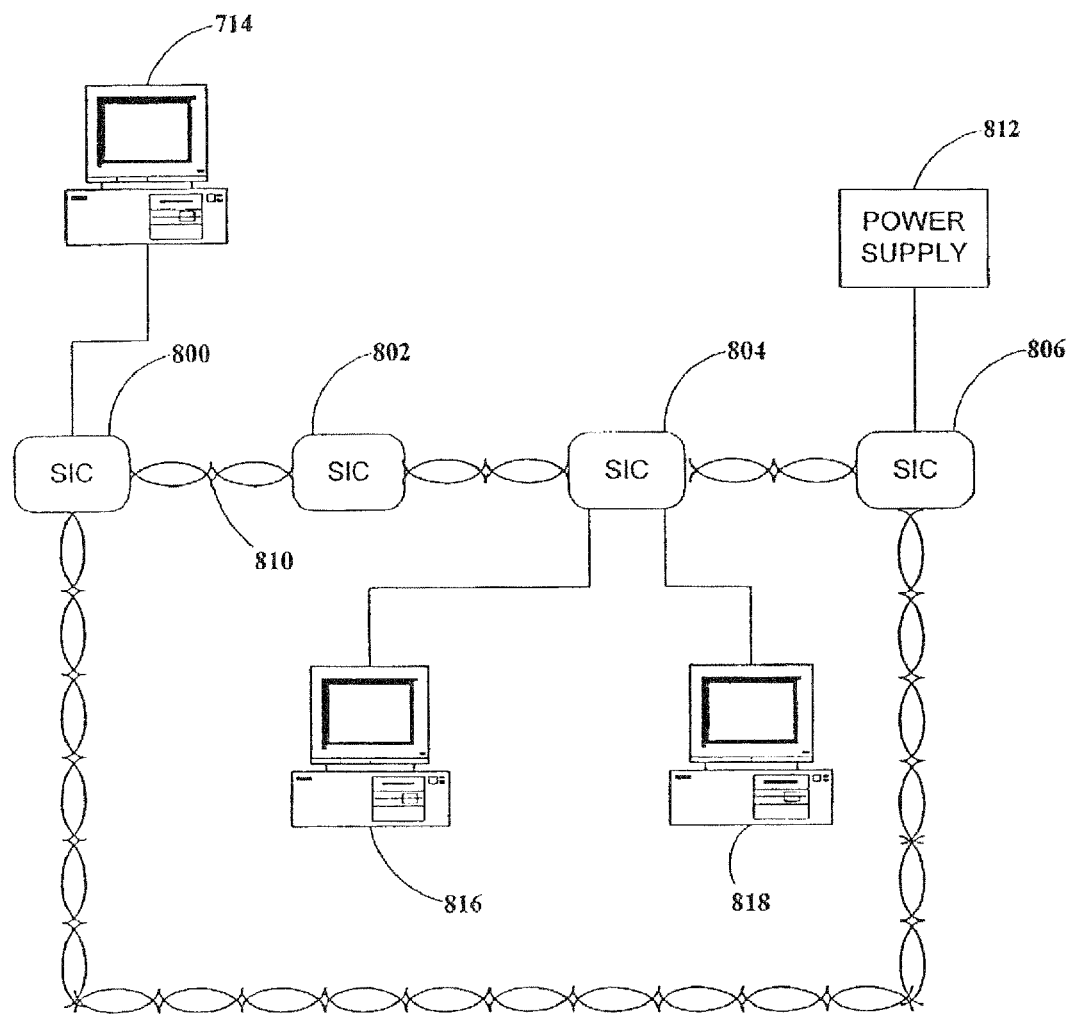
FIG. 8 shows an alternative LAN topology utilizing the devices of the present invention.

The SIC topology described above can be modified to allow for single failure correction. In such a case, the SIC's are connected in a network with redundant paths, such as a circular topology as shown in FIG. 8. In this example, a SIC 800 is connected to a SIC 802, which is in turn connected to a SIC 804, which is in turn connected to a SIC 806, which is in turn connected to SIC 800. When connected in such configuration, any single failure in any conductor, such as in conductor pair 810, will not effect the system operation, as data routing from any SIC to any other SIC can be achieved via an alternate path. The term "circular topology" herein denotes the topology of any local area network of SIC's according to the present invention which contains at least two communication paths between two different SIC's. For example, in FIG. 8, there are two communication paths from SIC 800 to SIC 804: one communication path is from SIC 800 to SIC 802 to SIC 804, and the other path is from SIC 800 to SIC 806 to SIC 804. Circular topology provides redundant communication paths that increase the immunity of the local area network to communication faults. It should be noted that the circular topology according to the present invention, as shown in FIG. 8, differs significantly from the well-known "Token Ring topology" of the prior art, as discussed following.

Although circular topology as defined herein can be superficially similar to the Token Ring topology, there are major differences between them. One difference is in the data framing. The Token Ring uses the same frame structure throughout all communication links in the network, and this requires that the same framing must be recognized by all the cells in the network. In the SIC network according to the present invention, however, each communication link (between any two connected SIC's) is totally independent from all other network communication. Hence, a first SIC can communicate with a second SIC using one type of frame structure and protocol, while the same first SIC can communicate with a third SIC using a different type of frame structure and protocol.

In addition, in a Token Ring network, there is single direction of data flow at any given time from a single transmitter to one or more receivers, and usually, the direction of data flow is constant. The SIC network according to the present invention, however, does not impose any limitation on the data flow in any of the communication links. Full duplex, half duplex or unidirectional communication is possible, and can even vary from link to link throughout the network. This allows the SIC network to support two independent communication routes simultaneously, provided different segments are used. In FIG. 8, for example, SIC 800 can communicate with SIC 802 while SIC 804 simultaneously communicates different data with SIC 806. This capability is not supported by any of the other network configurations.

The above differences affect, for example, the vulnerability of the respective networks to faults. In case of single break or short-circuit anywhere in the medium, the Token Ring network will collapse, disabling any further communication in the system. As another example, in the network disclosed in U.S. Pat. No. 4,918,690 to Markkula et al. (hereinafter referred to as "Markkula"), this fault affects the physical layer by disabling the media's signal-carrying capability. The Token Ring network will not function at all since the data layer functionality based on unidirectional transmission will not be supported. In contrast, however, a SIC network according to the present invention, will continue to function fully, except for the specific faulty link itself. All other links continue to function normally. Furthermore, the ability to localize the fault is not easily performed either in a Token Ring network or in the Markkula network. In the SIC network according to the present invention, however, it is simple and straightforward to trace the fault to the affected link.

Data Distribution Over Electrical Power Lines

An important configuration for a network according to the present invention uses the electrical power wiring of a building as a communication media. This can be used, for example, to implement an inexpensive 'home LAN'. Typical house mains have a connection to single feeder with numerous distribution points and outlets. The principles according to the present invention specify a SIC to be located within each outlet and at each distribution point. This will allow SIC-based communications network, where communication takes place between each pair of SIC's connected via the wiring. In such a case it is also expected that the mains will also be used to power the SIC's. Aside from using the same wiring media, the electrical distribution and the communication system sharing the same mains can be totally decoupled.

Another configuration involves adding the SIC to the Mains wiring at points distinguished from the mains outlets. The preferred embodiment, however, consists of using the outlets points for both the electrical supply and the DTE connection points. This involves replacing all electrical outlets and distribution points with 'smart' outlets, having both electrical connections and a communications jack. In addition, such unit may include visual indicators (e.g. LED's) to show the communication status, and may also include switches or other means to determine the outlet address. Such a communication system could be used for applications associated with power distribution, as for example to control the load connected to a specific outlet, for remote on/off operation of appliances, timing of operations, delayed start, disconnection after pre-set time period, and so forth. Such a communication system could also be used to monitor the power consumed by specific outlets, such as for Demand Side Management (DSM) or Automatic Meter Reading (AMR), allowing remote meter reading.

The above described topology may also apply to existing wiring. One common example may be power wiring to consumers located in different locations. Such wiring typically relies on bus topology with taps. In order to use SIC technology, the wiring must be broken, and a SIC installed between both ends.

In a similar manner, a communication network employing the electrical power wiring of vehicles and vessel can be implemented, such as for aircraft, ships, trains, buses, automobiles, and so forth.

Implementing a Local Communication/Telephone System Using SIC's

In this application, existing telephone wiring (either POTS or ISDN) is used as the electrically-conducting media for the local area network, and is used for both local area network data communication and for telephony. The term "telephony" herein denotes any telephone or telephonic communication, including both including voice (POTS) and data (ISDN). Telephone outlets are usually connected in point-to-point topology without a distribution point. To set up a network, each outlet is replaced with SIC-based outlet. If there are distribution points, these distribution points must also be SIC equipped. This configuration results in a high-performance LAN between the telephone outlets. Aside from sharing the same media, the local area network can be decoupled from the telephone system. Alternatively, the local area network and the telephone system can be combined, such that telephony is digitally integrated into the local area network data.

The outside telephone service can be treated according to one of the following alternatives:

1. No telephone support. In this configuration, the connection to the network (usually to the public network) is cut, and the network is fully internal, with no external telephone service.

2. Telephone as Payload. In this configuration, the telephone capability is retained, and telephony data may be integrated into the data communication of the local area network. One of the SIC's (usually the one closest to a public telephone network interface) or other dedicated module interconnects (via the communication interface for example) to the network interface (NI). This unit emulates a telephone interface to the NI, so that public network operation is transparent and continues to perform as normal. However, the signals associated with the telephone interface, either the voice itself and the control/signaling (on hook/off hook, ringing, etc.) are digitized and transmitted in the network as data stream, as part of the communication taking place in the network. In the SIC's interfaced to telephones, these signals are converted back to analog (or in any original form) and thus can be used with standard telephones. In this case, telephone functionality is fully retained. However, failure in the communication network may result in loss of the telephone service. This can be improved by means of a system which disconnects the SIC's circuitry and restores the original wiring routing (this can be easily implemented by relays, which bypass the SIC's upon failure detection, manual intervention, or other relevant occasion).

3. Communication over POTS or ISDN. In this method, the electrically-conducting media interconnecting SIC's is the telephone wiring of a building. This method involves the known mechanism 'POTS Splitting', currently used in conjunction with xDSL technologies. This requires a filter which separates the low-frequency portion of the spectrum (usually carrying the POTS associated signals and power) from the high-frequency portion of the spectrum (used for communication). In such an application, the AC/DC units in the SIC are replaced with such POTS splitter modules. The low-frequency band (POTS related) is passed transparently (similar to the power pass), and branched to the telephone jack. The high-frequency band is used for the communication between the SIC's. This combining of high-frequency local area network communication on the same electrically-conducting media with low-frequency telephony data is a form of frequency-domain multiplexing.

In the latter two alternatives, each in-wall telephone outlet is replaced with a SIC based outlet having both a telephone jack and one (or more) communication jacks.

Computer Bus Extender

Figure 10:
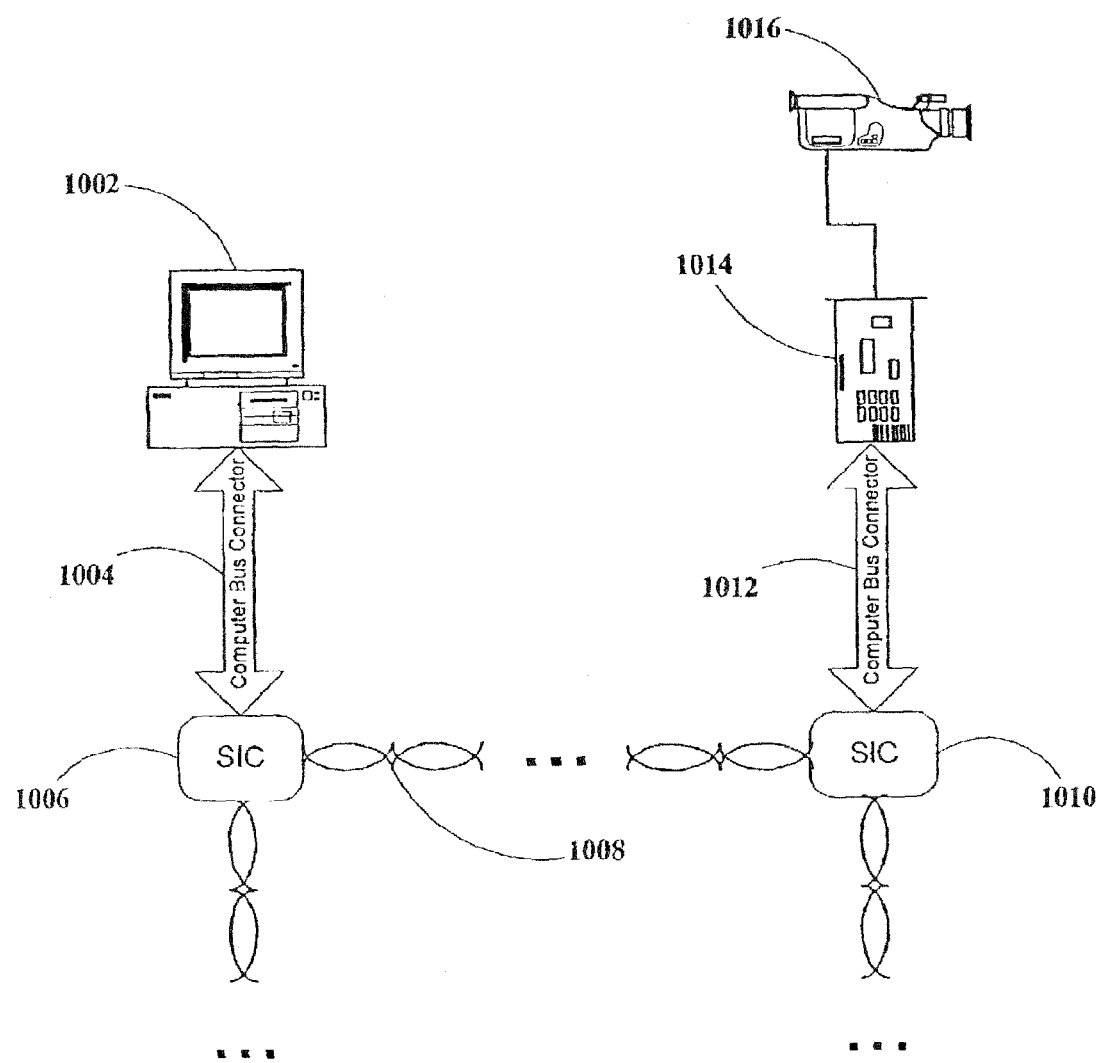
FIG. 10 shows a local area network according to the present invention used as a computer bus extender.

The SIC network can be used as a computer bus extender, such as an 'ISA bus extender', as illustrated in FIG. 10. In this configuration, a SIC 1006 is equipped with a computer bus connector 1004 which is connected, for example, to one of the ISA bus slots in a computer 1002, to transport data between the local area network and computer 1002. Another SIC 1010, remotely located, also has a computer bus connector 1012, such as an ISA bus extender. This allows for a transparent ISA bus capability, where the ISA bus data will be transported in both directions over electrically-conducting medium 1008. The ellipses ( . . . ) indicate that additional SIC's and electrically-conducting media may be present in the local area network between SIC 1006 and SIC 1010. Shown as an example, a video frame grabber card 1014 is plugged into computer bus connector 1012, and a video camera 1016 is connected to video frame grabber card 1014. Normally, video frame grabber card 1014 is plugged directly into an ISA bus slot, such as in computer 1002. Here, however, the local area network acts as a bus extender so that video frame grabber 1014 and video camera 1016 can be located remotely from computer 1002. The normal software driver for the ISA bus slot in computer 1002 can used, since computer 1002 is unaware of the fact that only ISA emulation is taking place. This way, the capability of having general remote PC components and peripherals can be easily achieved. This configuration features the above-described advantages, and this method can be used to attain various goals, such as fault protection. Similarly, this method can be used to connect several units remotely to a computer, using different ports in the computer.

Implementing Multiplexers and PABX/PBX Functionality

Figure 9:
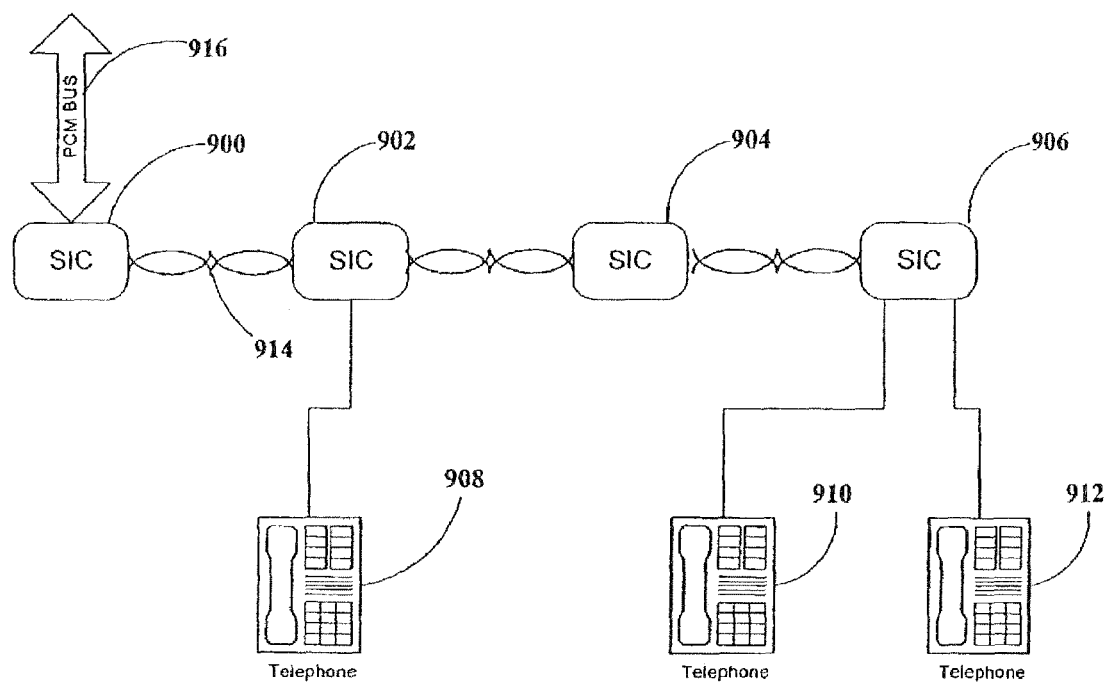
FIG. 9 shows a SIC-based multiplexer—PABX/PBX according to the present invention.

A network of SIC's may be used to implement a multiplexer or a PABX/PBX functionality, as illustrated in FIG. 9. In this example, a SIC 900 is connected to a high data rate connection, such as PCM bus 916, while SIC 902 and SIC 906 are connected to telephones 908, 910, and 912. SIC 904 functions as a repeater in this example.

In this example, the local area network functions as a multiplexer, wherein the bandwidth of the high data rate connection (PCM bus 916) is multiplexed through SIC 900 to SIC 902 and SIC 906, each of which may use a different portion of the bandwidth of the high data rate connection (PCM bus 916). Moreover, by the addition of telephones 908, 910, and 912, the local area network of FIG. 9 functions as a voice multiplexer.

Other Applications of the Invention

A number of applications of the present invention have been discussed above. Additional applications include, but are not limited to: intercom, PABX/PBX, security systems, video surveillance, entertainment broadcasting services, time (clock) distribution, and audio/video signal distribution. The networks implemented by the present invention can extend locally within a single building or over a neighborhood.

While the invention has been described with respect to a limited number of embodiments and applications, it will be appreciated that many variations, modifications and other applications of the invention may be made.

What is claimed is:

1. A method carried out in a device that is coupled to first and second wirings, the device including a single enclosure housing first and second transceivers, a transformer, and a device power supply, the method comprising:
    carrying out a first full-duplex serial data communication over the first wiring that simultaneously carries DC power and first data signals, the first full-duplex serial data communication enabled by the first transceiver;
    carrying out a second full-duplex serial data communication over the second wiring, the second full-duplex serial data communication enabled by the second transceiver;
    employing the transformer to pass only first data signals between the first wiring and the first transceiver;
    feeding power to the device power supply from a source external to the single enclosure, the device power supply coupled to the first and second transceivers to power the first and second transceivers;
    providing the DC power from the device power supply, via a center-tap of the transformer, onto the first wiring; and
    storing an address associated with the device that enables network communications to be addressed to the device.

2. The method as claimed in claim 1, wherein the DC power and data are carried over same wire pairs in the first wiring.

3. The method as claimed in claim 1, wherein the address associated with the device is a manually assigned address.

4. The method as claimed in claim 1, wherein the address associated with the device is an automatically assigned address.

5. The method as claimed in claim 1, wherein the address associated with the device is assigned by a unit communicating with the device.

6. The method as claimed in claim 1, wherein the network is a local area network and the device is addressable in the local area network.

7. The method as claimed in claim 1, wherein communication over the first wiring is independent of communication over the second wiring.

8. The method as claimed in claim 1, wherein the address associated with the device is assigned by a unit coupled to the second wiring.

9. The method as claimed in claim 6, wherein the local area network is an Ethernet network.

* * * * *